(12) United States Patent
Ma et al.

(10) Patent No.: US 11,772,069 B2
(45) Date of Patent: Oct. 3, 2023

(54) MULTIFUNCTIONAL POROUS MATERIALS FOR WATER PURIFICATION AND REMEDIATION

(71) Applicant: University of South Florida, Tampa, FL (US)

(72) Inventors: Shengqian Ma, Tampa, FL (US); Qi Sun, Tampa, FL (US); Briana Aguila, Tampa, FL (US)

(73) Assignee: UNIVERSITY OF SOUTH FLORIDA, Tampa, FL (US)

(*) Notice: Subject to any disclaimer, the term of this patent is extended or adjusted under 35 U.S.C. 154(b) by 374 days.

(21) Appl. No.: 16/961,157

(22) PCT Filed: Jan. 12, 2019

(86) PCT No.: PCT/US2019/013393
§ 371 (c)(1),
(2) Date: Jul. 9, 2020

(87) PCT Pub. No.: WO2019/140338
PCT Pub. Date: Jul. 18, 2019

(65) Prior Publication Data
US 2020/0398252 A1 Dec. 24, 2020

Related U.S. Application Data

(60) Provisional application No. 62/616,888, filed on Jan. 12, 2018.

(51) Int. Cl.
*B01J 20/22* (2006.01)
*B01J 20/26* (2006.01)
(Continued)

(52) U.S. Cl.
CPC .......... *B01J 20/265* (2013.01); *B01J 20/226* (2013.01); *B01J 20/28071* (2013.01);
(Continued)

(58) Field of Classification Search
None
See application file for complete search history.

(56) References Cited

U.S. PATENT DOCUMENTS 3,845,014 A * 10/1974 Frank et al. ....... C08G 18/3819
528/68
2009/0130849 A1 5/2009 Lee
(Continued)

FOREIGN PATENT DOCUMENTS

| GB | 1344943 A | 1/1974 |
|----|-----------|--------|
| JP | S61157344 A | 7/1986 |

(Continued)

OTHER PUBLICATIONS

International Search Report of Related Application No. PCT/US2019/013393, dated May 2, 2019, 4 pages.
(Continued)

*Primary Examiner* — Chester T Barry
(74) *Attorney, Agent, or Firm* — QUARLES & BRADY LLP

(57) ABSTRACT

A variety of compositions and materials are provided for water purification and remediation. The compositions including multiple functionalities for treating a variety of pollutants or contaminants. The compositions can include a porous organic polymer with one or more of a variety of functional groups for binding the contaminants and with a hierarchical pore size distribution over a range of pore sizes to facilitate enhanced removal of the contaminants. Functional groups can include one, two, or more different functional groups such as amines, halides, ammoniums, pyridiuiums, thiols, imidazoliums, salts thereof, or others. The range of pore sizes can be about 1 nm to 10 nm or more. Contaminants can include antimony, arsenic, barium, beryllium, cadmium, chromium, copper, lead, mercury, selenium, technetium, thallium, uranium, radium, urea, and phosphate.

(Continued)

Methods of removing the contaminants from water using the compositions are also provided.

20 Claims, 24 Drawing Sheets

(51) Int. Cl.
  *B01J 20/28* (2006.01)
  *C02F 1/28* (2023.01)
  *C02F 101/00* (2006.01)
  *C02F 101/10* (2006.01)
  *C02F 101/16* (2006.01)
  *C02F 101/22* (2006.01)

(52) U.S. Cl.
  CPC ......... *B01J 20/28088* (2013.01); *C02F 1/285* (2013.01); *C02F 2101/006* (2013.01); *C02F 2101/103* (2013.01); *C02F 2101/105* (2013.01); *C02F 2101/106* (2013.01); *C02F 2101/16* (2013.01); *C02F 2101/22* (2013.01)

(56) References Cited

U.S. PATENT DOCUMENTS

| | | | | |
|---|---|---|---|---|
| 2013/0248778 | A1* | 9/2013 | Goto | H01L 51/0043 252/500 |
| 2014/0162872 | A1* | 6/2014 | Bohringer | B01J 31/06 502/402 |
| 2014/0255794 | A1* | 9/2014 | Zhang | H01M 4/5815 429/188 |
| 2014/0294701 | A1* | 10/2014 | Dai | C22B 3/24 423/7 |
| 2015/0190779 | A1 | 7/2015 | Ma et al. | |
| 2016/0367948 | A1 | 12/2016 | Song et al. | |
| 2017/0225969 | A1* | 8/2017 | Ma | B01J 20/3212 |
| 2017/0355621 | A1 | 12/2017 | Gill et al. | |
| 2020/0206691 | A1* | 7/2020 | Jaber | B01J 20/28035 |

FOREIGN PATENT DOCUMENTS

| | | |
|---|---|---|
| JP | S61219718 A | 9/1986 |
| JP | H01284336 A | 11/1989 |
| WO | 1991018026 | 11/1991 |
| WO | 2012036034 A1 | 3/2012 |
| WO | 2017205722 A1 | 11/2017 |
| WO | 2019140338 A1 | 7/2019 |
| WO | 2019140339 A1 | 7/2019 |

OTHER PUBLICATIONS

Written Opinion of Related Application No. PCT/US2019/013393, dated May 2, 2019, 8 pages.

International Search Report of Related Application No. PCTU.S. Pat. No. 2019013394, dated Apr. 25, 2019, 5 pages.

Written Opinion of Related Application No. PCTUS2019013394, dated Apr. 25, 2019, 10 pages.

Ma "Functionalized Porous Organic Polymers as Uranium Nano-Traps for Efficient Recovery of Uranium from Seawater" Univ. of South Florida, Tampa, FL (United States), 2018. 16 pages.

Sun et al., "Bio-inspired nano-traps for uranium extraction from seawater and recovery from nuclear waste" Nat Commun. Apr. 24, 2018;9(1):1644. 9 pages.

Zareba "Tetraphenylmethane and tetraphenylsilane as building units of coordination polymers and supramolecular networks—A focus on tetraphosphonates." Inorganic Chemistry Communications 86 (2017): 172-186.

Japan Patent Office, Notice of Reasons for Rejection, Application No. 2020-538594, dated Jan. 5, 2023, 13 pages.

* cited by examiner

MULTIFUNCTIONAL POROUS MATERIALS FOR WATER PURIFICATION AND REMEDIATION

CROSS-REFERENCE TO RELATED APPLICATIONS

This application is a U.S. national stage entry under 35 U.S.C. § 371 of International Patent Application No. PCT/US2019/13393, filed Jan. 12, 2019, which claims priority to, and the benefit of, U.S. provisional application entitled "MULTIFUNCTIONAL POROUS MATERIALS FOR WATER PURIFICATION AND REMEDIATION" having Ser. No. 62/616,888, filed Jan. 12, 2018, the contents of both of which are incorporated by reference in their entirety.

STATEMENT REGARDING FEDERALLY SPONSORED RESEARCH OR DEVELOPMENT

This invention was made with government support 1706025 awarded by the National Science Foundation. The Government has certain rights in the invention.

TECHNICAL FIELD

The present disclosure generally relates to water purification and remediation.

BACKGROUND

Clean water does not come without a price and its challenges;(1) there remains a need to reduce the cost and the amount of energy and resources devoted to the treatment of municipal wastewater from households, businesses, and industries that are collected by a sewer pipe network and conveyed to a centralized wastewater treatment facility. Nutrients, such as urea and phosphate, in human urine contribute less than 1% of municipal waste water by volume, but account for 80% of the total nitrogen (N) and 40% of the total phosphorous (P),(2) thus requiring chemicals and energy to safely lower it to accepted levels.(3) Additionally, these nutrients serve the industrial and agricultural sectors for forming resins and fertilizers which are produced on a megaton (billion kilogram) scale. In many cases, nutrients from urine can be recovered more efficiently energetically than from its production from natural resources—mining. (3, 4) Therefore, sustainable sanitation technologies are currently in development, such as the NoMix, Blue Diversion toilet and other source-separated urine technologies, which separate solid and liquid excrements that lessen the impact on wastewater treatment facilities and improve sanitation in developing nations. Unfortunately, urine-separating toilets and waterless urinals are not without faults, such as pipe or storage tank blockage caused from precipitation by the very nutrients wanted for separation and recovery.(5, 6)

At low levels, urea and phosphate are beneficial to the ecosystem, but when a concentration threshold is surpassed it can trigger unintended consequences such as harmful algal blooms.(7-9) These harmful algal blooms can cause dead zones in fresh and salt water regions, raise the cost to treat drinking water, affect individuals with breathing problems, and disrupt industries that rely on aqua resources (Issues found locally near Tampa, FL and the Gulf of Mexico communities).(10) Multiple factors account for these issues, but one in particular is that wastewater discharge into water bodies due to overflow under extreme storm events, such as hurricanes. For example, about 20 million gallons of partially treated or untreated wastewater have been released to the Tampa Bay due to the Hurricane Hermine. Therefore, more research and development need to be performed and implemented in order to reduce or prevent the risk factors associated with hazardous spillage and make an economic use of wastewater nutrients.

Clean water is essential for all life forms to thrive, but when this life sustaining-source is contaminated by natural events or anthropogenic activities it becomes imperative to know the contaminant (detection) and rectify (decontamination) it to safe levels. Along with the regulated standards set by the U.S. Environmental Protection Agency (EPA) for heavy metals, charged or neutral organic contaminants, there is now a growing concern for chemical compounds for which there is little to no data on their health effects in potable water resources. Levels of different contaminants in water can show a presence from parts per billion (ppb) and upwards in concentration where current adsorbents used to remove contaminants suffer from low adsorption capacity, slow kinetics, poor selectivity, and moderate/weak affinity. Hence, there is a need to develop new types of adsorbent materials that have high uptake capacity, fast kinetic activity, strong affinity, and a broad acceptance to remove contaminants without removing beneficial trace elements that are essential for maintaining a healthy ecosystem. In this proposed research, we aim to develop functional porous organic polymers (POPs) as a new type of highly efficient and highly effective decontamination materials, which will not only circumvent the drawbacks of existing adsorbent materials but also offer new platforms for adsorption-based water purification.

Water purification by adsorption: There are different types of contaminants requiring removal from surface water and waste-water streams. Therefore, multiple classes of materials have been developed to cope with selective contaminants, but they lack an ability to remove many different contaminants simultaneously because these materials are uniform throughout their matrix. These materials include activated carbons, ion-exchange resins, clays, and zeolites, which are indistinguishable for contaminants throughout the material's entire matrix.

Activated Carbons: As the oldest adsorbent material, activated carbon (ACs) represent a general purpose material for the adsorption of many different contaminants. It is prepared from carbon rich sources (coal, lignite, peat, coconut shells, wood etc.) by two types of methods, namely physical or chemical. Both methods produce a porous structure with a surface area ranging from 500 $m^2/g$ upward to 3000 $m^2/g$ and pore sizes ranging from microporous (<2 nm) to mesoporous (2 to 50 nm) and higher, but both methods produce a material that is generally non-selective for contaminants because AC primarily interacts with contaminants through van der Waals type forces. These forces are weak and its associated interaction energy is ≤50 kJ/mol. Binding or exchange sites have been chemically added to a low degree within the AC matrix to improve the removal of organic and inorganic contaminants. The limited amount of binding or exchange sites in AC renders it with a low adsorption capacity and low affinity for contaminants. In addition, upon regeneration ACs can lose some or most of their adsorption capacity and the kinetic profile is negatively affected after the first use.

Ion-exchange resins: The reversible reaction between solid phase materials and ions in aqueous medium has witnessed a growth of resin materials that perform ion exchange reactions. The joining of hydrophilic molecules that can carry a fixed ionic charge have been developed over the past several decades using polymerization techniques to form a series of ion-exchange resins. These materials are very useful for charged contaminants but show little utility with neutral contaminants. There are also several drawbacks these materials face such as uncontrolled swelling and poorly distributed exchange sites with inefficient access. These deficiencies can decrease its mechanical strength, ion exchange capacity and reduce kinetics.

Clays: Clays are primarily composed of fine-grained minerals that show plasticity when moist and harden when dried. The interspatial voids between layers may be hydrated and filled with counter ions, which allow these materials to be implemented for environmental applications. However, clays suffer from low adsorption capacity and slow kinetics for removing contaminants from water because of their small surface areas and lack of open pore structures. Additionally, their physical properties towards removing contaminants can be altered by changes in the environment such as pH and hydration level.

Zeolites: As microporous adsorbents, zeolites are found naturally and are prepared at industrial scales for selective adsorption and ion exchange processes. Zeolites exhibit many useful properties to participate as adsorbents, targeting small molecules, ions, or gases because they possess repetitive adsorption sites within a crystalline and porous framework. Unlike ion-exchange resins they contain higher specific surface areas and retain a rigid porous structure under different environmental stresses. Unfortunately, zeolites are not as efficient as ACs for larger contaminants because zeolites have smaller apertures and pores thus restricting larger contaminants from entering the porous material as well as limiting the kinetics even for small contaminants. They are also restricted to aqueous solutions with pH values usually less than 8 because the bonds in the aluminosilicate material can break at higher pH values.

Other advanced porous materials for water decontamination include mesoporous silica, metal-organic frameworks (MOFs), and covalent-organic frameworks (COFs). However, mesoporous silica materials are non-selective with large pores that require modification to function properly for heavy metal decontamination. Pore size and surface chemistry are tuned for decontamination of heavy metals in MOFs and COFs; unfortunately, these materials lack stability at different environmental conditions such as low or high pH, which renders these materials ineffective for real-world applications.

The weaknesses and handicaps associated with existing adsorption materials together with the fact that none of them can address all of these inorganic contaminants necessitate the development of new compositions and methods for water decontamination with high effectiveness and high efficiency.

SUMMARY

The weaknesses and handicaps associated with existing adsorption materials together with the fact that none of them can address all of these inorganic contaminants necessitate the development of new types of multifunctional adsorbents for water decontamination with high effectiveness and high efficiency. It is hypothesized that materials designed and synthesized with multiple binding and exchange sites will lead to better water purification materials for multiple types of contaminants simultaneously present in water sources, as proposed herein for the development of POP-based reversible "nano-traps."

A variety of compositions are provided that overcome one or more of the aforementioned deficiencies. In some aspects, the compositions can bind one or more contaminants from a source of water, including wastewater, urine, drinking water, sea water, or any other source of water containing contaminants. Contaminants can include antimony, arsenic, barium, beryllium, cadmium, chromium, copper, lead, mercury, selenium, technetium, thallium, uranium, radium, urea, and phosphate. By contacting contaminated water with the compositions provided herein, one or more contaminants can be efficiently removed from contaminated sources of water.

The compositions can include a porous organic polymer having a plurality of repeat units and a plurality of pores having a hierarchical pore size distribution over a range of pore sizes. In some aspects, the plurality of repeat units include binding moieties that can bind the contaminants, and in some aspects the plurality of repeat units include two or more different binding moieties to enable binding of different contaminants. In some aspects, the plurality of repeat units include a first plurality of repeat units and a second plurality of repeat units different from the first plurality of repeat units.

In some aspects, the repeat units in the plurality of repeat units each have a structure according to any one of Formula 1A-Formula 1C

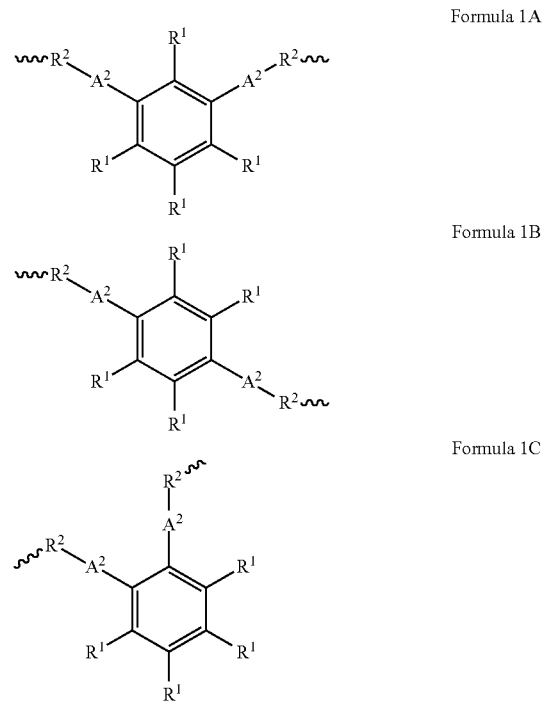

where each occurrence of $R^1$ is independently a hydrogen, a halide, an alkyl or heteroalkyl having 1 to 3 carbon atoms, or a binding moiety, so long as at least one occurrence of $R^1$ is a binding moiety; wherein each occurrence of the binding moiety is independently selected from the group consisting of a nitro substituent, a thiol substituent, a halide substituent, a conjugate base substituent, an ammonium substituent, a pyridinium substituent, an imidazolium substituent, an a salt thereof; where each occurrence of $R^2$ is independently an alkyl having 1 to 3 carbon atoms; and where each occurrence of $A^2$ is independently none or a substituted or unsubstituted phenyl.

A variety of binding moieties can be used for binding contaminants in water. In some aspects, the composition is multifunctional including 2, 3, 4, 5, or more different binding moieties. In some aspects, the binding moiety comprises a halide selected from the group consisting of a chloride, a bromide, and an iodide. In some aspects, the binding moiety comprises a conjugate base substituent or a salt thereof, wherein the conjugate base is selected from the group consisting of sulfate and nitrate. In some aspects, the binding moiety comprises an ammonium substituent or a salt thereof, and the ammonium substituent has a structure according to the following formula

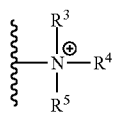

where $R^3$, $R^4$, and $R^5$ are hydrogen; or where $R^3$, $R^4$, and $R^5$ are each independently selected from the group consisting of hydrogen and C1-C5 alkyl, heteroalkyl, and alkoxy; or where $R^4$ is hydrogen, and where $R^3$ and $R^5$ are each independently selected from the group consisting of $C^2$-$C^7$ carboxylic acids. In some aspects, the binding moiety comprises a thiol substituent having a structure according to the following formula —$R^6SH$, where $R^6$ is selected from the group consisting of none, $C_1$-$C_7$ alky, $C_1$-$C_7$ heteroalkyl and $C_1$-$C_7$ alkylthio. In some aspects, the binding moiety comprises a pyridinium substituent or a salt thereof, where the pyridinium substituent has a structure according to the following formula

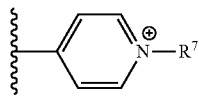

where $R^7$ is selected from the group consisting of hydrogen, $C_1$-$C_7$ alkyl, and $C_1$-$C_7$ heteroalkyl. In some aspects, the binding moiety comprises an imidazolium substituent or a salt thereof, where the imidazolium substituent has a structure according to the following formula

where R8 is an C1-C7 alkyl or heteroalkyl; and where $B^1$ and $B^2$ are each independently selected from the group consisting of hydrogen, alkyl, imidazolium, and alkyl imidazolium, so long as at least one occurrence of $B^1$ or $B^2$ is an imidazolium or alkyl imidazolium.

In some aspects, the repeat units in the plurality of repeat units each have a structure according to any one of Formula 2A-Formula 2C where $R^1$ is as defined above.

Formula 2A

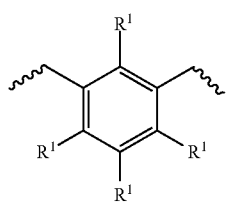

Formula 2B

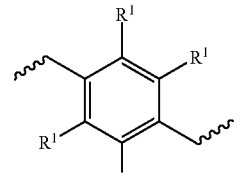

Formula 2C

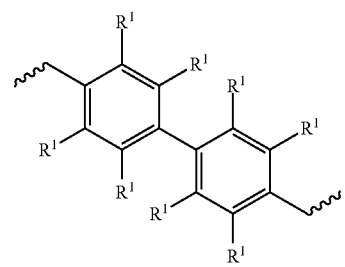

In some aspects, the repeat units in the plurality of repeat units each have a structure according to any one of Formula 3A-Formula 3C Formula 3A

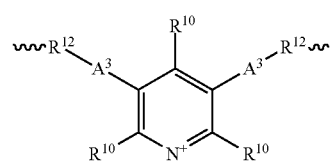

Formula 3B

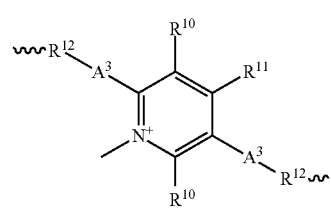

Formula 3C

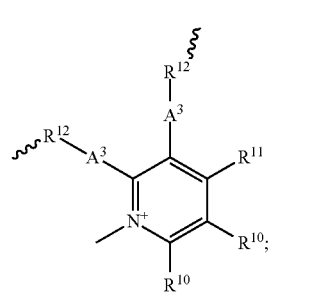

and where each occurrence of $R^{10}$ is independently a hydrogen, a halide, or an alkyl or heteroalkyl having 1 to 3 carbon atoms; where each occurrence of $R^{11}$ is independently a hydrogen, —$NH_2$, —$NHR^{13}$, or —$NR^{13}R^{14}$ where each occurrence of $R^{13}$ and $R^{14}$ is independently an alkyl or heteroalkyl having 1 to 3 carbon atoms; where each occurrence of $R^{12}$ is independently an alkyl having 1 to 3 carbon atoms; and where each occurrence of $A^3$ is independently none or a substituted or unsubstituted phenyl.

In some aspects, the repeat units in the plurality of repeat units each have a structure according to any one of Formula 4A-Formula 4C

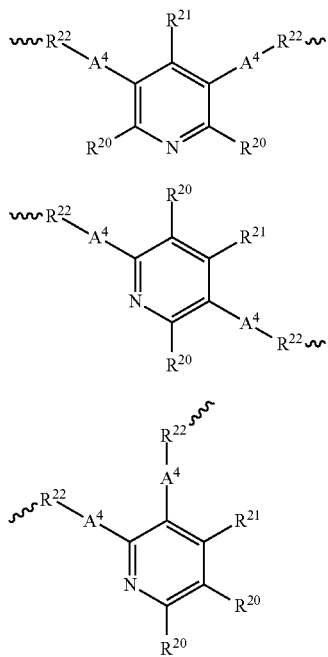

Formula 4A

Formula 4B

Formula 4C where each occurrence of $R^{20}$ and $R^{21}$ is independently a hydrogen, a halide, an alkyl or heteroalkyl having 1 to 3 carbon atoms, —$NH_2$, —$NHR^{13}$, or —$NR^{13}R^{14}$ where each occurrence of $R^{13}$ and $R^{14}$ is independently an alkyl or heteroalkyl having 1 to 3 carbon atoms; where each occurrence of $R^{22}$ is independently an alkyl having 1 to 3 carbon atoms; and where each occurrence of $A^4$ is independently none or a substituted or unsubstituted phenyl.

The pores can have a hierarchical pore size distribution. In some aspects, the range of pore sizes is at least 5 nm, at least 8 nm, or at least 10 nm. In some aspects, the range of pore sizes is about 1 nm to 10 nm, about 1 nm to 8 nm, about 1 nm to 5 nm, or about 5 nm to 10 nm. In some aspects, the hierarchical pore size distribution is determined based upon at least 60% of the pore sizes in the range of pore sizes having a pore volume of at least 0.01 $cm^3$ $g^{-1}$ in the pore size distribution, wherein the pore size distribution is based on a non-local density functional theory model applied to a nitrogen adsorption isotherm for the POP measured at 77 K. In some aspects, the range of pore sizes is about 1 nm to about 10 nm; and at least 80% of the pore sizes in the pore size distribution have a pore volume of at least 0.01 $cm^3$ $g^{-1}$.

Other systems, methods, features, and advantages of compositions for binding contaminants in a source of water will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Further aspects of the present disclosure will be readily appreciated upon review of the detailed description of its various embodiments, described below, when taken in conjunction with the accompanying drawings.

(FIG. 14A) $ReO_{4-}$ sorption isotherms for various adsorbents. The lines are fit with the Langmuir model; all the fits have $R^2$ values higher than 0.99. (FIG. 14B) The kinetics of $ReO_4^-$ adsorption from aqueous solution with an initial concentration of 50 ppm, at a phase ratio (V/m) of 25000 mL $g^{-1}$. (FIG. 14C) $ReO_4^-$ removal kinetics with an initial concentration of 1000 ppb at a V/m ratio of 5000 mL $g^{-1}$.

(FIG. 16A) Reversibility of PQA-pN(Me)$_2$Py-Cl for removing $ReO_4^-$. (FIG. 16B) $ReO_4^-$ uptake capacities of PQA-pN(Me)$_2$Py-Cl after being soaked in 12 M HCl or 2 M NaOH in saturated NaCl aqueous solution for one week. (FIG. 16C) Removal of $ReO_4^-$ by PQA-pN(Me)$_2$Py-Cl as a function of phase ratio (V/m) in 3 M $HNO_3$ aqueous solution. (FIG. 16D)

Sorption capacities of ReO$_4^-$ by PQA-pN(Me)$_2$Py-Cl after being irradiated with varied doses of β-rays or γ-rays.

Figure 17:
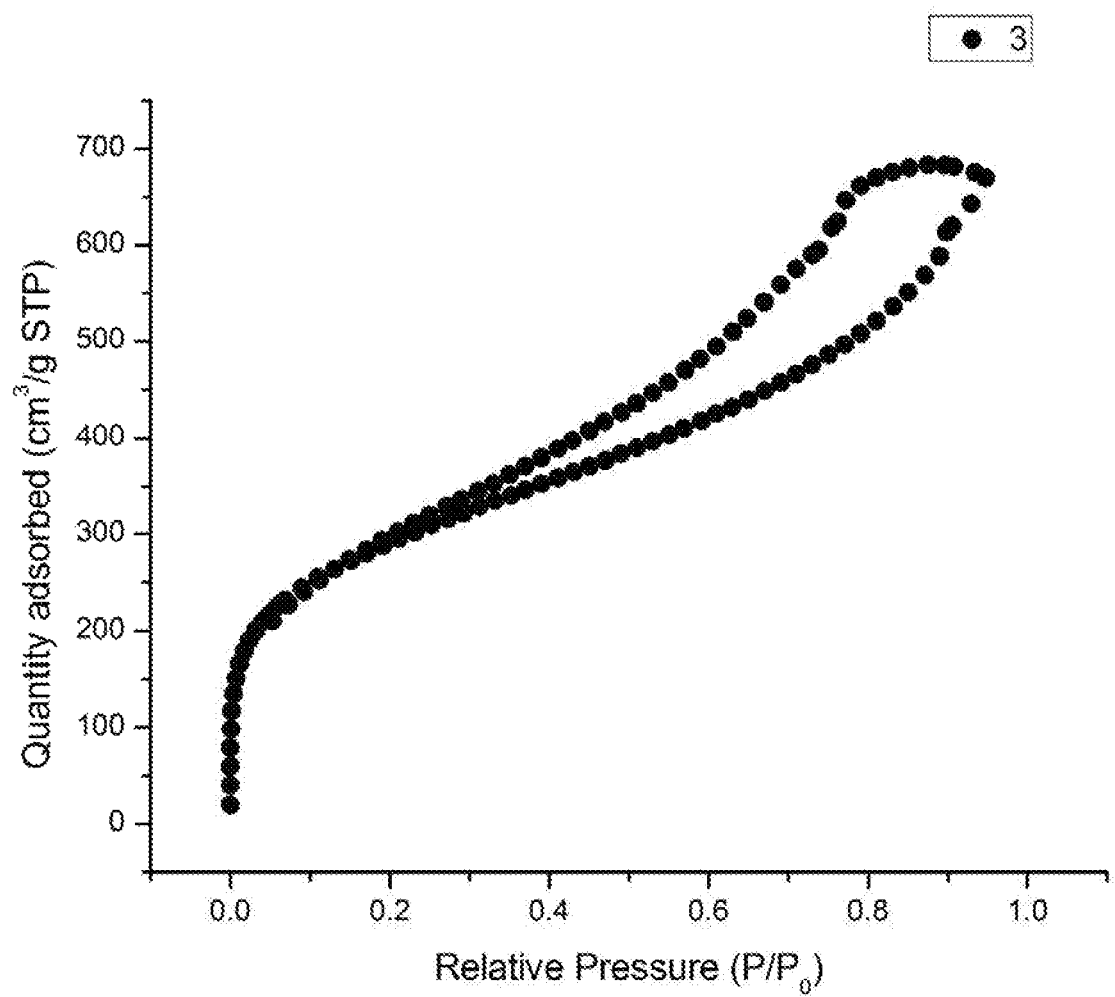

FIG. 17 shows N$_2$ sorption isotherms for polymer 3 from Example 9 with Brunauer-Emmett-Teller (BET) surface area of 979 m$^2$/g.

Figure 18:
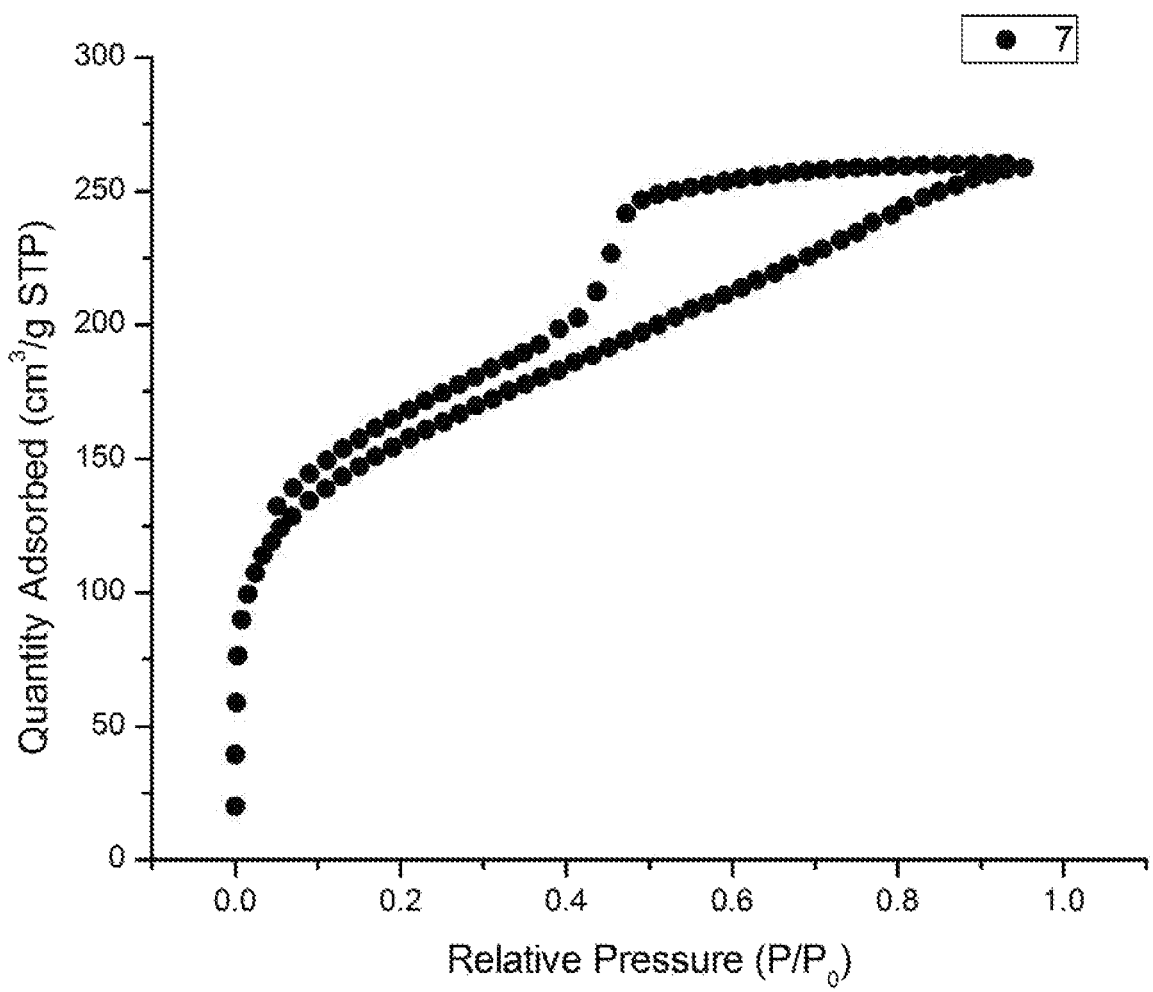

FIG. 18 shows N$_2$ sorption isotherms for polymer 7 from Example 9 with Brunauer-Emmett-Teller (BET) surface area of 536 m$^2$/g.

Figure 19:
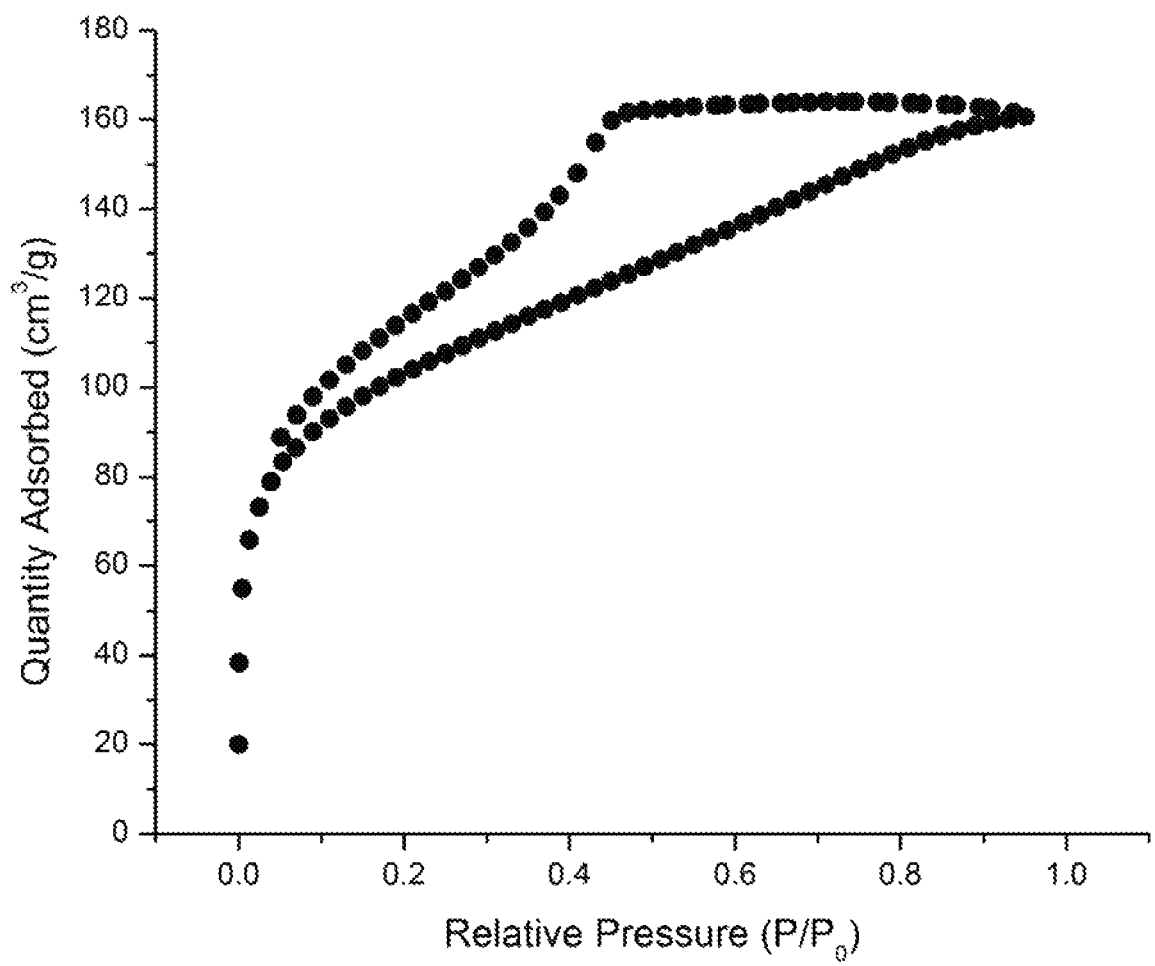

FIG. 19 shows N$_2$ sorption isotherms for polymer 11 from Example 9 with a Brunauer-Emmett-Teller (BET) surface area of 359 m$^2$/g.

Figure 20:
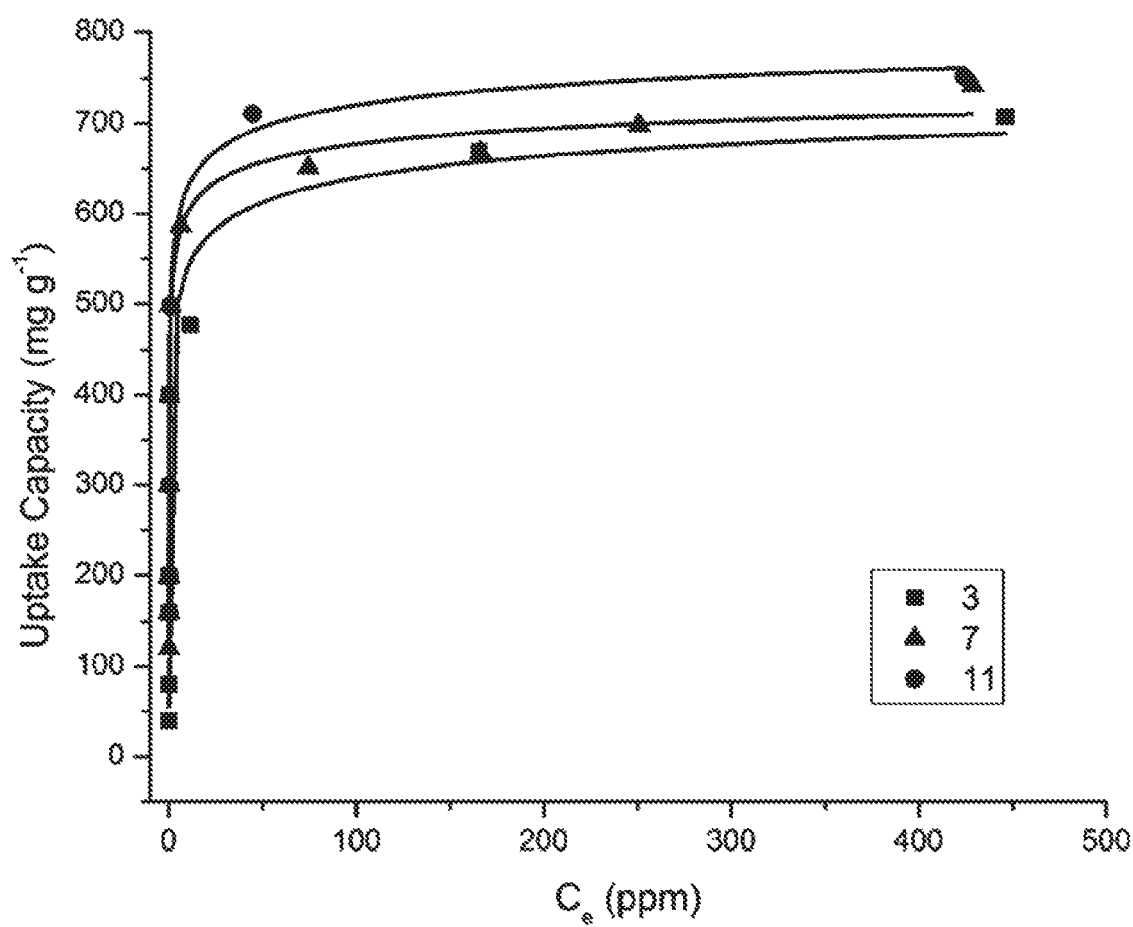

FIG. 20 shows maximum Pd$^{2+}$ uptake capacity for polymers 3, 7, and 11 from Example 9.

Figure 21:
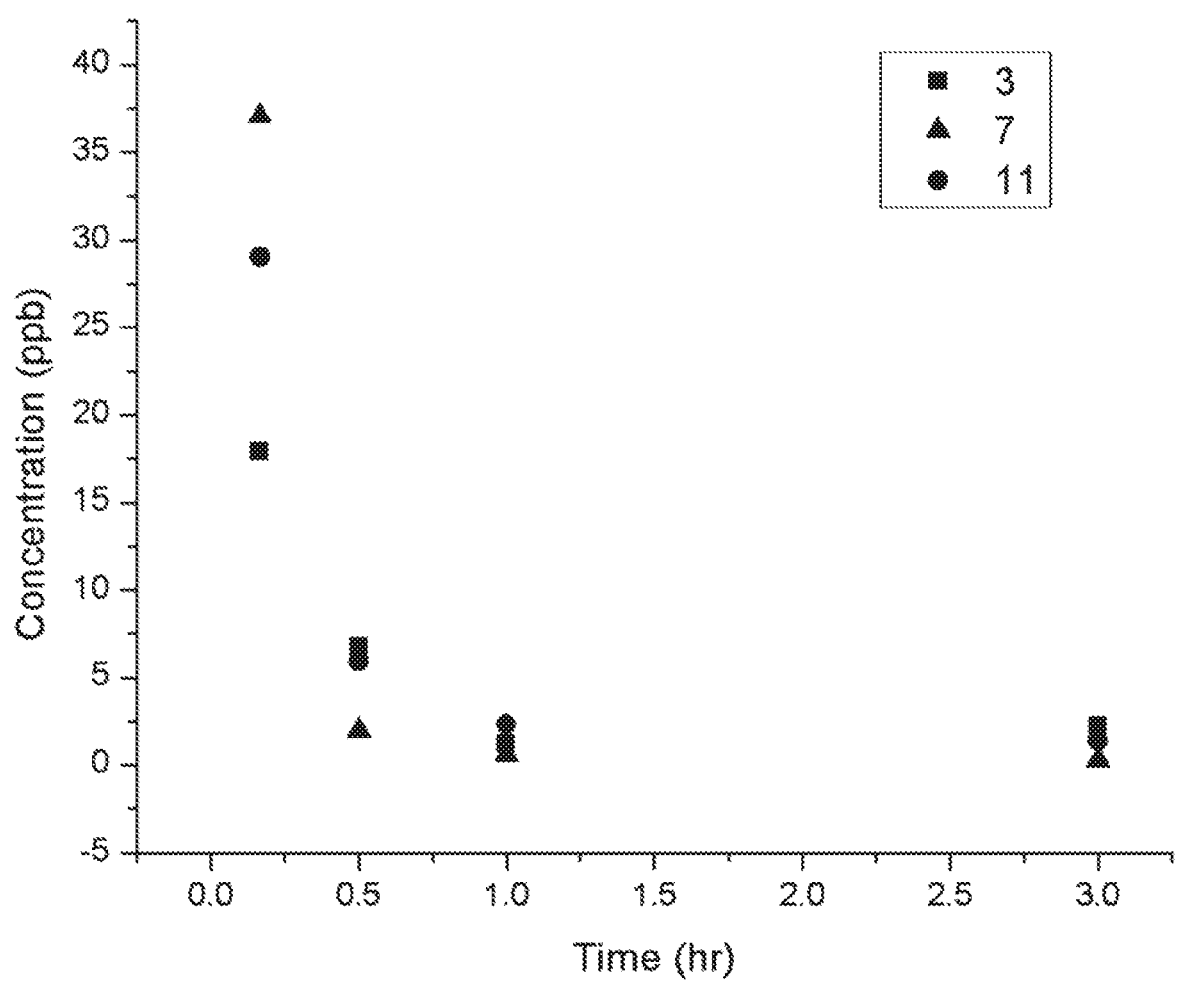

FIG. 21 shows kinetic performance of polymers 3, 7, and 11 from Example 9 at low concentrations of Pd$^{2+}$.

DETAILED DESCRIPTION

Herein we propose to remove as much of the N and P nutrients as possible from urine before entering the wastewater stream and treatment facilities and recover these nutrients in an efficient manner using a recyclable material. The materials we propose are highly porous, stable to urine, and will be designed to include functional groups that specifically target the nutrients and hold these nutrients using molecular interactions—forces found in nature. This adsorption process captures nutrients, such as urea, phosphate, and others, by using natural receptors grafted onto the porous materials. We have previously used our techniques to remove heavy metals (mercury, lead, etc.) from freshwater sources and we have selectively extracted uranium compounds from seawater; whereas, these materials were recycled and maintained their original properties. We propose the use of functional porous organic polymers (POPs) from the synthesis of porous polyvinyl materials, which we have pioneered to address harmful water pollutants. Our design strategies can form stable materials in high and low pH environments (fresh urine pH range 5.6 to 6.8 (Ref. 2)) and show accessible surface areas above 1000 m$^2$ g$^{-1}$ allowing for the nutrients to easily reach the abundant binding sites. Our previous results with heavy metals have shown adsorptions of greater than 100 wt. % in capacity, which means our materials may adsorb more nutrients than its own weight. Therefore, depending on the usage, collection times will vary before the material will need to be exchanged.

Healthy individuals can excrete between 490 to 2690 mL of urine per day.(11) This amount accounts for 3.6 to 16 grams N (median=10.4 g) and 0.4 to 2.5 grams P (median=1.0 g) entering wastewater per day per individual.(12) Nitrogen is primarily in the form of urea (>70%) followed by creatinine (>10%) and other amino acids,(13) while phosphorous is found primarily in the form of phosphate ions. Therefore, to remove N and P before these nutrients enter the waste stream, the proposed adsorbents should show a high affinity for urea and phosphate ions with high gravimetric capacities.

Figure 1:
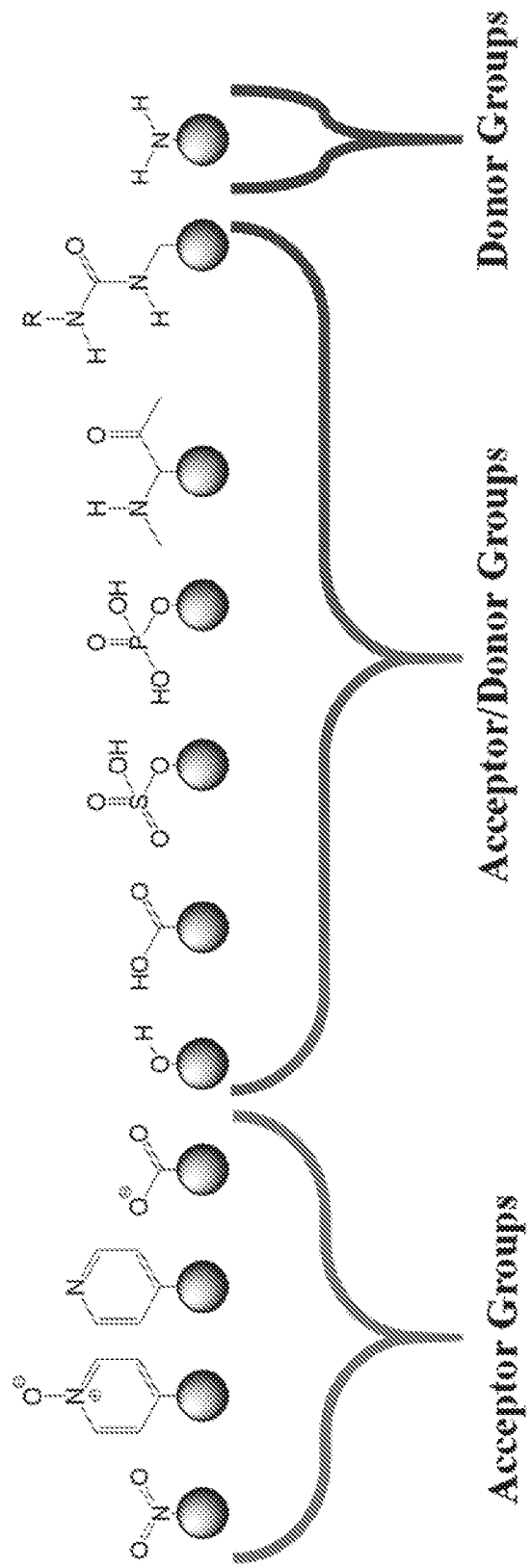
FIG. 1 shows functional groups for hydrogen bonding with nutrients. Gray sphere depicts point of attachment onto the POP.

We will target the nutrients using supramolecular interactions, such as hydrogen bonds and metal-complexes. It can be seen that urea favors hydrogen bonding with complementary groups that fulfill the donor-acceptor role. Phosphate can similarly interact with complementary hydrogen bonding moieties to lock it within a specific orientation. The multiple interactions during hydrogen bonding outcompete the energy of hydration, which would otherwise solubilize the nutrients, thus bypassing the concomitant hydrogen bonding moieties and allow the nutrients to pass through unhindered. Complexing the nutrients with metal ions is an additional means to trap nutrients within the porous architecture of the POPs, by forming natural salts that would otherwise form at higher concentrations as referenced earlier from blocking piping and storage systems. Depending on the pH, phosphate molecules are found in different forms from fully protonated H$_3$PO$_4$ to ionized forms of H$_2$PO$_4^-$ to HPO$_4^{2-}$ and finally PO$_4^{3-}$ at higher pH values. For urine it is likely to find phosphate in the partially protonated forms (H$_2$PO$_4^-$ and HPO$_4^{2-}$, 4≤pH≤10). Therefore, these ions will contain both donor and acceptors moieties for hydrogen bonding. Samples of functional groups which will behave as donor/acceptor pairs for urea and phosphate ions are depicted in FIG. 1. These functional donor/acceptor groups will be anchored onto the molecular building blocks (MBBs) prior to or after synthesizing the porous organic polymers, or POPs. Some of these functional groups will additionally serve to form bonds with metal ions allowing for further complexation with nutrients.

Multiple processes have been developed to recover nitrogen and phosphorous from wastewater, in particular urine. For nitrogen recovery, techniques have included: volume reduction, struvite formation, ammonia striping, reverse osmosis, and partial freezing; but these techniques must compete with the well-established Haber-Bosch process and phosphate mining to form reactive nitrogen and phosphorous compounds.(14, 15) All of these above mentioned methods require energy to extract nitrogen from wastewater, yet it is more favorable from an energetic perspective to recover and reuse nutrients from urine than just removing them from the wastewater stream or from natural resource mining as determined by a life cycle evaluation by Maurer et al.(14)

For phosphorous removal from wastewater effluents, several commercial processes have been developed to precipitate it out with iron, alum, or lime.(16-18) Magnesium hydroxide (Mg(OH)$_2$) has been used to improve sludge digestion to remove phosphorus from anaerobic supernatant; (19) similar to the use of magnesium to form struvite in wastewater. Struvite is one of the most promising avenues to remove both nitrogen and phosphorous from wastewater effluents.(20) Magnesium salts are added to the concentrated wastewater or urine effluents to form MgNH$_4$PO$_4$·6H$_2$O, where the N, P, Mg weight percent account for 5.7%, 12.6%, and 9.9%, respectively. The precipitation of struvite is fairly straight forward as long as certain conditions—such as pH, concentration, and suspended solids—are controlled, but recovering it requires additional technology as it is known to adhere to surfaces, thus increasing the recovery price.(21) Additional chemical chelating agents, such as ethylenediaminetetraacetic acid (EDTA), have assisted in precipitating struvite at higher pH values.(22) Another nutrient recovery/remediation method includes microorganisms to participate as nature's bioreactors to deal with anthropogenic waste. These organisms have been organized by de-Bashan and Bashan review that discusses their involvement for and against enhanced biological phosphorous removal.(23) Unfortunately, microorganisms and algae can be prone to contaminations, require large areas to operate, and emit more greenhouse gases than it sequesters.(24)

Adsorption activity from different adsorbents towards urea has been previously tested with readily abundant materials. Activated carbon, which is composed mostly of amorphous carbon and graphite, can adsorb many different analytes at once—such as urea and phosphate—within its porous structure. Unfortunately, activated carbon is not selective and low uptake capacities were measured by Fujita and Okazaki and found that between 130 and 150 mg of urea can be taken in by 1.0 gram of activated carbon.(25) Even after modifications of the activated carbon by oxidation using acid solutions to increase the amount of oxygen groups—thereby increasing the possible hydrogen bonding sites, no enhancement in urea uptake was observed. Research on zeolites adsorbing urea have been tested where the addition of zeolites aided in the nitrogen recovery of ammonium with the subsequent precipitation of struvite.(26-32) Additionally, it was shown by Fiorillo et al that hydrogen bonding does occur within its porous structure, which can improve its uptake capacity.(33) Later, tests to remove urea and other contaminants that accumulate in the body due to poor or lost organ function became increasingly important as these new materials can be applied as dialytic membranes/adsorbers to treat uremia. One such material was crosslinked p-cyclodextrin that was shown to adsorb up to 50.6 mg g$^{-1}$ of urea by interacting with the β-cyclodextrin's interior or hydrogen bonding groups.(34) This value achieved by Shi et al is lower than what was achieved by activated carbon. With solution rich in urea and active proteins, removing urea selectively is challenging. It was shown possible by Huh et al by complexing urea with metal ions in a microfluidic device.(35) They observed urea salting out as [M(urea)$_6$]•nH$_2$O where M=Mn$^{2+}$, Zn$^{2+}$, Fe$^{3+}$ and L=(SO$_4$)$_2$, (NO$_3$)$_2$, Cl$_3$ leaving the protein intact for further analysis. Chitosan has additionally been explored to adsorb urea from solutions. Chitosan is commercially produced by the deacetylation of chitin as a linear polysaccharide composed of poly-(D)-glucosamine and N-acetyl-D-glucosamine units and it shows good compatibility with biological and environmental systems.(36-40) Chitosan and modified chitosan composites, cross-linked or metal ion doped, exhibited fast adsorption rates for urea, but they still lack high adsorption uptakes with the best material achieving nearly 80 mg g$^{-1}$.(41-44) Unfortunately, these studies did not investigate the potential to improve its properties. Investigations in improving the accessible surface area and pore volume or to increase the number of binding sites within the material should be performed; as we are able to do with POPs. The chitosan materials were only doped with metal ions to show higher loading of urea, which we will demonstrate in our POPs. Other methods to remove urea were reviewed by Urbanczky et al where they summarized ways to decompose urea into its basic components;(45) whereas, collection will be better because of urea's use as a fertilizer, but also as a component in direct urine/urea fuel cells to produce electricity.(46-48)

POPs represent one of many emerging classes of nanoporous materials, excelling in important areas for wide scale use because they are robust (chemically and thermally) and also scalable. POPs are constructed by covalently joining predesigned organic molecular building blocks (MBBs) into accessible and high surface area materials, some over 6000 m$^2$/g, with tunable pores sizes from several angstroms to several nanometers while also retaining their high stability in different environments. The modular nature of POPs allows for an enormous diversity of structural platforms to tune for various applications, in particular as adsorbents for waste water or surface water cleaning. POPs will be at the forefront for water treatment because they can be continually improved upon from the plethora of ongoing clean water research.

Inorganic contaminants in drinking water: Removing harmful metal ions is an intensive process for producing safe drinking water or cleaning waste streams and procedures such as coagulation/filtration, ion exchange, or reverse osmosis have been used by water treatment facilities. Strict regulations have been set for the allowable maximum contaminant level in drinking water for inorganic chemicals as listed in Table 3. These inorganic contaminants become increasingly present in water supplies because new and past materials such as batteries, plumbing, paints, light bulbs, and metal alloys have relied on these metals for infrastructure and technology development. Natural erosion and mining are also sources for these inorganic contaminants reaching drinking water sources. In aqueous solutions at different pH values these contaminants are also found in their (hydr)oxide forms such as chromate (CrO$_4^{2-}$), dichromate (Cr$_2$O$_7^{2-}$), arsenate (AsO$_4^{3-}$) and arsenite (AsO$_3^{3-}$). The metal contaminants can also combine with carbon compounds forming organometallic species such as methylmercury (CH$_3$Hg$^+$), tetramethyllead ((CH$_3$)$_4$Pb) and tetraethyllead ((CH$_3$CH$_2$)$_4$Pb). The health effects of metal contaminants in their cationic, (hydr)oxide, or organometallic form are broad and can cause increasing blood pressure, kidney damage, cancer, and death from exposure.

TABLE 3

Inorganic chemical contaminants restricted by the EPA.

| Contaminant | Limit ppm (mg/L) |
|---|---|
| Antimony | 0.006 |
| Arsenic | 0 |
| Barium | 2.0 |
| Beryllium | 0.004 |
| Cadmium | 0.005 |
| Chromium | 0.1 |
| Copper | 1.3 |
| Lead | 0 |
| Mercury | 0.002 |
| Selenium | 0.05 |
| Thallium | 0.0005 |
| Uranium | 0 |
| Radium | 0 |

Before the present disclosure is described in greater detail, it is to be understood that this disclosure is not limited to particular embodiments described, and as such may, of course, vary. It is also to be understood that the terminology used herein is for the purpose of describing particular embodiments only, and is not intended to be limiting. The skilled artisan will recognize many variants and adaptations of the embodiments described herein. These variants and adaptations are intended to be included in the teachings of this disclosure and to be encompassed by the claims herein.

All publications and patents cited in this specification are cited to disclose and describe the methods and/or materials in connection with which the publications are cited. All such publications and patents are herein incorporated by references as if each individual publication or patent were specifically and individually indicated to be incorporated by reference. Such incorporation by reference is expressly limited to the methods and/or materials described in the cited publications and patents and does not extend to any lexicographical definitions from the cited publications and patents. Any lexicographical definition in the publications and patents cited that is not also expressly repeated in the instant specification should not be treated as such and should not be read as defining any terms appearing in the accompanying claims. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

Although any methods and materials similar or equivalent to those described herein can also be used in the practice or testing of the present disclosure, the preferred methods and materials are now described. Functions or constructions well-known in the art may not be described in detail for brevity and/or clarity. Embodiments of the present disclosure will employ, unless otherwise indicated, techniques of nanotechnology, organic chemistry, material science and engineering and the like, which are within the skill of the art. Such techniques are explained fully in the literature.

It should be noted that ratios, concentrations, amounts, and other numerical data can be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to about 5%" should be interpreted to include not only the explicitly recited values of about 0.1% to about 5%, but also include individual values (e.g., 1%, 2%, 3%, and 4%) and the sub-ranges (e.g., 0.5%, 1.1%, 2.2%, 3.3%, and 4.4%) within the indicated range. Where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In some embodiments, the term "about" can include traditional rounding according to significant figures of the numerical value. In addition, the phrase "about 'x' to 'y'", where 'x' and 'y' are numerical values, includes "about 'x' to about 'y'".

Definitions

Unless defined otherwise, all technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the specification and relevant art and should not be interpreted in an idealized or overly formal sense unless expressly defined herein.

The articles "a" and "an," as used herein, mean one or more when applied to any feature in embodiments of the present invention described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used.

The terms "pore diameter" and "pore size", as used interchangeably herein, refer to a measure of the effective diameter of the pores in the composition. The pore diameter can be the effective diameter of the largest gas molecule that can pass through the majority of the pores in the composition. The pore diameter can be estimated from the average pore diameter obtained from crystallographic measurements. The pore diameter can be estimated from measured adsorption isotherms for an inert gas such as $N_2$ or Ar using non-local density functional theory (NLDFT) or using models such as the Horvath-Kawazoe model.

The term "porous organic polymer (POP)", as used herein, refers generally to high surface area materials formed from organic segments covalently bonded to form an extended porous structure. Porous organic polymers can include conjugated microporous polymers, porous aromatic frameworks, porous polymer networks, and porous organic frameworks. The porous organic polymer can be crystalline, semi-crystalline, or amorphous. The porous organic polymer can have a surface greater than about 20 $m^2/g$, 50 $m^2/g$, 100 $m^2/g$, 500 $m^2/g$, or greater than about 1,000 $m^2/g$. The porous organic polymer can have a surface area up to about 8,000 $m^2/g$, 7,000 $m^2/g$, 6,000 $m^2/g$, 5,000 $m^2/g$, or 4,000 $m^2/g$. As used herein, the term "porous organic polymer" does not include zeolite structures or mesoporous silica structures.

The term "stable", as used herein, refers to compositions that are stable over time, stable under aqueous conditions, stable under harsh conditions, stable under acidic conditions, and/or stable under basic conditions. A composition is stable over time when, under standard operating conditions such as elevated temperatures and/or pressures, the composition does not change pore size by more than 1%, 2%, 5%, or 10% and/or does not change maximum metal uptake capacity by more than 1%, 2%, 5%, or 10% for a period of at least 1, 2, 10, 20, or 30 days. A composition is stable under harsh conditions when the composition does not change pore size by more than 1%, 2%, 5%, or 10% after exposure to boiling water for at least 2, 3, 4, 5, or 6 hours.

A composition is stable under harsh conditions when the composition has a distribution coefficient of the heavy metal that is greater than $1\times10^6$ mL $g^{-1}$, greater than $5\times10^6$ mL $g^{-1}$, greater than $1\times10^7$ mL $g^{-1}$, or greater than $2\times10^7$ mL $g^{-1}$ both under acidic conditions of pH less than 3.0, 2.0, or 1.0 and under basic conditions of pH great than 10.0, 11.0, or 12.0. A composition is stable under aqueous conditions when it does not change pore size by more than 1%, 2%, 5%, or 10% and/or does not change maximum metal uptake capacity by more than 1%, 2%, 5%, or 10% after being exposed to an air environment with at least 60%, at least 70%, at least 80%, or at least 90% relative humidity for at least 12 hours or for at least 1, 2, 3, 4, 5, or 10 days. A composition is stable under basic conditions when it does not change pore size by more than 1%, 2%, 5%, or 10% and/or does not change maximum metal uptake capacity by more than 1%, 2%, 5%, or 10% after exposure to concentrated NaOH solution, e.g. at least 1.0 M, 2.0M, 3.0 M, or 6.0 M NaOH, for a period of at least 120 minutes. A composition is stable under acid conditions when it does not change pore size by more than 1%, 2%, 5%, or 10% and/or does not change maximum metal uptake capacity by more than 1%, 2%, 5%, or 10% after exposure to concentrated HCl solution, e.g. at least 1.0 M, 2.0M, 3.0 M, or 6.0 M HCl, for a period of at least 120 minutes.

The term "small molecule", as used herein, generally refers to an organic molecule that is less than about 2,000 g/mol in molecular weight, less than about 1,500 g/mol, less than about 1,000 g/mol, less than about 800 g/mol, or less than about 500 g/mol. Small molecules are non-polymeric and/or non-oligomeric.

The term "derivative" refers to any compound having the same or a similar core structure to the compound but having at least one structural difference, including substituting, deleting, and/or adding one or more atoms or functional groups. The term "derivative" does not mean that the derivative is synthesized from the parent compound either as a starting material or intermediate, although this may be the case. The term "derivative" can include salts, prodrugs, or metabolites of the parent compound. Derivatives include compounds in which free amino groups in the parent compound have been derivatized to form amine hydrochlorides, p-toluene sulfoamides, benzoxycarboamides, t-butyloxycarboamides, thiourethane-type derivatives, trifluoroacetylamides, chloroacetylamides, or formamides. Derivatives include compounds in which carboxyl groups in the parent compound have been derivatized to form salts, methyl and ethyl esters or other types of esters or hydrazides. Derivatives include compounds in which hydroxyl groups in the parent compound have been derivatized to form O-acyl or O-alkyl derivatives. Derivatives include compounds in which a hydrogen bond donating group in the parent compound is replaced with another hydrogen bond donating group such as OH, NH, or SH. Derivatives include replacing a hydrogen bond acceptor group in the parent compound with another hydrogen bond acceptor group such as esters, ethers, ketones, carbonates, tertiary amines, imine, thiones, sulfones, tertiary amides, and sulfides.

The terms "reactive coupling group" and "reactive functional group" are used interchangeably herein to refer to any chemical functional group capable of reacting with a second functional group under the given conditions to form a covalent bond. Those skilled in the art will recognize that some functional groups may react under certain conditions but not under others. Accordingly, some functional groups may be reactive coupling groups only certain conditions, e.g. under conditions where the groups react to form a covalent bond. The selection of reactive coupling groups is within the ability of the skilled artisan. Examples of reactive coupling groups can include primary amines (—NH$_2$) and amine-reactive linking groups such as isothiocyanates, isocyanates, acyl azides, NHS esters, sulfonyl chlorides, aldehydes, glyoxals, epoxides, oxiranes, carbonates, aryl halides, imidoesters, carbodiimides, anhydrides, and fluorophenyl esters. Most of these conjugate to amines by either acylation or alkylation. Examples of reactive coupling groups can include aldehydes (—COH) and aldehyde reactive linking groups such as hydrazides, alkoxyamines, and primary amines. Examples of reactive coupling groups can include thiol groups (—SH) and sulfhydryl reactive groups such as maleimides, haloacetyls, and pyridyl disulfides. Examples of reactive coupling groups can include photoreactive coupling groups such as aryl azides or diazirines. Examples of reactive coupling groups can include click reactive coupling groups capable of forming covalent bonds through click reactions. Well-known reactions include the hetero-Diels-Alder reaction, the thiol-ene coupling, the Staudinger ligation, native chemical ligation, and the amidation reaction between thio acids or thio esters and sulfonyl azides (referred to as 'sulfo-click'). As used herein, the terms "sulfo-click" and "sulfo-click chemistry" are used to refer to a reaction between thio acids and sulfonyl azides containing molecules, creating a covalent bonds between the two molecules. Examples of sulfo-click chemistry are described in U.S. Patent Application Publication 2011/0130568 and PCT Publication WO 2012/021486. The coupling reaction may include the use of a catalyst, heat, pH buffers, light, or a combination thereof.

The term "alkyl" refers to the radical of saturated aliphatic groups (i.e., an alkane with one hydrogen atom removed), including straight-chain alkyl groups, branched-chain alkyl groups, cycloalkyl (alicyclic) groups, alkyl-substituted cycloalkyl groups, and cycloalkyl-substituted alkyl groups.

In preferred embodiments, a straight chain or branched chain alkyl has 30 or fewer carbon atoms in its backbone (e.g., $C_1$-$C_{30}$ for straight chains, and $C_3$-$C_{30}$ for branched chains), preferably 20 or fewer, more preferably 15 or fewer, most preferably 10 or fewer. Likewise, preferred cycloalkyls have 3-10 carbon atoms in their ring structure, and more preferably have 5, 6, or 7 carbons in the ring structure. The term "alkyl" (or "lower alkyl") as used throughout the specification, examples, and claims is intended to include both "unsubstituted alkyls" and "substituted alkyls", the latter of which refers to alkyl moieties having one or more substituents replacing a hydrogen on one or more carbons of the hydrocarbon backbone. Such substituents include, but are not limited to, halogen, hydroxyl, carbonyl (such as a carboxyl, alkoxycarbonyl, formyl, or an acyl), thiocarbonyl (such as a thioester, a thioacetate, or a thioformate), alkoxyl, phosphoryl, phosphate, phosphonate, phosphinate, amino, amido, amidine, imine, cyano, nitro, azido, sulfhydryl, alkylthio, sulfate, sulfonate, sulfamoyl, sulfonamido, sulfonyl, heterocyclyl, aralkyl, or an aromatic or heteroaromatic moiety.

Unless the number of carbons is otherwise specified, "lower alkyl" as used herein means an alkyl group, as defined above, but having from one to ten carbons, more preferably from one to six carbon atoms in its backbone structure. Likewise, "lower alkenyl" and "lower alkynyl" have similar chain lengths. Throughout the application, preferred alkyl groups are lower alkyls. In preferred embodiments, a substituent designated herein as alkyl is a lower alkyl.

It will be understood by those skilled in the art that the moieties substituted on the hydrocarbon chain can themselves be substituted, if appropriate. For instance, the substituents of a substituted alkyl may include halogen, hydroxy, nitro, thiols, amino, azido, imino, amido, phosphoryl (including phosphonate and phosphinate), sulfonyl (including sulfate, sulfonamido, sulfamoyl and sulfonate), and silyl groups, as well as ethers, alkylthios, carbonyls (including ketones, aldehydes, carboxylates, and esters), —CF$_3$, —CN and the like. Cycloalkyls can be substituted in the same manner.

The term "heteroalkyl", as used herein, refers to straight or branched chain, or cyclic carbon-containing radicals, or combinations thereof, containing at least one heteroatom. Suitable heteroatoms include, but are not limited to, O, N, Si, P, Se, B, and S, wherein the phosphorous and sulfur atoms are optionally oxidized, and the nitrogen heteroatom is optionally quaternized. Heteroalkyls can be substituted as defined above for alkyl groups.

The term "alkylthio" refers to an alkyl group, as defined above, having a sulfur radical attached thereto. In preferred embodiments, the "alkylthio" moiety is represented by one of —S— alkyl, —S-alkenyl, and —S-alkynyl. Representative alkylthio groups include methylthio, ethylthio, and the like. The term "alkylthio" also encompasses cycloalkyl groups, alkene and cycloalkene groups, and alkyne groups. "Arylthio" refers to aryl or heteroaryl groups. Alkylthio groups can be substituted as defined above for alkyl groups.

The terms "alkenyl" and "alkynyl", refer to unsaturated aliphatic groups analogous in length and possible substitution to the alkyls described above, but that contain at least one double or triple bond respectively.

The terms "alkoxyl" or "alkoxy" as used herein refers to an alkyl group, as defined above, having an oxygen radical attached thereto. Representative alkoxyl groups include methoxy, ethoxy, propyloxy, tert-butoxy and the like. An "ether" is two hydrocarbons covalently linked by an oxygen. Accordingly, the substituent of an alkyl that renders that alkyl an ether is or resembles an alkoxyl, such as can be represented by one of —O-alkyl, —O-alkenyl, and —O-alkynyl. The terms "aroxy" and "aryloxy", as used interchangeably herein, can be represented by —O-aryl or O-heteroaryl, wherein aryl and heteroaryl are as defined below. The alkoxy and aroxy groups can be substituted as described above for alkyl.

The terms "amine" and "amino" (and its protonated form) are art-recognized and refer to both unsubstituted and substituted amines, e.g., a moiety that can be represented by the general formula:

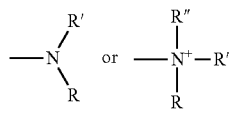

wherein R, R', and R" each independently represent a hydrogen, an alkyl, an alkenyl, —(CH$_2$)$_m$—R$_C$ or R and R' taken together with the N atom to which they are attached complete a heterocycle having from 4 to 8 atoms in the ring structure; R$_C$ represents an aryl, a cycloalkyl, a cycloalkenyl, a heterocycle or a polycycle; and m is zero or an integer in the range of 1 to 8. In preferred embodiments, only one of R or R' can be a carbonyl, e.g., R, R' and the nitrogen together do not form an imide. In still more preferred embodiments, the term "amine" does not encompass amides, e.g., wherein one of R and R' represents a carbonyl. In even more preferred embodiments, R and R' (and optionally R") each independently represent a hydrogen, an alkyl or cycloalkyl, an alkenyl or cycloalkenyl, or alkynyl. Thus, the term "alkylamine" as used herein means an amine group, as defined above, having a substituted (as described above for alkyl) or unsubstituted alkyl attached thereto, i.e., at least one of R and R' is an alkyl group The term "amido" is art-recognized as an amino-substituted carbonyl and includes a moiety that can be represented by the general formula:

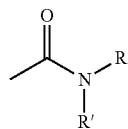

wherein R and R' are as defined above.

"Aryl", as used herein, refers to C$_5$-C$_{10}$-membered aromatic, heterocyclic, fused aromatic, fused heterocyclic, biaromatic, or bihetereocyclic ring systems. Broadly defined, "aryl", as used herein, includes 5-, 6-, 7-, 8-, 9-, and 10-membered single-ring aromatic groups that may include from zero to four heteroatoms, for example, benzene, pyrrole, furan, thiophene, imidazole, oxazole, thiazole, triazole, pyrazole, pyridine, pyrazine, pyridazine, pyrimidine, and the like. Those aryl groups having heteroatoms in the ring structure may also be referred to as "aryl heterocycles" or "heteroaromatics". The aromatic ring can be substituted at one or more ring positions with one or more substituents including, but not limited to, halogen, azide, alkyl, aralkyl, alkenyl, alkynyl, cycloalkyl, hydroxyl, alkoxyl, amino (or quaternized amino), nitro, sulfhydryl, imino, amido, phosphonate, phosphinate, carbonyl, carboxyl, silyl, ether, alkylthio, sulfonyl, sulfonamido, ketone, aldehyde, ester, heterocyclyl, aromatic or heteroaromatic moieties, —CF$_3$, —CN, and combinations thereof.

The term "aryl" also includes polycyclic ring systems having two or more cyclic rings in which two or more carbons are common to two adjoining rings (i.e., "fused rings") wherein at least one of the rings is aromatic, e.g., the other cyclic ring or rings can be cycloalkyls, cycloalkenyls, cycloalkynyls, aryls and/or heterocycles. Examples of heterocyclic rings include, but are not limited to, benzimidazolyl, benzofuranyl, benzothiofuranyl, benzothiophenyl, benzoxazolyl, benzoxazolinyl, benzthiazolyl, benztriazolyl, benztetrazolyl, benzisoxazolyl, benzisothiazolyl, benzimidazolinyl, carbazolyl, 4aH carbazolyl, carbolinyl, chromanyl, chromenyl, cinnolinyl, decahydroquinolinyl, 2H,6H-1, 5,2-dithiazinyl, dihydrofuro[2,3 b]tetrahydrofuran, furanyl, furazanyl, imidazolidinyl, imidazolinyl, imidazolyl, 1H-indazolyl, indolenyl, indolinyl, indolizinyl, indolyl, 3H-indolyl, isatinoyl, isobenzofuranyl, isochromanyl, isoindazolyl, isoindolinyl, isoindolyl, isoquinolinyl, isothiazolyl, isoxazolyl, methylenedioxyphenyl, morpholinyl, naphthyridinyl, octahydroisoquinolinyl, oxadiazolyl, 1,2,3-oxadiazolyl, 1,2, 4-oxadiazolyl, 1,2,5-oxadiazolyl, 1,3,4-oxadiazolyl, oxazolidinyl, oxazolyl, oxindolyl, pyrimidinyl, phenanthridinyl, phenanthrolinyl, phenazinyl, phenothiazinyl, phenoxathinyl, phenoxazinyl, phthalazinyl, piperazinyl, piperidinyl, piperidonyl, 4-piperidonyl, piperonyl, pteridinyl, purinyl, pyranyl, pyrazinyl, pyrazolidinyl, pyrazolinyl, pyrazolyl, pyridazinyl, pyridooxazole, pyridoimidazole, pyridothiazole, pyridinyl, pyridyl, pyrimidinyl, pyrrolidinyl, pyrrolinyl, 2H-pyrrolyl, pyrrolyl, quinazolinyl, quinolinyl, 4H-quinolizinyl, quinoxalinyl, quinuclidinyl, tetrahydrofuranyl, tetrahydroisoquinolinyl, tetrahydroquinolinyl, tetrazolyl, 6H-1,2,5-thiadiazinyl, 1,2,3-thiadiazolyl, 1,2,4-thiadiazolyl, 1,2,5-thiadiazolyl, 1,3,4-thiadiazolyl, thianthrenyl, thiazolyl, thienyl, thienothiazolyl, thienooxazolyl, thienoimidazolyl, thiophenyl, and xanthenyl. One or more of the rings can be substituted as defined above for "aryl".

The term "aralkyl", as used herein, refers to an alkyl group substituted with an aryl group (e.g., an aromatic or heteroaromatic group).

The term "aralkyloxy" can be represented by —O-aralkyl, wherein aralkyl is as defined above.

The term "carbocycle", as used herein, refers to an aromatic or non-aromatic ring(s) in which each atom of the ring(s) is carbon.

"Heterocycle" or "heterocyclic", as used herein, refers to a monocyclic or bicyclic structure containing 3-10 ring atoms, and preferably from 5-6 ring atoms, consisting of carbon and one to four heteroatoms each selected from the group consisting of non-peroxide oxygen, sulfur, and N(Y) wherein Y is absent or is H, O, (C$_1$-C$_{10}$) alkyl, phenyl or benzyl, and optionally containing 1-3 double bonds and optionally substituted with one or more substituents. Examples of heterocyclic rings include, but are not limited to, benzimidazolyl, benzofuranyl, benzothiofuranyl, benzothiophenyl, benzoxazolyl, benzoxazolinyl, benzthiazolyl, benztriazolyl, benztetrazolyl, benzisoxazolyl, benzisothiazolyl, benzimidazolinyl, carbazolyl, 4aH carbazolyl, carbolinyl, chromanyl, chromenyl, cinnolinyl, decahydroquinolinyl, 2H,6H-1,5,2-dithiazinyl, dihydrofuro[2,3 b]tetrahydrofuran, furanyl, furazanyl, imidazolidinyl, imidazolinyl, imidazolyl, 1H-indazolyl, indolenyl, indolinyl, indolizinyl, indolyl, 3H-indolyl, isatinoyl, isobenzofuranyl, isochromanyl, isoindazolyl, isoindolinyl, isoindolyl, isoquinolinyl, isothiazolyl, isoxazolyl, methylenedioxyphenyl, morpholinyl, naphthyridinyl, octahydroisoquinolinyl, oxadiazolyl, 1,2,3-oxadiazolyl, 1,2,4-oxadiazolyl, 1,2,5-oxadiazolyl, 1,3,4-oxadiazolyl, oxazolidinyl, oxazolyl, oxepanyl, oxetanyl, oxindolyl, pyrimidinyl, phenanthridinyl, phenanthrolinyl, phenazinyl, phenothiazinyl, phenoxathinyl, phenoxazinyl, phthalazinyl, piperazinyl, piperidinyl, piperidonyl, 4-piperidonyl, piperonyl, pteridinyl, purinyl, pyranyl, pyrazinyl, pyrazolidinyl, pyrazolinyl, pyrazolyl, pyridazinyl, pyridooxazole, pyridoimidazole, pyridothiazole, pyridinyl, pyridyl, pyrimidinyl, pyrrolidinyl, pyrrolinyl, 2H-pyrrolyl, pyrrolyl, quinazolinyl, quinolinyl, 4H-quinolizinyl, quinoxalinyl, quinuclidinyl, tetrahydrofuranyl, tetrahydroisoquinolinyl, tetrahydropyranyl, tetrahydroquinolinyl, tetrazolyl, 6H-1,2,5-thiadiazinyl, 1,2,3-thiadiazolyl, 1,2,4-thiadiazolyl, 1,2,5-thiadiazolyl, 1,3,4-thiadiazolyl, thianthrenyl, thiazolyl, thienyl, thienothiazolyl, thienooxazolyl, thienoimidazolyl, thiophenyl, and xanthenyl. Heterocyclic groups can optionally be substituted with one or more substituents at one or more positions as defined above for alkyl and aryl, for example, halogen, alkyl, aralkyl, alkenyl, alkynyl, cycloalkyl, hydroxyl, amino, nitro, sulfhydryl, imino, amido, phosphate, phosphonate, phosphinate, carbonyl, carboxyl, silyl, ether, alkylthio, sulfonyl, ketone, aldehyde, ester, a heterocyclyl, an aromatic or heteroaromatic moiety, —$CF_3$, —CN, or the like.

The term "carbonyl" is art-recognized and includes such moieties as can be represented by the general formula:

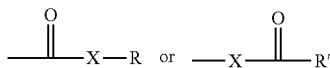

wherein X is a bond or represents an oxygen or a sulfur, and R and R' are as defined above. Where X is an oxygen and R or R' is not hydrogen, the formula represents an "ester". Where X is an oxygen and R is as defined above, the moiety is referred to herein as a carboxyl group, and particularly when R is a hydrogen, the formula represents a "carboxylic acid". Where X is an oxygen and R' is hydrogen, the formula represents a "formate". In general, where the oxygen atom of the above formula is replaced by sulfur, the formula represents a "thiocarbonyl" group. Where X is a sulfur and R or R' is not hydrogen, the formula represents a "thioester." Where X is a sulfur and R is hydrogen, the formula represents a "thiocarboxylic acid." Where X is a sulfur and R' is hydrogen, the formula represents a "thioformate." On the other hand, where X is a bond, and R is not hydrogen, the above formula represents a "ketone" group. Where X is a bond, and R is hydrogen, the above formula represents an "aldehyde" group.

The term "heteroatom" as used herein means an atom of any element other than carbon or hydrogen. Preferred heteroatoms are boron, nitrogen, oxygen, phosphorus, sulfur, and selenium. Other heteroatoms include silicon and arsenic As used herein, the term "nitro" means —$NO_2$; the term "halogen" designates —F, —Cl, —Br, or —I; the term "sulfhydryl" means —SH; the term "hydroxyl" means —OH; and the term "sulfonyl" means —$SO_2$—.

The term "substituted" as used herein, refers to all permissible substituents of the compounds described herein. In the broadest sense, the permissible substituents include acyclic and cyclic, branched and unbranched, carbocyclic and heterocyclic, aromatic and nonaromatic substituents of organic compounds. Illustrative substituents include, but are not limited to, halogens, hydroxyl groups, or any other organic groupings containing any number of carbon atoms, preferably 1-14 carbon atoms, and optionally include one or more heteroatoms such as oxygen, sulfur, or nitrogen grouping in linear, branched, or cyclic structural formats. Representative substituents include alkyl, substituted alkyl, alkenyl, substituted alkenyl, alkynyl, substituted alkynyl, phenyl, substituted phenyl, aryl, substituted aryl, heteroaryl, substituted heteroaryl, halo, hydroxyl, alkoxy, substituted alkoxy, phenoxy, substituted phenoxy, aroxy, substituted aroxy, alkylthio, substituted alkylthio, phenylthio, substituted phenylthio, arylthio, substituted arylthio, cyano, isocyano, substituted isocyano, carbonyl, substituted carbonyl, carboxyl, substituted carboxyl, amino, substituted amino, amido, substituted amido, sulfonyl, substituted sulfonyl, sulfonic acid, phosphoryl, substituted phosphoryl, phosphonyl, substituted phosphonyl, polyaryl, substituted polyaryl, $C_3$-$C_{20}$ cyclic, substituted $C_3$-$C_{20}$ cyclic, heterocyclic, substituted heterocyclic, amino acid, peptide, and polypeptide groups.

Heteroatoms such as nitrogen may have hydrogen substituents and/or any permissible substituents of organic compounds described herein which satisfy the valences of the heteroatoms. It is understood that "substitution" or "substituted" includes the implicit proviso that such substitution is in accordance with permitted valence of the substituted atom and the substituent, and that the substitution results in a stable compound, i.e., a compound that does not spontaneously undergo transformation such as by rearrangement, cyclization, elimination, etc.

Compositions for Binding Contaminants in Water

A variety of compositions are provided that overcome one or more of the aforementioned deficiencies. In some aspects, the compositions can bind one or more contaminants from a source of water, including wastewater, urine, drinking water, sea water, or any other source of water containing contaminants.

The compositions can include a porous organic polymer having a plurality of repeat units and a plurality of pores having a hierarchical pore size distribution over a range of pore sizes. The examples demonstrate that by controlling the structure of the repeat units, the compositions can be made having controllable pore sizes and hierarchical pore size distributions over a range of pore sizes. The pores can have a hierarchical pore size distribution. In some aspects, the range of pore sizes is at least 5 nm, at least 8 nm, or at least 10 nm. In some aspects, the range of pore sizes is about 1 nm to 10 nm, about 1 nm to 8 nm, about 1 nm to 5 nm, or about 5 nm to 10 nm. In some aspects, the hierarchical pore size distribution is determined based upon at least 60% of the pore sizes in the range of pore sizes having a pore volume of at least 0.01 $cm^3$ $g^{-1}$ in the pore size distribution, wherein the pore size distribution is based on a non-local density functional theory model applied to a nitrogen adsorption isotherm for the POP measured at 77 K. In some aspects, the range of pore sizes is about 1 nm to about 10 nm; and at least 80% of the pore sizes in the pore size distribution have a pore volume of at least 0.01 $cm^3$ $g^{-1}$.

The compositions have a plurality of one or more repeat unit structures. In some aspects, in order to bind multiple types of contaminants, multiple different types of repeat units can be included. For example, 2, 3, 4, or more different repeat unit structures can be included in the same composition. In some aspects, the repeat units are overall the same and differ only in that they have different binding moieties attached to the repeat unit. For example, in some aspects, the compositions may include a chloride substituent on some repeat units for binding urea and amine binding moieties for binding an inorganic metal contaminant. In some aspects, the compositions include a first plurality of repeat units and a second plurality of repeat units, wherein the repeat units in the second plurality of repeat units are different from the repeat units in the first plurality of repeat units.

In some aspects, the plurality of repeat units each have a structure according to any one of Formula 1A-Formula 1C

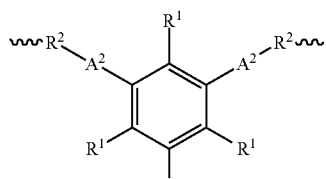

Formula 1A

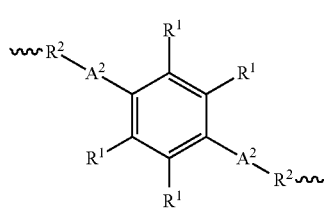

Formula 1B

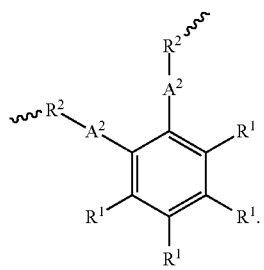

Formula 1C where each occurrence of $R^1$ is independently a hydrogen, a halide, an alkyl or heteroalkyl having 1 to 5, 1 to 3, 2 to 5, or 1 to 4 carbon atoms, or a binding moiety, so long as at least one occurrence of $R^1$ is a binding moiety; wherein each occurrence of the binding moiety is independently selected from the group consisting of a nitro substituent, a thiol substituent, a halide substituent, a conjugate base substituent, an ammonium substituent, a pyridinium substituent, an imidazolium substituent, an a salt thereof; where each occurrence of $R^2$ is independently an alkyl having 1 to 5, 1 to 3, 2 to 5, or 1 to 4 carbon atoms; and where each occurrence of $A^2$ is independently none or a substituted or unsubstituted phenyl.

A variety of binding moieties can be used for binding contaminants in water. In some aspects, the composition is multifunctional including 2, 3, 4, 5, or more different binding moieties. In some aspects, the binding moiety comprises a halide selected from the group consisting of a chloride, a bromide, and an iodide. In some aspects, the binding moiety comprises a conjugate base substituent or a salt thereof, wherein the conjugate base is selected from the group consisting of sulfate and nitrate. In some aspects, the binding moiety comprises an ammonium substituent or a salt thereof, and the ammonium substituent has a structure according to the following formula

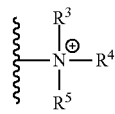

where $R^3$, $R^4$, and $R^5$ are hydrogen; or where $R^3$, $R^4$, and $R^5$ are each independently selected from the group consisting of hydrogen and alkyl, heteroalkyl, and alkoxy having 1 to 5, 1 to 3, 2 to 5, or 1 to 4 carbon atoms; or where $R^4$ is hydrogen, and where $R^3$ and $R^5$ are each independently selected from the group consisting of carboxylic acids having 1 to 7, 2 to 7, 2 to 5, 1 to 5, or 3 to 7 carbon atoms. In some aspects, the binding moiety comprises a thiol substituent having a structure according to the following formula —$R^6SH$, where $R^6$ is selected from the group consisting of none, alky having 1 to 7, 2 to 7, 2 to 5, 1 to 5, or 3 to 7 carbon atoms, heteroalkyl having 1 to 7, 2 to 7, 2 to 5, 1 to 5, or 3 to 7 carbon atoms and alkylthio having 1 to 7, 2 to 7, 2 to 5, 1 to 5, or 3 to 7 carbon atoms. In some aspects, the binding moiety comprises a pyridinium substituent or a salt thereof, where the pyridinium substituent has a structure according to the following formula

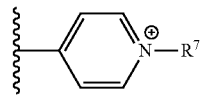

where $R^7$ is selected from the group consisting of hydrogen, alkyl having 1 to 7, 2 to 7, 2 to 5, 1 to 5, or 3 to 7 carbon atoms, and heteroalkyl having 1 to 7, 2 to 7, 2 to 5, 1 to 5, or 3 to 7 carbon atoms. In some aspects, the binding moiety comprises an imidazolium substituent or a salt thereof, where the imidazolium substituent has a structure according to the following formula

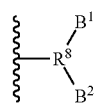

where $R^8$ is an alkyl having 1 to 7, 2 to 7, 2 to 5, 1 to 5, or 3 to 7 carbon atoms or heteroalkyl having 1 to 7, 2 to 7, 2 to 5, 1 to 5, or 3 to 7 carbon atoms; and where $B^1$ and $B^2$ are each independently selected from the group consisting of hydrogen, alkyl, imidazolium, and alkyl imidazolium, so long as at least one occurrence of $B^1$ or $B^2$ is an imidazolium or alkyl imidazolium.

In some aspects, the repeat units in the plurality of repeat units each have a structure according to any one of Formula 2A-Formula 2C where $R^1$ is as defined above.

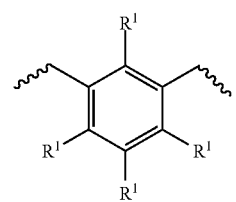

Formula 2A

-continued

Formula 2B

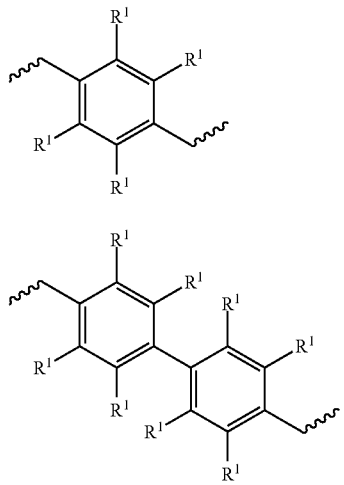

Formula 2C

In some aspects, the repeat units in the plurality of repeat units each have a structure according to any one of Formula 3A-Formula 3C Formula 3A

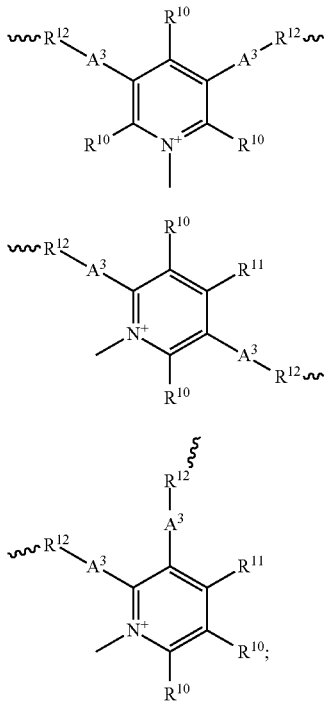

Formula 3B

Formula 3C and
where each occurrence of $R^{10}$ is independently a hydrogen, a halide, or an alkyl or heteroalkyl having 1 to 3 carbon atoms; where each occurrence of $R^{11}$ is independently a hydrogen, $-NH_2$, $-NHR^{13}$, or $-NR^{13}R^{14}$ where each occurrence of $R^{13}$ and $R^{14}$ is independently an alkyl or heteroalkyl having 1 to 3 carbon atoms; where each occurrence of $R^{12}$ is independently an alkyl having 1 to 3 carbon atoms; and where each occurrence of $A^3$ is independently none or a substituted or unsubstituted phenyl.

In some aspects, the repeat units in the plurality of repeat units each have a structure according to any one of Formula 4A-Formula 4C Formula 4A

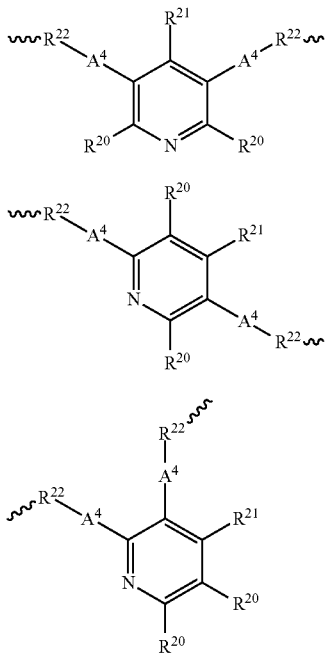

Formula 4B

Formula 4C where each occurrence of $R^{20}$ and $R^{21}$ is independently a hydrogen, a halide, an alkyl or heteroalkyl having 1 to 3 carbon atoms, $-NH_2$, $-NHR^{13}$, or $-NR^{13}R^{14}$ where each occurrence of $R^{13}$ and $R^{14}$ is independently an alkyl or heteroalkyl having 1 to 3 carbon atoms; where each occurrence of $R^{22}$ is independently an alkyl having 1 to 3 carbon atoms; and where each occurrence of $A^4$ is independently none or a substituted or unsubstituted phenyl.

The pores can have a hierarchical pore size distribution. In some aspects, the range of pore sizes is at least 5 nm, at least 8 nm, or at least 10 nm. In some aspects, the range of pore sizes is about 1 nm to 10 nm, about 1 nm to 8 nm, about 1 nm to 5 nm, or about 5 nm to 10 nm. In some aspects, the hierarchical pore size distribution is determined based upon at least 60% of the pore sizes in the range of pore sizes having a pore volume of at least 0.01 cm$^3$ g$^{-1}$ in the pore size distribution, wherein the pore size distribution is based on a non-local density functional theory model applied to a nitrogen adsorption isotherm for the POP measured at 77 K. In some aspects, the range of pore sizes is about 1 nm to about 10 nm; and at least 80% of the pore sizes in the pore size distribution have a pore volume of at least 0.01 cm$^3$ g$^{-1}$.

EXAMPLES

Two classes of POPs: POPs containing a 3D porous architecture and POPs featuring hierarchical porosity will be developed as reversible "nano-traps", and their synthesis will rely on the rational design of modular MBBs that are easily customized in-house to vary it for a range of target contaminants. For heavy metal or anionic metal cluster removal, the modular MBBs can be functionalized with different binding/exchanging sites that have previously shown high affinities towards contaminants as outlined in Table 4.

TABLE 4

Binding mechanism of common inorganic contaminants in water.

| Contaminant | Binding site | Binding Mechanism |
| --- | --- | --- |
| $Hg^{2+}$ | Thiol | Hard-soft acid-base |
| $Pb^{2+}$ | Thiol | Hard-soft acid-base |
| $Cd^{2+}$ | Iminodiacetic acid | Chelation |
| $Cr_2O_7^{2-}$ | Sulfate | Anion exchange |
| $AsO_4^{3-}$ | Chloride | Anion exchange |
| $AsO_3^{3-}$ | Chloride | Anion exchange |

Now having described the embodiments of the present disclosure, in general, the following Examples describe some additional embodiments of the present disclosure. While embodiments of the present disclosure are described in connection with the following examples and the corresponding text and figures, there is no intent to limit embodiments of the present disclosure to this description. On the contrary, the intent is to cover all alternatives, modifications, and equivalents included within the spirit and scope of embodiments of the present disclosure.

Example 1: Synthesis of Sulfuric Acid Functionalized Polymer for Ammonia Recovery

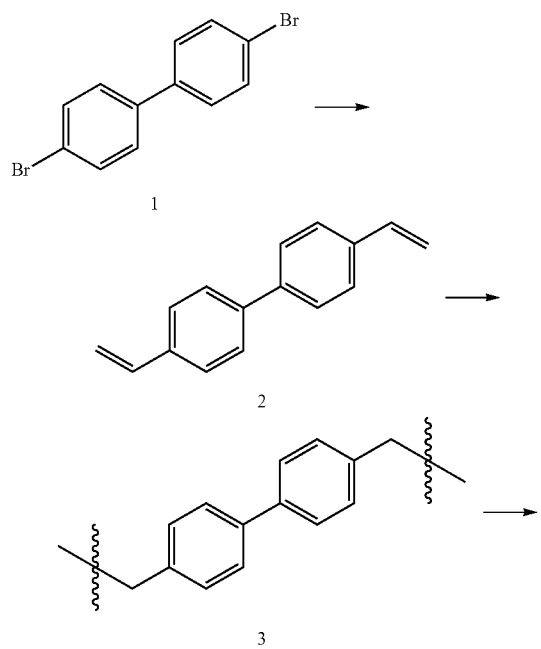

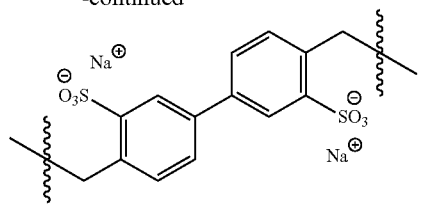

4,4-divinylbiphenyl (2): 1 (3.0 g, 9.6 mmol), potassium vinyltrifluoroborate (3.35 g, 25.1 mmol), $K_2CO_3$ (4 g, 28.9 mmol), and $Pd(PPh_3)_4$ (0.25 g, 0.213 mmol) were dissolved in a mixture of toluene (25 mL), THF (25 mL), and $H_2O$ (10 mL), and the resulting mixture was refluxed at 90° C. under $N_2$ atmosphere for 48 hr. The product was extracted with ethyl acetate, washed with brine, dried over $MgSO_4$, and evaporated under reduced pressure, giving the crude compound which was then purified by flash chromatography with hexane as eluent to afford the title compound as a white powder. $^1$H NMR (400 MHz, dmso-d6) δ 7.65 (d, J=7.6 Hz, 3H), 7.53 (d, J=7.6 Hz, 3H), 6.84-6.66 (m, 1H), 5.85 (d, J=17.7 Hz, 1H), 5.26 (d, J=10.8 Hz, 1H).

Synthesis of polymer (3): 2 (1.0 g) was dissolved in DMF (10 mL), followed by the addition of free radical initiator azobisisobutyronitrile (AIBN, 0.025 g). After stirring at room temperature to achieve homogeneity, the mixture was transferred into a 20 mL autoclave and heated to 100° C. overnight. A white powder was obtained by extracting the DMF solvent with EtOH and drying in a vacuum oven at 50° C. for 12 hr.

Synthesis of polymer (4): 3 (1.0 g) was suspended in 40 mL fuming sulfuric acid while stirring at room temperature for one hour. The temperature was then increased to 50° C. and allowed to stir for 3 days. The product was added to 1 L of ice and the solid was collected by filtration. To exchange with $Na^+$ the solid was stirred in 1 M NaCl solution for two days and then washed with 0.1 M NaOH. The light brown product was obtained after drying in a vacuum oven at 50° C. for 12 hr.

Ammonium ($NH_4^+$) Removal

Kinetic tests. A kinetic test was performed using synthetic hydrolyzed urine at a constant resin dose to determine the equilibrium time. All kinetic tests were conducted at ambient laboratory temperature (approx. 23° C.). 0.05 g of sulfuric acid functionalized polymer was added to clear glass screw thread vials containing 5 mL of synthetic hydrolyzed urine. Samples were mixed on a SK-O180-Pro Digital Orbital Shaker at 200 rpm for 5 min, 30 min, 1 h, 2 h, 6 h, 1 d, and 2 d. The control samples consisted of hydrolyzed urine with no resin and were mixed for the maximum duration of the experiment. Samples were filtered immediately after mixing using 0.45 μm filters (Whatman® membrane) to separate resin from solution, and the filtrates were analyzed by Timeberline-2800 ammonia & nitrate analyzer for the remaining $NH_4^+$ concentration.

Equilibrium tests. Equilibrium tests were performed using synthetic hydrolyzed urine at several resin doses. All equilibrium tests were conducted at ambient laboratory temperature (approx. 23° C.). Samples were mixed for 6 hours on a SK-O180-Pro Digital Orbital Shaker at 200 rpm. 0.1 g, 0.15 g, 0.2 g, 0.25 g and 0.3 g of sulfuric acid functionalized polymer was added to clear glass screw thread vials containing 5 mL of a synthetic hydrolyzed urine. Samples were run in triplicate with control samples (no resin) for hydrolyzed urine. Samples were filtered immediately after mixing using 0.45 μm filters (Whatman® membrane) to separate resin from solution, and the filtrates were analyzed by Timeberline-2800 ammonia & nitrate analyzer for the remaining $NH_4^+$ concentration.

Sorption models. The amount of sorption at time t, $q_t$ (mg $NH_4^+$/g), was calculated using Equation 10:

$$q_t = \frac{(c_0 - c_t) \cdot V}{m} \qquad (10)$$

where $c_0$ and $c_t$ represent the initial and equilibrium concentration of ammonium ion in aqueous solution (mg $NH_4^+$/L); V is the volume of the ammonium solution (L) and m is the amount of adsorbent (g). Pseudo-second-order model were used to describe the kinetic data, and the Langmuir isotherm model was used to describe the equilibrium data.

Results

Figure 3:
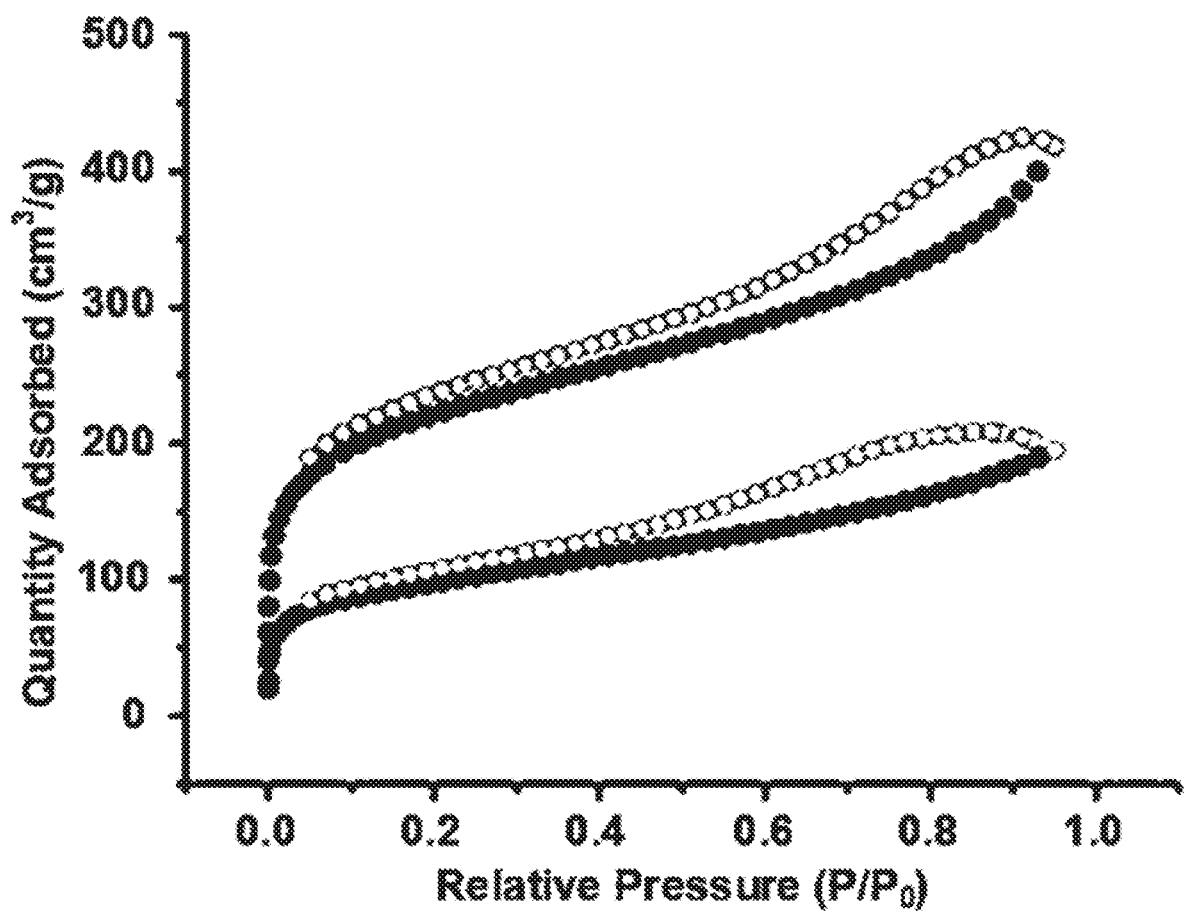
FIG. 3 shows $N_2$ sorption isotherms for polymers 3 and 4 from Example 1 with Brunauer-Emmett-Teller (BET) surface areas of 770 and 340 $m^2$/g, respectively.
Figure 4:
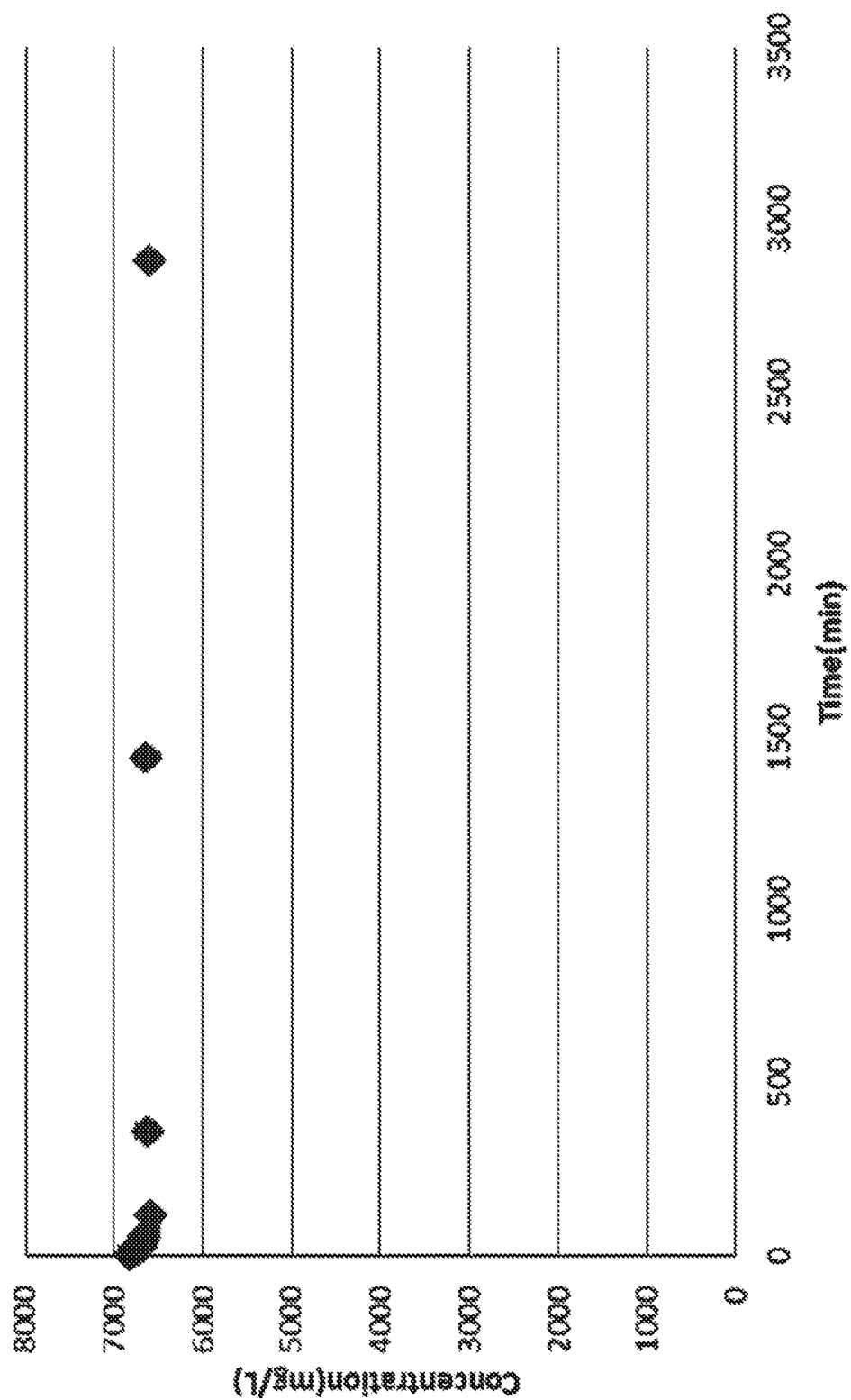
FIG. 4 shows batch kinetic tests showing $NH_4^+$ concentration flowing contact time (Steady-state removal from 2 h to 6 h).
Figure 5:
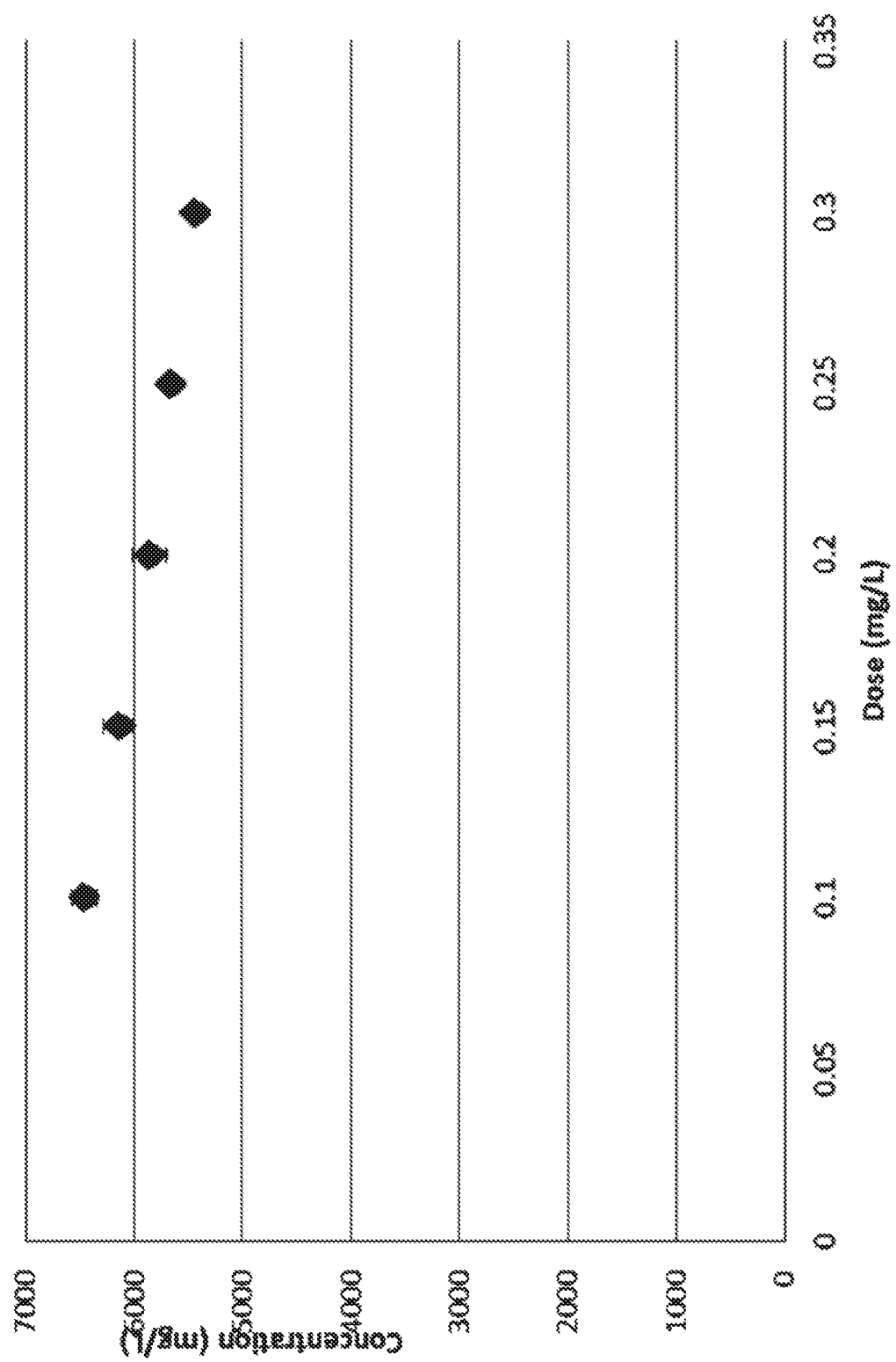
FIG. 5 shows equilibrium kinetic tests showing $NH_4+$ concentration flowing treatment with various dose.
Figure 6:
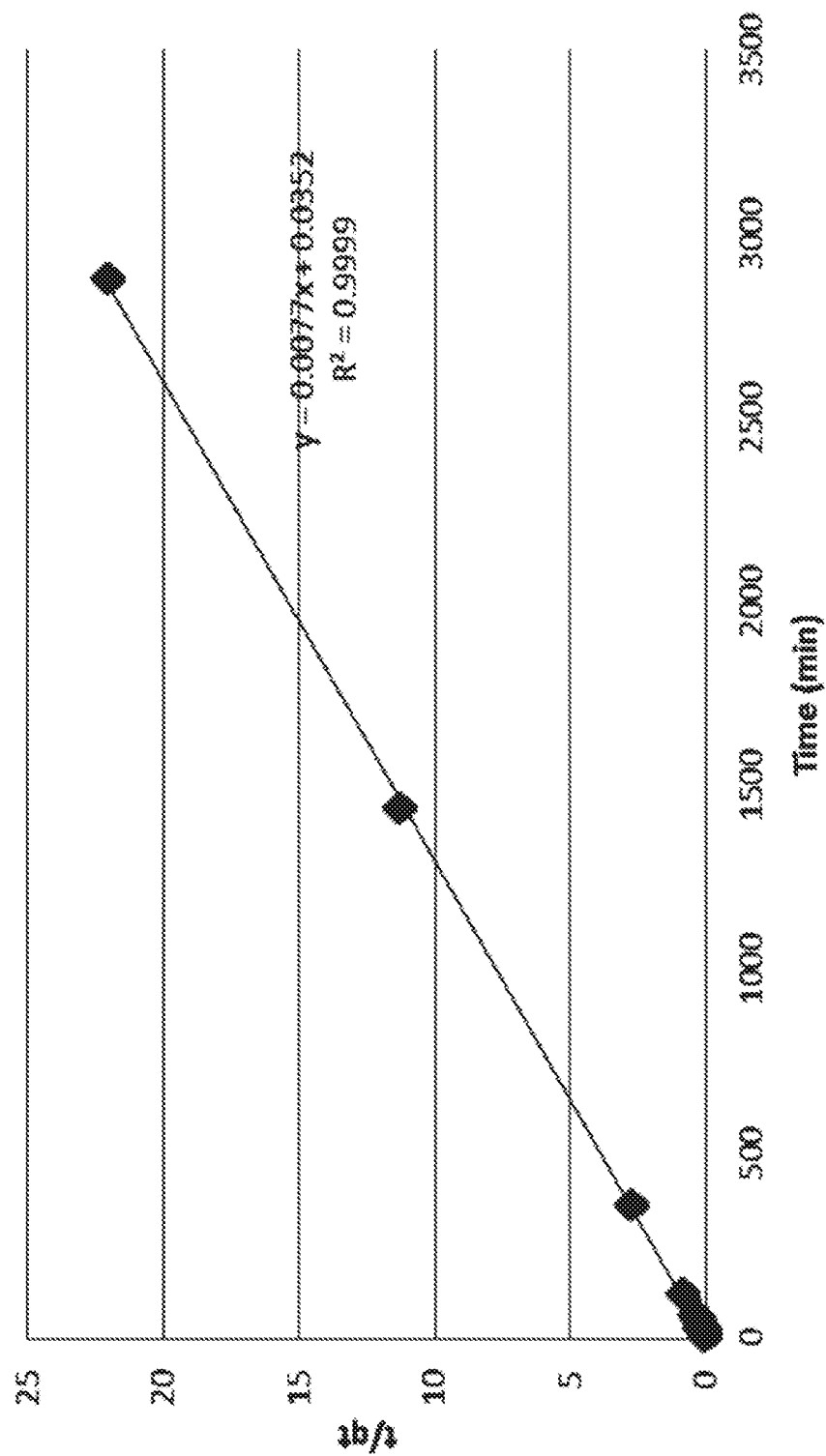
FIG. 6 shows kinetic modeling of $NH_4+$ sorption from hydrolyzed urine to adsorbent (Pseudo-second-order model fit). Experimental data from FIG. 4.
Figure 7:
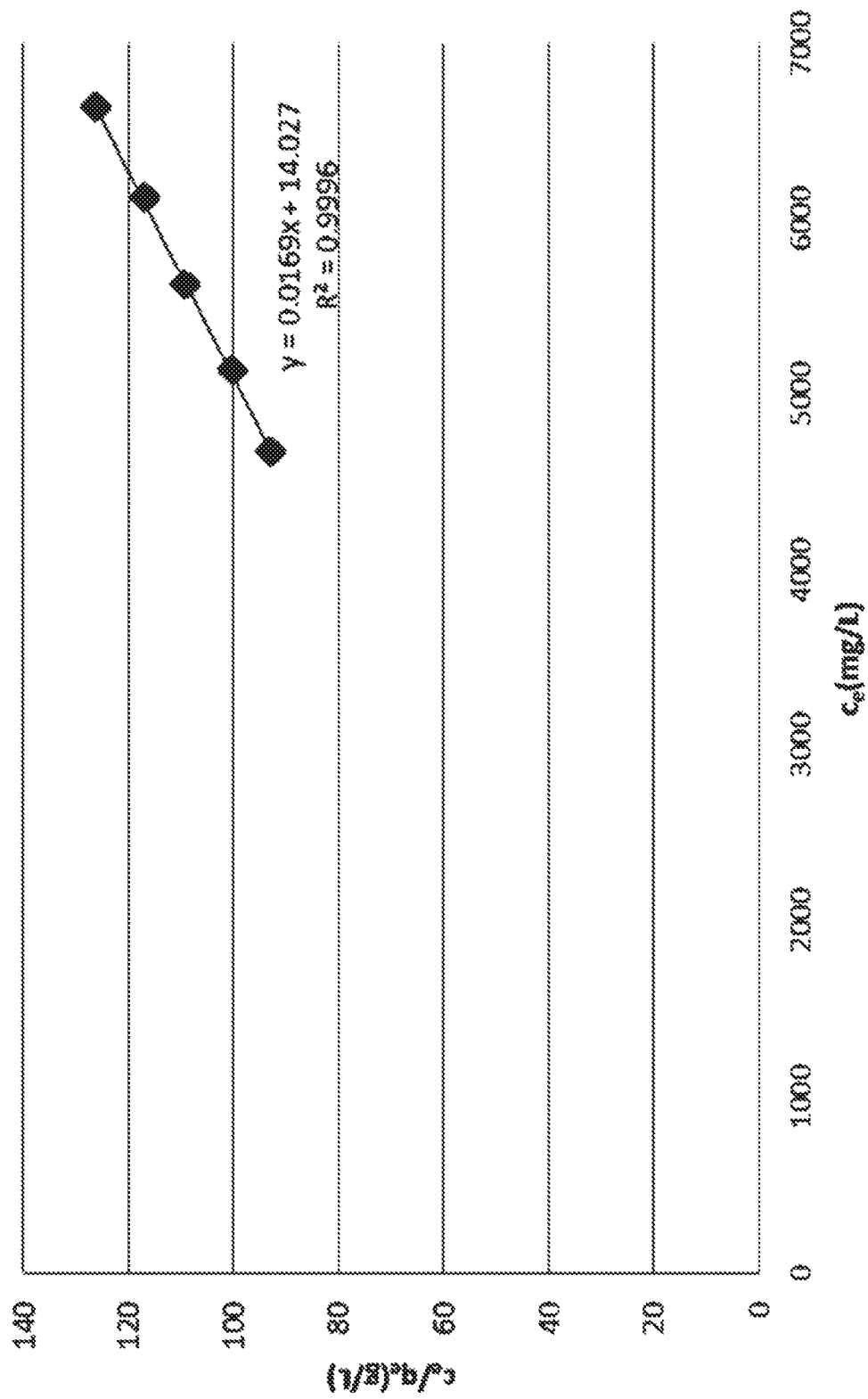
FIG. 7 shows equilibrium modeling of $NH_4+$ sorption from hydrolyzed urine to adsorbent (Langmuir model fit). Experimental data from FIG. 5.

FIG. 3 shows $N_2$ sorption isotherms for polymers 3 and 4 with Brunauer-Emmett-Teller (BET) surface areas of 770 and 340 $m^2$/g, respectively FIG. 4 shows batch kinetic tests showing $NH_4^+$ concentration flowing contact time (Steady-state removal from 2 h to 6 h). FIG. 5 shows equilibrium kinetic tests showing $NH_4^+$ concentration flowing treatment with various dose. FIG. 6 shows kinetic modeling of $NH_4^+$ sorption from hydrolyzed urine to adsorbent (Pseudo-second-order model fit). Experimental data from FIG. 4. FIG. 7 shows equilibrium modeling of $NH_4^+$ sorption from hydrolyzed urine to adsorbent (Langmuir model fit). Experimental data from FIG. 5.

Figure 2:
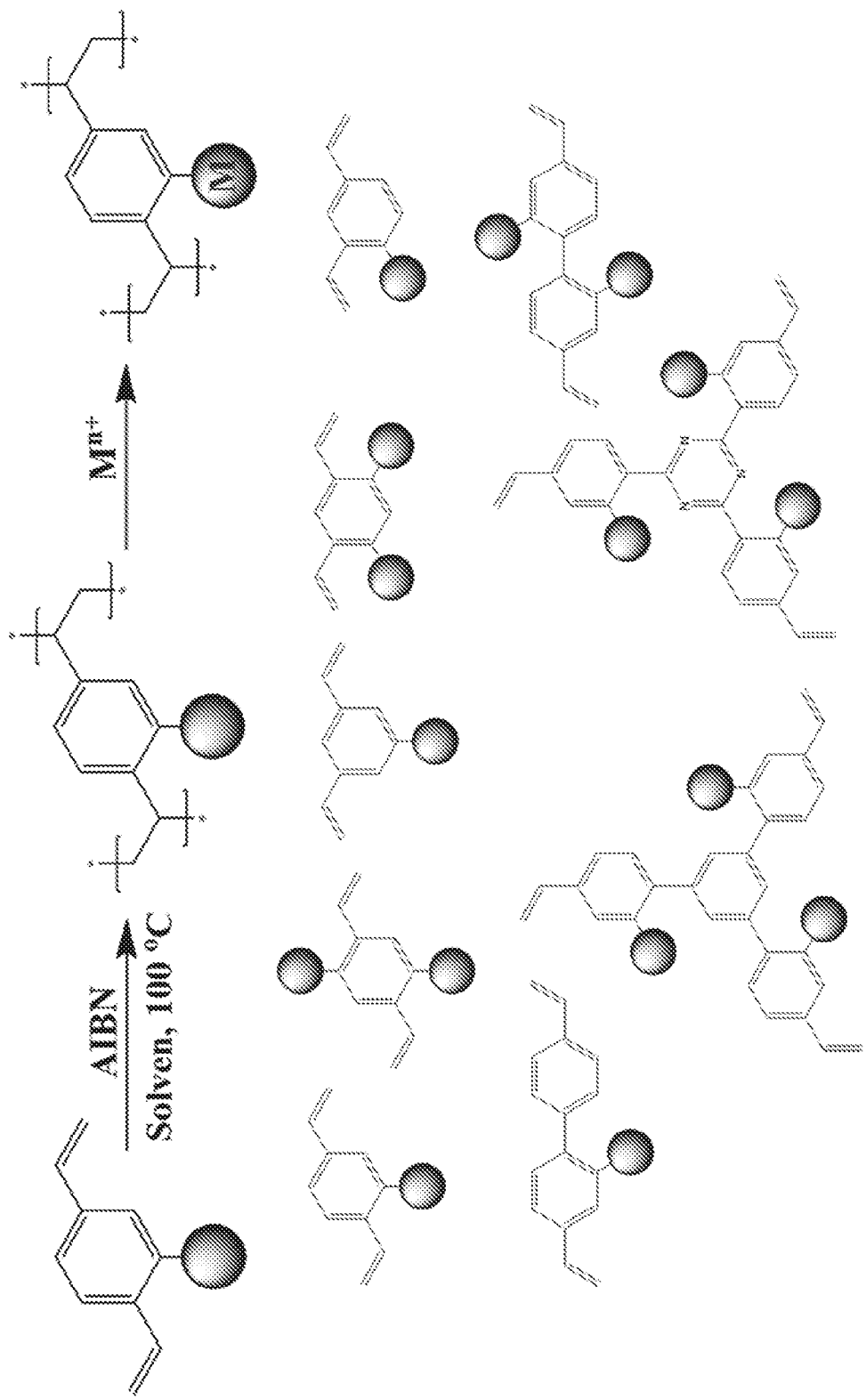
FIG. 2 shows the general reaction conditions to synthesize POPs and post modify the POP with metal cations.

Example 2: Efficient Nutrient Recover from Urine to Prevent Downstream Wastewater Treatment Costs and the Resell of Valuable Commodities Materials Design and Synthesis:

We will explore the use of hierarchical porous materials (i.e. existence of micropores (≤2 nm), mesopores (between 2 and 50 nm) and macropores (>50 nm)) where the micropores will serve as "nano-traps" to adsorb nutrients, while the larger pores allow for a high flux. We will use free-radical polymerization reactions between functionalized molecular building blocks (MBBs) as shown in FIG. 2 to synthesize the porous organic polymers (POPs). It has been shown that hierarchical porous structures facilitate the diffusion of reactants thereby enhancing the catalysis performances as demonstrated in hierarchical porous zeolites (54) and also in our recent work of constructing a hierarchical porous ionic organic polymer for heterogeneous phase transfer catalysis. (55) Therefore, we envision that the creation of hierarchical porosity into the POP-based reversible "nano-traps" will greatly accelerate the mass transfer of the nutrients thereby further improving its efficiency. On the basis of our recent success in constructing hierarchical porous POPs,(55, 56) we will use solvothermal free-radical polymerization reactions which afford higher yields than coupling reactions, to selectively cross-link molecular building blocks, MBBs, with vinyl-functionalized moieties to form POP-based reversible "nano-traps" with hierarchical porosity that contain a high density of nutrient binding functional groups. The functional group attachment will occur either prior or post polymerization and functionalization with metal ions will occur in a post synthetic step after polymerization. FIG. 2 outlines the general procedure in acquiring POPs for nutrient recovery from urine.

Characterizations:

To reveal the local structures of the constructed POP-based reversible "nano-traps", we will first perform solid-state NMR, FTIR and UV-Vis studies. Based on their structural models designed and built in structure modeling software, we will collect, compare and analyze powder X-ray diffraction (PXRD) and small-angle X-ray scattering/diffraction (SAXS/D) patterns for the POP materials using equipment available in the PI's lab and with equipment from the Engineering and Physics departments at USF. Elemental analysis will also be performed to determine the resulting chemical makeup of the POPs for its carbon, hydrogen, nitrogen, and metal composition by X-ray photoelectron spectroscopy, CHNS combustion analyzer, and ICP-MS. These combined studies will allow for full material characterization and to quantify the amount of binding/exchanging groups in our POP-based reversible "nano-traps".

The POPs, and their post-synthetic modification, surface areas and pore size distributions will be examined using a surface area and pore volume analyzers in the PI's lab. The measured surface areas and pore size distributions will also be compared with those calculated from structural models describing the interior of the materials.

To study their thermal stability and framework robustness, thermal gravimetric analysis (TGA) will be performed on the fresh and activated samples using our TGA instrument. Their water/chemical stabilities will be investigated by exposing the samples to boiling water and acidic and basic solutions, which will be followed by the characterization techniques mentioned above. Simulated durability experiments will be conducted by exposing the POPs to high humidity for a period of six months (simulated storage lifetime), which will be followed up by the characterization techniques mentioned above and adsorption experiments. Polymer swelling will be evaluated by the change in material geometry and its change in weight.

Urea and Phosphate Testing:

Initial evaluation of 15 POPs will undergo urea and phosphate adsorption testing. The concentration of urea and phosphate in synthetic human urine is equal to 25.0 g/L (416 mM) and 2.8 g/L (16 mM), respectively. Solutions will be prepared in pure water (Millipore) to the exact concentration and its pH will be adjusted for fresh urine (5.6≤pH≤6.8) using HCl or NaOH (1 M). Batch equilibrium tests will be performed in amber bottles containing 100 mL of the stock solution and varying amounts of the POPs will be added to the stock solutions and shaken at 200 rpm for 2 h (time required for equilibrium to be reached) (57). These tests will be run in triplicate with control samples (no POPs added) for the stock solution. The sample aliquots are collected and urea and phosphate concentrations will be measured. Urea concentrations will be determined by ammonium ($NH_4^+$) analysis after samples added with urease in order to convert urea nitrogen into $NH_4^+$. (58) Ammonium and phosphate concentrations will be analyzed according to the Timberline method (USEPA ATP No. N08-0004) and the Ascorbic acid method 4500-P, respectively (APPHA et al., 2012).(59) Additional equilibrium tests will be conducted with varying the experimental conditions for pH and temperature. Three temperature settings will be used and they include 32° C., 37° C., and 42° C., which span ±5° C. from body temperature. The pH values will begin at 5.6 and increase by 0.3 pH units.

Synthetic Urine Testing:

The standard solutions for the synthetic fresh urine testing is based on Griffith et al. account from 1976 and modified by Torzewska et al.(60, 61) The composition we will use is listed in Table 1. Similar to the urea and phosphate tests, the batch equilibrium tests will be performed using synthetic urine. Both pH and temperature will be evaluated and repeated in triplicate for data collection from the top 5 performing POPs from the first round of nutrient recovery testing. The kinetic experiments will also be conducted at a constant POPs dose to determine the equilibrium time. The samples will be taken at pre-determined time intervals including equilibrium time.

Human Urine Testing:

Human urine will be collected from healthy male and female individuals aged between 18 and 40. Gathered urine will be mixed prior to its evaluation on the three best performing POPs from the synthetic urine testing. Urine will sit for no longer than 2 hours and be maintained at 37° C. prior to nutrient recovery testing. Temperature and pH will not be altered in this final round of testing, but will be monitored before and after the experiment. Both equilibrium tests and kinetic experiments will be performed for human urine to investigate the impact of other constituents in real human urine on the adsorption of urea and phosphate to the POPs.

Regeneration:

A regenerate solution will be developed to disrupt the hydrogen bonds and coordinate covalent bond with the nutrients. We will alter the pH of the regenerative solution to capitalize on the functional groups' pKa constants, thus disrupt interactions with the bound nutrients. The POPs saturated during the batch equilibrium test will be mixed with the regeneration solution for 2 h. The regeneration solution will be analyzed for urea and phosphate to determine the amount of nutrient desorbed from the POPs (mass balance). Then the POPs will be reevaluated with the same characterization techniques used after the initial POP synthesis. A minimum of 10 regeneration/recycling experiments will be performed and compared with the original adsorption properties.

Analysis and Reporting:

The POP materials will be exposed to controlled analytes under laboratory conditions. Batch experiments will be designed to test the efficiencies and effectiveness to remove nutrients from water and urea at different nutrient concentrations and temperatures. Control experiments will also be conducted on benchmark activated carbons, clays, zeolites, and ion-exchange resins to set a base line to compare our POP-based reversible "nano-traps". Researcher's handling urine will follow and obey all safety and health regulations and all hazardous waste will be disposed properly by the PI's institute.

Analysis of Performance Metrics for Nutrient Removal:

To assess the performances of the POPs on individual nutrients, the adsorption data will be analyzed for its kinetic and thermodynamic properties (Table 2). The amount of nutrient adsorbed by the POPs will be calculated using equation 1. The distribution coefficient, $K_d$ will be calculated by equation 2 and the POPs removal efficiency, removal %, will be calculated from equation 3. To determine the maximum uptake capacity for a single nutrient we will use the Langmuir model, equation 4, or Langmuir-Freundlich, equation 5, which will be used to determine how many binding sites were utilized when nutrients are adsorbed. To understand the adsorption kinetics of the POP-based reversible "nano-traps," the adsorption process will use semi-empirical kinetic models of the pseudo-first- or pseudo-second-order, equations 6 and 7, respectively. Thermodynamic properties will be gathered and evaluated using equations 8 and 9. To guide the design of scale-up columns, the modeling framework integrating ion exchange and resin regeneration developed by co-PI Zhang's research group will be used to simulate the performance of ion exchange and regeneration processes using the isotherm and kinetic data obtained from the batch experiments.(62)

Breakthrough Experiments and Scale-Up Tests:

The POP materials showing very high adsorption capacity, fast kinetics, and high selectivity of target nutrients in the batch tests will be selected for breakthrough evaluation on the removal of individual nutrients and human urine for comparison. The breakthrough experiments will be conducted using a programmable syringe pump, of which the syringe will be packed with 0.5 g to 1 g of POP material. The top candidate from the lab scale breakthrough evaluations will be scaled up to an adapter that is similar as activated carbon filters used in water pitchers at household level. Synthetic fresh urine (220 mL) will be added to the adapter over a 15-second time interval to simulate an urination event. The effluent from the adapter after each urination event will be collected and the concentration of urea and phosphate will be measured. The number of urination events will be determined until the column is fully saturated. The data will feed into the modeling framework mentioned above to modify the design of the adapter. Such an adaptor can be designed to be placed within a toilet/urinal and can be produced by 3D printing.

TABLE 1

Characteristics of synthetic urine

| Composition | Amount (g/L) |
|---|---|
| $CaCl_2 \cdot 2H_2O$ | 0.65 |
| $MgCl_2 \cdot 6H_2O$ | 0.651 |
| NaCl | 4.6 |
| $Na_2SO_4$ | 2.3 |
| $Na_3CH_8O_7 \cdot 2H_2O$ | 0.65 |
| $Na_2C_2O_4$ | 0.020 |
| $KH_2PO_4$ | 2.8 |
| KCl | 1.6 |
| $NH_4Cl$ | 1.0 |
| $C_4H_7N_3O$ | 1.1 |
| Urea | 25.0 |
| Tryptic soy broth | 10.0 |

TABLE 2

Equations list for performance

| Equation | Formula* |
|---|---|
| 1 | $q_e = (C_0 - C_e) \times \dfrac{V}{m}$ |
| 2 | $K_d = \dfrac{C_0 - C_e}{C_e} \times V/m$ |
| 3 | $\% \text{ removal} = \dfrac{C_0 - C_e}{C_0} \times 100$ |
| 4 | $\dfrac{C_e}{q_e} = \dfrac{C_e}{q_{max}} + \dfrac{1}{K_L q_{max}}$ |
| 5 | $q = \dfrac{Q_m (K_a C_e)^h}{(K_a C_e)^h + 1}$ |
| 6 | $\dfrac{dn}{dt} = k_1 \times (n_e - n)$ |

TABLE 2-continued

Equations list for performance

| Equation | Formula* |
|---|---|
| 7 | $\frac{dn}{dt} = k_2 \times (n_e - n)^2$ |
| 8 | $\ln Kd = \frac{\Delta S^0_{ads}}{R} - \frac{\Delta H^0_{ads}}{RT}$ |
| 9 | $\Delta G_{ads}^0 = \Delta H_{ads}^0 - T\Delta S_{ads}^0$ |

*adsorption capacity, $q_e$; initial concentration, $C_0$; equilibrium concentration, $C_e$; volume, V; mass, m; distribution coefficient, $K_d$; maximum adsorption capacity, $q_{max}$; Langmuir adsorption constant, $K_L$; adsorption capacity, $Q_m$; affinity constant, $K_a$; index of heterogeneity, h; $1^{st}$ order rate constant, $k_1$; $2^{nd}$ order rate constant, $k_2$; amount adsorbed at specified time, n; amount adsorbed at equilibrium, $n_e$; time, t; entropy, S; enthalpy, H; ideal gas constant, R; temperature, T; Gibbs free energy, G.

Figure 8A:
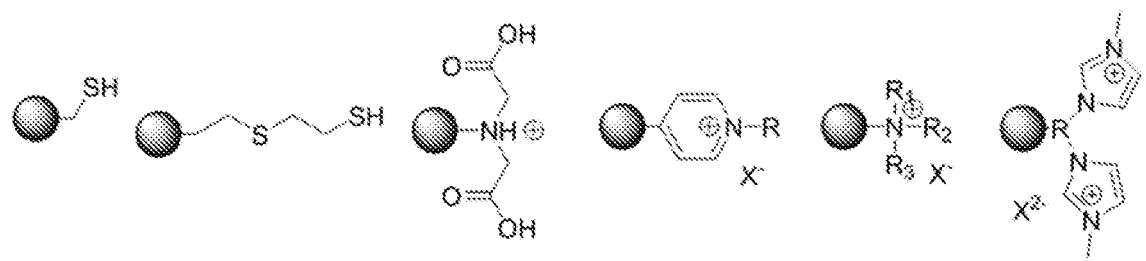
FIGS. 8A-8C show depictions of the (FIG. 8A) functional groups and the general reaction for (FIG. 8B) homo/hetero-coupling reaction and (FIG. 8C) free-radical polymerization. Y and Z represent leaving groups, R represents hydrocarbons, $X^-/2^-$ represent counter ions, and the spheres represent functional group attachment points. AIBN, azobisisobutyronitrile is a radical initiator.
Figure 8B:
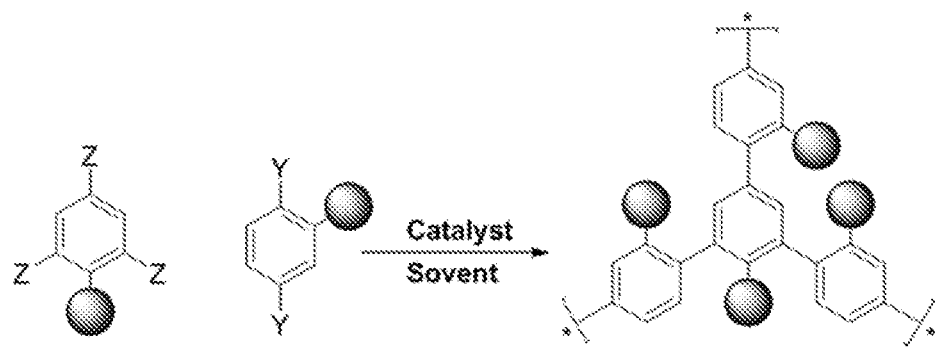
Figure 8C:
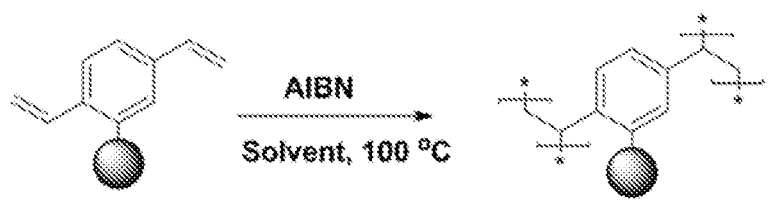
Figure 9:
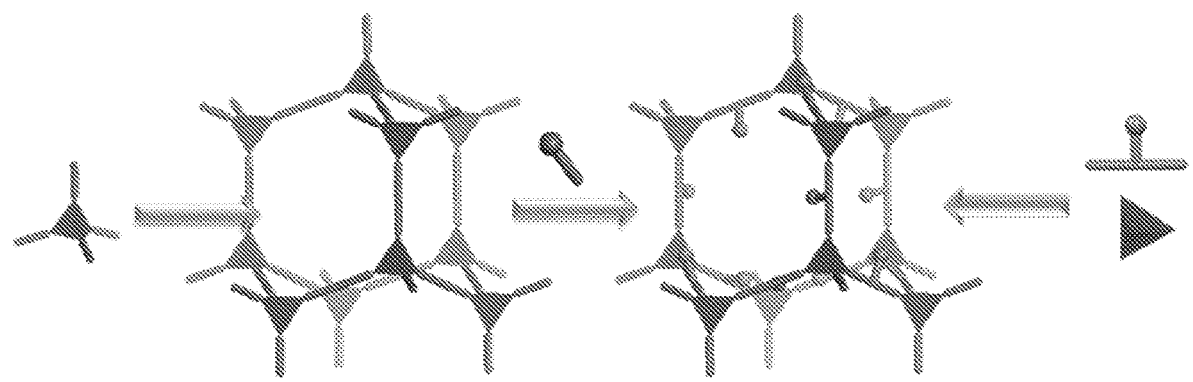
FIG. 9 shows a graphical representation for the assembly of dia-topology POPs, from homo-coupling reactions of tetrahedral MBBs followed by PSM and the hetero-coupling reaction between tetrahedral MBBs with functionalized linear linker.
Figure 10:
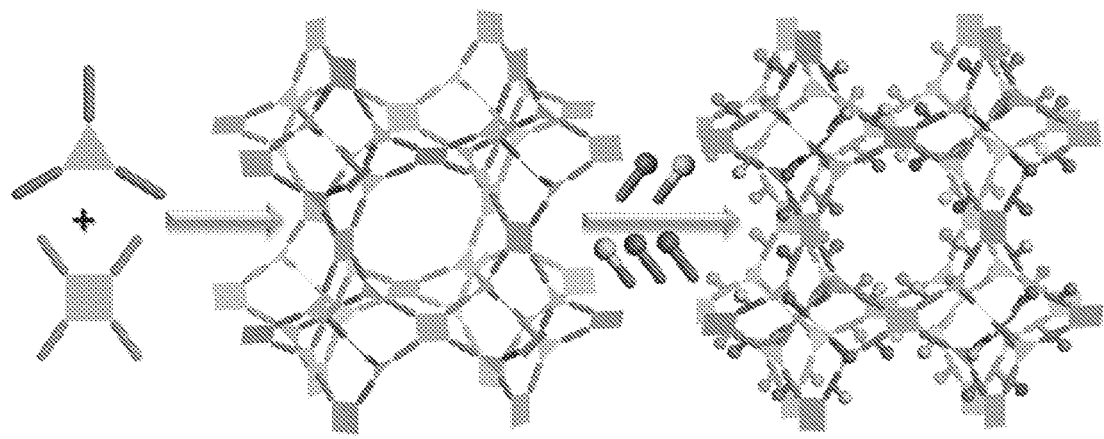
FIG. 10 shows a graphical representation for the assembly of tbo-topology POPs, from hetro-coupling reactions of square and triangular MBBs followed by PSM.
Figure 11:
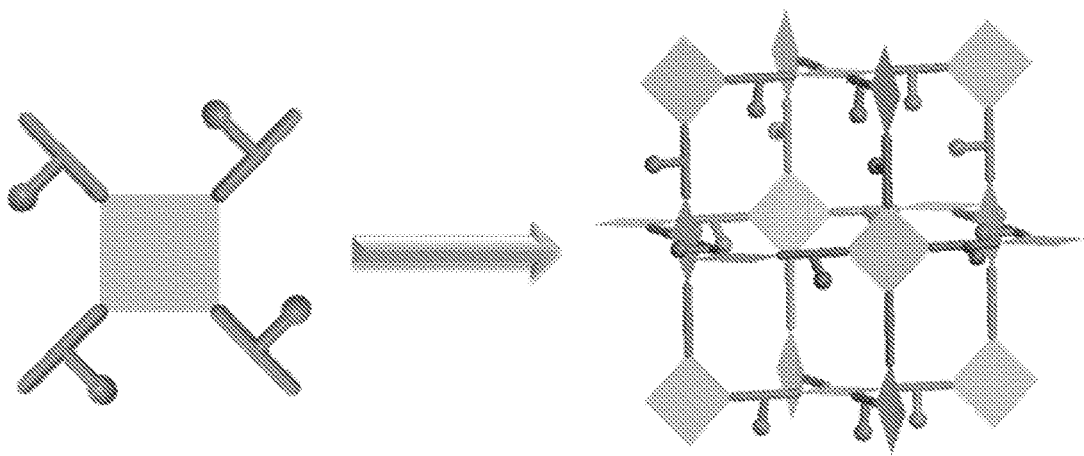
FIG. 11 shows a graphical representation for the assembly of nbo-topology POPs, from homo-coupling reactions of functionalized square MBBs.
Figures 12A, 12B, 12C, 12D:
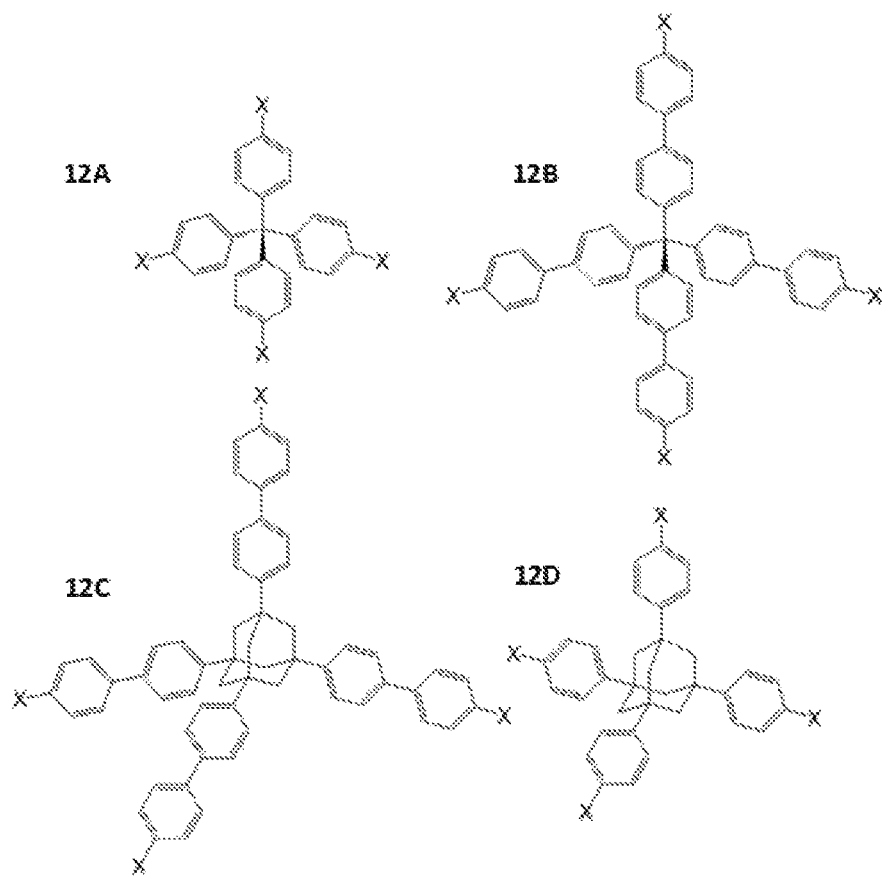
FIGS. 12A-12L show representative (FIG. 12A-12D) tetrahedral, (FIG. 12E-12H) square, (FIG. 12I-12L) trigonal molecular building blocks for the construction of dia-, nbo-, and tbo-topology POPs.
Figures 12E, 12F, 12G, 12H:
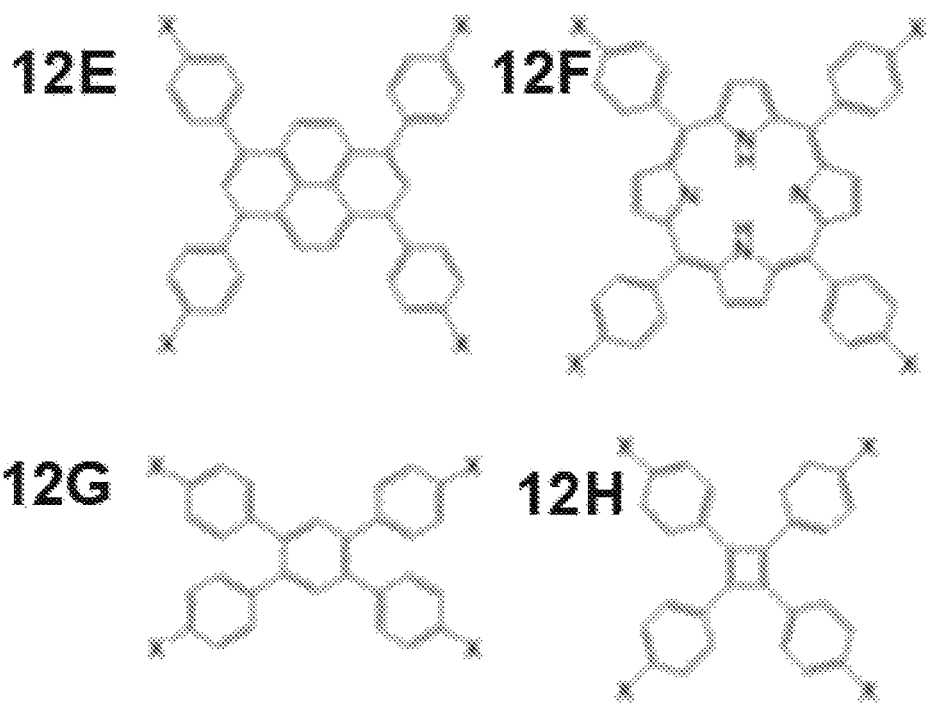
Figures 12I, 12J, 12K, 12L:
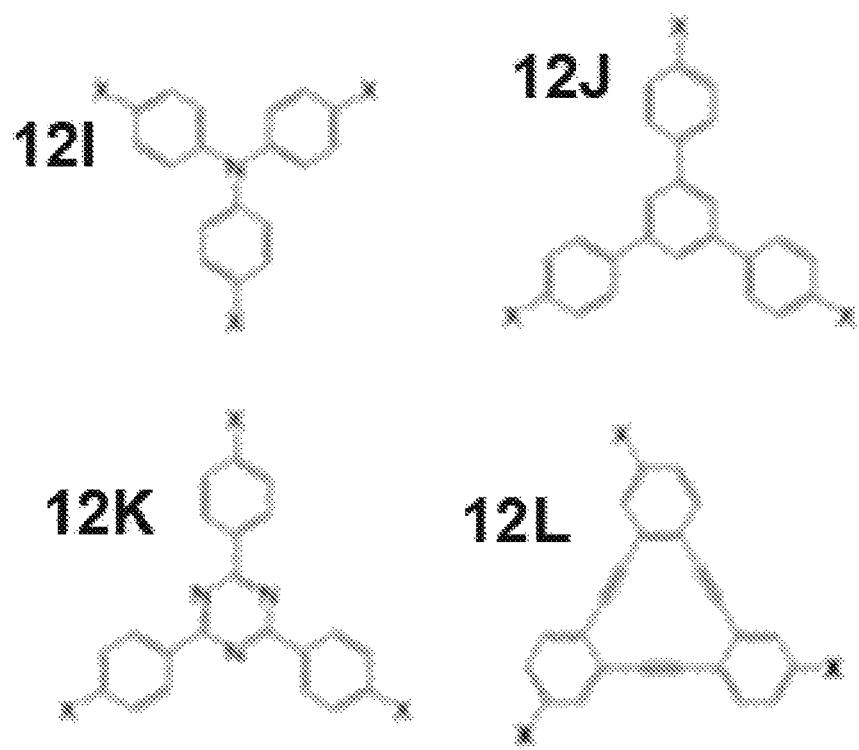

Example 3: Design and Construction of Functional POPs Containing a 3D Porous Architecture Considering their exceptionally high surface areas and tunable pore sizes, we will concentrate on rational design and synthesis of three families of POP "platforms": dia (diamond)-topology POPs, tbo (twisted boroncite)-topology POPs, and nbo (niobium oxide)-topology POPs under the guidance of "crystal engineering", which represents a useful and effective approach to build extended networks with targeted topologies and desired properties as well demonstrated in the MOF area. The 3D porous architectures of these three families of POP platforms will allow multiple entrance points for contaminants to reach the active sites "nano-traps" thus increasing its efficiency if pores become blocked.

dia-topology POP-based reversible "nano-traps": Crystal engineering strategies apply for the design of dia-topology networks which require solely tetrahedral organic MBBs for their synthesis or a combination of tetrahedral MBBs and linear linkers as shown in FIG. 9. We will use the Yamamoto homo-coupling reaction to link bromophenylethenyl terminated tetrahedral MBBs and hetero-coupling reactions (Suzuki, Negishi) to join linear linkers and tetrahedral MBBs. The pore size and chemistry of dia-topology POPs will be systematically altered using a series of modifiable moieties as shown in FIGS. 12A-12D. The binding or exchanging sites through the aforementioned functional groups (FIG. 8A) for target contaminants will be added before or after synthesis of the POPs to afford dia-topology POP-based reversible "nano-traps".

tbo-topology POP-based reversible "nano-traps": Under the guidance of "crystal engineering", cross-linking the triangular MBB with the square planar MBB would afford a tbo-topology network (FIG. 10) as exemplified by the prototype MOF of HKUST-1 that consists of polyhedral cages. The tbo-topology POP will be targeted through the cross coupling reaction of the triangular functional organic MBB and the square planar functional organic MBB. A series of custom designed square or triangular MBBS are shown in FIGS. 12E-12L, and can be combined together to alter the pore size and chemistry. The tbo-topology POP-based reversible "nano-traps" will be achieved by grafting the aforementioned functional groups (FIG. 8A) for target contaminants before or after synthesis of the POPs.

nbo-topology POP-based reversible "nano-traps": According to the principle of "crystal engineering", nbo-topology networks can be designed by linking square MBBs at perpendicular angles as shown in FIG. 11. Using square MBBs from the tbo networks they can be joined with linear linkers that rotate the plane between square MBBs by 90° as shown in FIG. 12G. Similar to dia-topology and tbo-topology POP-based reversible "nano-traps", the aforementioned functional groups (FIG. 8A) for target contaminants can be added pre or post-synthesis to afford functionalized nbo-topology POPs as reversible "nano-traps". The combination of squares and twisted linear linkers will alter the pore size and chemical recognition groups within the nbo-topology POPs.

Example 4: Design and Synthesis of Functional POPs Featuring Hierarchical Porosity 3.1.2 Design and Synthesis of Functional POPs Featuring Hierarchical Porosity.

Figure 13:
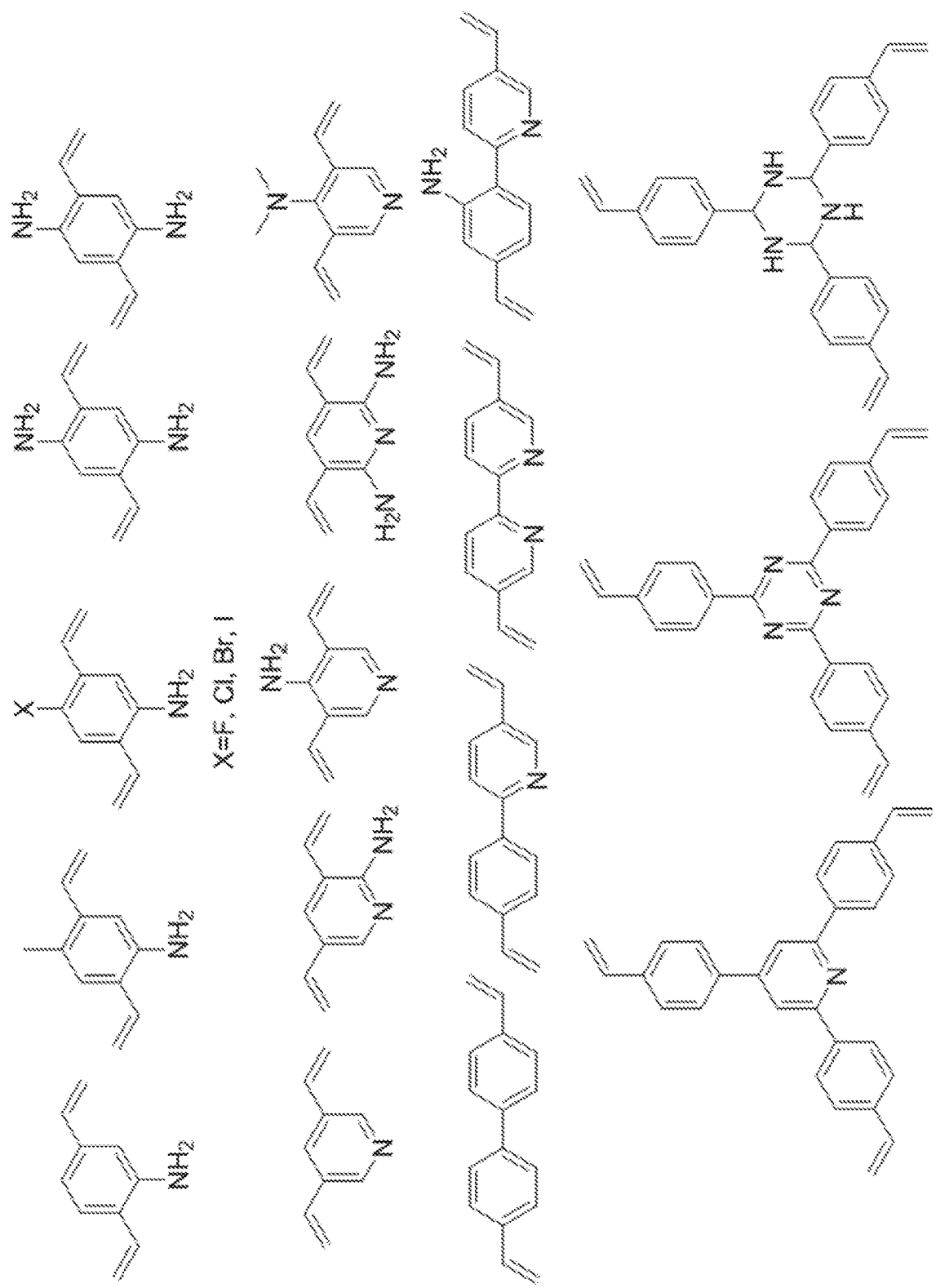
FIG. 13 shows molecular building blocks for the synthesis of functional POPs with hierarchical porosity.

It has been shown that hierarchical porous structure (i.e. existence of both micropores and mesopores) can facilitate the diffusion of reactants thereby enhancing the catalysis performances as demonstrated in hierarchical porous zeolites and also our recent work of constructing a hierarchical porous ionic organic polymer for heterogeneous phase transfer catalysis. Therefore, we envision that the creation of hierarchical porosity into the POP-based reversible "nano-traps" will greatly accelerate the mass transfer of the contaminants thereby further improving the decontamination efficiency. On the basis of our recent success in constructing hierarchical porous POPs, we will use solvothermal free-radical polymerization reactions which afford higher yields than coupling reactions, to selectively cross-link MBBs with vinyl-functionalized moieties to form POP-based reversible "nano-traps" with hierarchical porosity that contain a high density of contaminant binding functional groups. We have achieved control over the porosity (surface area and pore size) by controlling the synthetic conditions during polymerization. As shown in FIG. 13 the MBBs contain vinyl moieties and the decontaminating group can be included prior to synthesis or added or post-synthetically.

3.1.3 Post-Synthetic Modification Procedure.

The pore sizes of POP platforms can easily be varied during its synthesis from the starting materials, but its chemical functionality may inhibit the overall synthesis. Using post-synthetic modification (PSM) procedures, the chemical functionality specific for contaminants will be included. The same techniques to modify the MBB prior to POP syntheses will be used. This method allows a library of materials to be synthesized quickly to evaluate structure-function properties to adsorb target contaminants.

3.1.4 Characterizations of POP-Based Reversible "Nano-Trap" Platforms.

To reveal the local structures of the constructed POP-based reversible "nano-traps", we will first perform solid-state NMR studies. Based on their structural models designed and built in structure modeling software, we will collect, compare and analyze powder X-ray diffraction and small-angle X-ray scattering/diffraction (SAXS/D) patterns for the POP materials using equipment available in the PI's lab and with equipment from the Engineering and Physics departments.

The combined studies of IR, NMR, and elemental analysis will be conducted to characterize and quantify the amount of binding/exchanging groups in POP-based reversible "nano-traps".

The surface areas and pore size distributions of the parent POPs, the intermediates during the stepwise post-synthetic modification processes, and the POP-based reversible "nano-traps" will be examined using a Surface Area Analyzer in the PI's lab. The measured surface areas and pore size distributions will also be compared with those calculated from the built structural models to further verify the validity of the design rationale.

To study their thermal stability and framework robustness, thermal gravimetric analysis (TGA) will be performed on the fresh and activated samples using the TGA instrument, which is available in the PI's lab. Their water/chemical stabilities will be investigated by exposing the samples to boiling water and acidic and basic pH solutions, which will be followed by the characterization techniques mentioned above. Simulated durability experiments will be conducted by exposing the POPs to high humidity for a period of six month (simulate storage lifetime), which will be followed up by the characterization techniques mentioned above and adsorption experiments.

Example 5: Objective 2: Assessments of the Prepared POPs as Reversible "Nano-Traps" for Removing Inorganic Contaminants from Water and Understanding the Binding Modes of the Contaminants within POPS 3.2.1 Investigation of the POP Based Reversible "Nano-Trap" Platforms for Remediation of Contaminants.

Contaminant adsorption tests: After comprehensive characterizations of the POPs, the materials will be exposed to controlled contaminants under laboratory conditions. Batch experiments will be designed to test the efficiencies and effectiveness to remove contaminants from water at different contaminant concentrations, various temperatures, pH values, and with competing non-toxic analytes. Control experiments will also be conducted on benchmark activated carbons, clays, zeolites, and ion-exchange resins to set a base line to compare our POP-based reversible "nano-traps". Researcher's handling contaminated water will follow and obey all safety and health regulations and all hazardous waste will be disposed of properly by the PI's institute.

We will follow the USEPA Clean Water Act approved analytical methods for chemical testing of contaminants using the PI's laboratory and institutes instruments, e.g. UV-Vis spectrometer, inductively coupled plasma-optical emission spectrometer (ICP-OES) and inductively coupled plasma-mass spectrometer (ICP-MS).

Analysis of performance metrics for contaminant removal: To assess the performances of the POPs on individual contaminants, the adsorption data will be analyzed for its kinetic and thermodynamic properties (Table 5). The amount of contaminant adsorbed by the POPs will be calculated using equation 11. The distribution coefficient, $K_d$ will be calculated by equation 12 and the POPs removal efficiency, removal %, will be calculated from equation 13. To determine the maximum uptake capacity for a single contaminant we will use the Langmuir model equation 14 or Langmuir-Freundlich (LF) equation 15, which will be used to determine how many binding sites were utilized when contaminants are adsorbed. To understand the adsorption kinetics of the POP-based reversible "nano-traps," the adsorption process will use semi-empirical kinetic models of the pseudo-first- or pseudo-second-order, equations 16 and 17 respectively. Thermodynamic properties will be gathered and evaluated using equations 18 and 19.

Recycling: Each POP will be washed free of contaminants and reevaluated with the same characterization techniques used after the initial POP synthesis. A minimum of 10 recycling experiments will be performed and compared with the original adsorption properties.

Breakthrough experiments and scale-up tests: The POP materials showing the high adsorption capacity, fast kinetics, and high selectivity of target contaminants in the batch tests will be down selected for breakthrough evaluation on the removal of individual contaminants. The breakthrough experiments will be conducted using a programmable syringe pump, of which the syringe will be packed with 0.5 g~1 g POP material. The top candidates from the lab scale breakthrough evaluations will be then scaled up to 0.5 kg~1 kg and engineered in the form of pellet or granular form for tests in 1 m³ (264.17 gallons) of surface water or waste stream water, which can account for the water use of two to three people per day usage; and work along this line will be conducted at the USF Water Institute.

TABLE 5

Equations list for performance

| Equation | Formula* |
|---|---|
| 11 | $q_e = (C_0 - C_e) \times \dfrac{V}{m}$ |
| 12 | $K_d = \dfrac{C_0 - C_e}{C_e} \times V/m$ |
| 13 | $\% \text{ removal} = \dfrac{C_0 - C_e}{C_0} \times 100$ |
| 14 | $\dfrac{C_e}{q_e} = \dfrac{C_e}{q_{max}} + \dfrac{1}{K_L q_{max}}$ |
| 15 | $q = \dfrac{Q_m(K_a C_e)^h}{(K_a C_e)^h + 1}$ |
| 16 | $\dfrac{dn}{dt} = k_1 \times (n_e - n)$ |
| 17 | $\dfrac{dn}{dt} = k_2 \times (n_e - n)^2$ |
| 18 | $\ln K_d = \dfrac{\Delta S^0_{ads}}{R} - \dfrac{\Delta H^0_{ads}}{RT}$ |
| 19 | $\Delta G_{ads}^0 = \Delta H_{ads}^0 - T\Delta S_{ads}^0$ |

Example 6: Objective 3: Development of POPs Featuring Multi-Types of Recognition Sites for Simultaneous Capture of Multiple Inorganic Contaminants Given the complexity in surface water/waste stream water that could contain various types of contaminants, an ideal decontamination material should be anticipated to be capable of simultaneously removing all types of contaminants. On the basis of the investigations in Objective 2, the binding sites in POPs capable of individually removing inorganic cation or anion contaminants from water with high efficiency and effectiveness will be combined into multi-purpose POP structures to afford multifunctional reversible "nano-traps" for simultaneously removing multiple inorganic chemical contaminants from water. Multiple binding or exchange sites can be added in a post-synesthetic step. Using the different binding sites as listed in Table 4, the afforded multi-functional POP-based reversible "nanotraps" are expected to show fast kinetics and high uptake capacity for all of the listed heavy metal contaminants.

Similarly, the assessments of the performances of the multi-functional POP-based reversible "nano-traps" in simultaneous removal of multiple inorganic chemical contaminants from water will be conducted first in the lab scale via batch tests and breakthrough experiments; the best performing materials will be scaled up and engineered in the form of pellet or granular form for large volume (1 m$^3$) real water tests (i.e. surface water or waste stream water).

This unprecedented design of multi-functional POP-based reversible "nano-traps" will allow competitive binding studies to be performed to elucidate the role/mechanism of multiple binding sites in close proximity, which will be carried out through a series of mechanistic experiments as proposed above.

References

[1] T. A. Larsen, S. Hoffmann, C. Lüthi, B. Truffer, M. Maurer, Emerging solutions to the water challenges of an urbanizing world. *Science*, 2016, 252(6288), 928-933.

[2] I. Fittschen, H. H. Hahn, Characterization of the municipal wastewater and a preliminary comparison with liquid cattle excretion. *Water Sci. Technol.*, 1998, 38(6), 9-16.

[3] M. Maurer, P. Schwegler, T. A. Larsen, Nutrients in urine: energetic aspects of removal and recovery. *Water Sci. Technol.*, 2003, 48(1), 37-46.

[4] T. A. Larsen, M. Maurer, K. M. Udert, J. Lienert, Nutrient cycles and resource management: implications for the choice of wastewater treatment technology. *Water Sci. Technol.*, 2007, 56(5), 229-237.

[5] K. M. Udert, T. A. Larsen, M. Biebow, W. Gujer, Urea hydrolysis and precipitation dynamics in urine-collection systems. *Water Res.*, 2003, 37, 2571-2582.

[6] K. M. Udert, T. A. Larsen, W. Gujer, Biologically induced precipitation in urine-collecting systems. *Water. Sci. Technol.*, 2003, 3(3), 71-78.

[7] R. M. Kudela, J. Q. Lane, W. P. Cochlan, The potential role of anthropogenically derived nitrogen in the growth of harmful algae in California, USA. *Harmful Algae* 2008, 8(1), 103-110.

[8] W. P. Cochlan, J. Herndon, R. M. Kudela, Inorganic and organic nitrogen uptake by the toxigenic diatom Pseudo-nitzschia australis (Bacillariophyceae). *Harmful Algae* 2008, 8(1), 111-118.

[9] A. Coombs, Urea pollution turns tides toxic. *Nature* 2008, DOI: 10.1038/news.2008.1190.

[10] M. Schrope, Oceanography: Red tide rising. *Nature* 2008, 452(7183), 24-26.

[11] L. Liu, H. Mo, S. Wei, D. Raftery, Quantitative analysis of urea in human urine and serum by 1H nuclear magnetic resonance. *Analyst*, 2012, 137(3), 595-600.

[12] F. Meinzinger, M. Oldenburg, Characteristics of source-separated household wastewater flows: a statistical assessment. *Water Sci Technol.*, 1999, 59(9), 1785-1791.

[13] R. A. Shaykhutdinov, G. D. MacInnis, R. Dowlatabadi, A. M. Weljie, H. J. Vogel, Quantitative analysis of metabolite concentrations in human urine samples using $^{13}$C{$^1$H} NMR spectroscopy. *Metabolomics*, 2009, 5(3), 307-317.

[14] M. Maurer, P. Schwegler, T. A. Larsen, Nutrients in urine: energetic aspects of removal and recovery. *Water Sci. Technol.*, 2003, 48(1), 37-46.

[15] P. Lens, L. W. H. Pol, P. A. Wilderer, T. Asano, Water Recycling and Resource Recovery in Industry. IWA Publishing: 2002.

[16] D. Donnert, M. Salecker, Elimination of phosphorus from waste water by crystallization. *Environ. Technol.* 1999, 20, 735-742.

[17] D. Donnert, M. Salecker, Elimination of phosphorus from municipal and industrial waste water. *Water Sci. Technol.*, 1999, 40, 195-202.

[18] R. G. Penetra, M. A. P. Reali, E. Foresti, J. R. Campos, Post-treatment of effluents from anaerobic reactor treating domestic sewage by dissolved-air flotation. *Water Sci. Technol.* 1999, 40, 137-143.

[19] Q. Wu, P. L. Bishop, T. C. Keener, J. Stallard, L. Stile, Sludge digestion enhancement and nutrient removal from anaerobic supernatant by Mg(OH)2 application. *Water Sci. Technol.* 2001, 44(1), 161-166.

[20] N. A. Booker, A. J. Priestley, I. H. Fraser, Struvite formation in wastewater treatment plants: opportunities for nutrient recovery. *Environ. Technol.*, 1999, 20, 777-782.

[21] I. Stratful, M. D. Scrimshaw, J. N. Lester, Conditions influencing the precipitation of magnesium ammonium phosphate. *Water Res.* 2001, 35(17), 4191-4199.

[22] J. D. Doyle, K. Oldring, J. Churchley, C Price, S. A. Parsons, Chemical control of struvite precipitation. *J. Environ. Eng.*, 2003, 129(5), 419-426.

[23] L. E. de-Bashan, Y. Bashan, Recent advances in removing phosphorus from wastewater and its future use as fertilizer (1997-2003). *Water Res.*, 2004, 38, 4222-4246.

[24] A. F. Clarens, E. P. Ressurreccion, M. A. White, L. M. Colosi, Environmental life cycle comparison of algea to other bioenergy feedstocks. *Environ. Sci. Technol.*, 2010, 44, 1813-1819.

[25] Y. Fujita, S. Okazaki, Adsorption activity of activated carbon for urea in aqueous solutions. *Nippon Kagaku Kaishi*, 1990, 4, 352-356.

[26] B.-B. Lind, Z Ban, S. Bydén, Nutrient recovery from human urine by struvite crystallization with ammonia adsorption on zeolite and wollastonite. *Bioresour. Technol.*, 2003, 73, 169-174.

[27] Z. S. Bán, G. Dave, Laboratory studies on recovery of N and P from human urine through struvite crystallization and zeolite adsorption. *Environ. Technol.*, 2004, 25, 111-121.

[28] Z. Ganrot, G. Dave, E. Nilsson, Recovery of N and P from human urine by freezing, struvite precipitation and adsorption to zeolite and activated carbon. *Bioresour. Technol.*, 2007, 98, 3112-3121.

[29] B. B. Baykal, N. P. Kocaturk, A. D. Allar, B. Sari, The effect of initial loading on the removal of ammonium and potassium from source-separated human urine vai clinoptilolite. *Water Sci. Technol.*, 2009, 60(10), 2515-25120.

[30] A. Hedström, Wollastonite as reactive filter medium for sorption of wasterwater ammonium and phosphorus. *Environ. Technol.*, 2006, 27, 801-809.

[31] Z. Sun, X. Qu, G. Wang, S. Zheng, R. L. Frost, Removal characteristics of ammonium nitrogen from wastewater by modified Ca-bentonites. *Appl. Clay Sci.*, 2015, 107, 46-51.

[32] S. Xu, L, Luo, H. He, H. Liu, L. Cui, Nitrogen and phosphate recovery from source-separated urine by dosing with magnesite and zeolite. *Pol. J. Environ. Stud.*, 2015, 24(5), 2269-2275.

[33] A. S. Fiorillo, R. Tiriolo, S. A. Pullano, Absorption of urea into zeolite layer intergrated with microelectronic circuits. *IEEE Trans. Nanotechnol.*, 2015, 14(2), 214-217.

[34] L. Shi, Y. Zhang, B. He, Novel composite adsorbent for adsorption of urea. *Polym. Adv. Technol.*, 1999, 10, 69-73.

[35] Y. S. Hun, K. Yang, Y. K. Hong, Y.-S. Jun, W. H. Hong, D. H. Kim, Removal of urea from urea-rich protein samples using metal ions in a microfluidic device. *Process Biochem.,* 2007, 42, 649-654.

[36] S. E. Bailey, T. J. Olin, R. M. Bricka, D. D. A. Adrian, A review of potentially low-cost sorbents for heavy metals. *Water Res.,* 1999, 33, 2469-2479.

[37] M. Kumar, A review of chitin and chitosan applications. *React. Funct. Polym.,* 2000, 46, 1-27.

[38] J. L. Drury, D. J. Mooney, Hydrogels for tissue engineering: scaffold design variables and applications. *Biomaterials,* 2003, 24, 4337-4351.

[39] G. Crini, Non-conventional low-cost adsorbents for dye removal: A review. *Bioresour. Technol.,* 2006, 97, 1061-1085.

[40] M. Rinaudo, Chitin and chitosan: Properties and applications. *Prog. Polym. Sci.,* 2006, 31, 603-632.

[41] A. Pathak, S. K. Bajpai, Chitosan-Magnitite nanocomposite for effective removal of urea in a "Magnetic Hemodialysis Therapy": a novel concept. *J. Appl. Polym. Sci.,* 2009, 114, 3106-3109.

[42] X. Liu, S. Sun, Y. Tang, S. Li, J. Chang, L.-A. Guo, Y. Zhao, Preparation and kinetic model of cross-linked chitosan microspheres immobilized Zn(II) for urea adsorption. *Anal. Lett.,* 2012, 45, 1632-1644.

[43] L. D. Wilson, C. Xue, Macromolecular sorbent materials for urea capture. *J. Appl. Polym. Sci.,* 2013, 128(1), 667-675.

[44] C. Xue, LD. Wilson, Kinetic study on urea uptake with chitosan based sorbent materials. *Carbohyd. Polm.,* 2016, 135, 180-186.

[45] E. Urbanczky, M. Sowa, W. Simka, Urea removal from aqueous solutions: a review. *J. Appl. Electrochem.,* 2016, 46, 1011-10293.

[46] R. Lan, S. W. Tao, J. T. S. Irvine, A direct urea fuel cell—power from fertiliser and waste. *Energy Environ. Sci.,* 2010, 3, 438-441.

[47] R. Lan, S. W. Tao, Preparation of nano-sized nickel as anode catalyst for direct urea and urine fuel cells. *J. Power Sources,* 2011, 196, 5021-5026.

[48] I. Ieropoulos, J. Greenman, C. Melhuish, Urine utilisation by microbial fuel cells; energy fuel for the future. *Phys. Chem. Chem. Phys.,* 2012, 14, 94-98.

[49] US Environmental Protection Agency, Table of Regulated Drinking Water Contaminants, https://www.epa.gov/ground-water-and-drinking-water/table-regulated-drinking-water-contaminants

[50] B. Li, Y. Zhang, D. Ma, Z. Shi, S. Ma, Mercury nano-trap for effective and efficient removal of mercury (II) from aqueous solution. *Nat. Commun.,* 2014, 5, 5537.

[51] S. K. Ritter, Polymer Nanotrap Incarcerates Mercury. *Chem. Eng. News,* 2014, 92, 31.

[52] B. Li, Y. Zhang, D. Ma, Z. Xing, T. Ma, Z. Shi, X. Ji, S. Ma, Creation of a new type of ion exchange material for rapid, high-capacity, reversible and selective ion exchange without swelling and entrainment. *Chem. Sci.,* 2016, 7, 2138-2144.

[53] ChemistryViews.org, New Materials for Ion Exchange. ChemistryViews, 2015 online at http://www.chemistryviews.org/details/news/8672291/New_Materials_for_Ion_Exchange.html

[54] Meng, X.; Nawaz, F.; Xiao, F.-S., Templating route for synthesizing mesoporous zeolites with improved catalytic properties. *Nano Today,* 2009, 4, 292-301.

[55] Sun, Q.; Ma, S.; Dai, Z.; Meng, X.; Xiao, F.-S., A hierarchical porous ionic organic polymer as a new platform for heterogeneous phase transfer catalysis. *J. Mater. Chem. A,* 2015, 3, 23871-23875.

[56] Sun, Q.; Aguila, B.; Verma, G.; Liu, X.; Dai, Z.; Deng, F.; Meng, X.; Xiao, F.-S.; Ma, S., Superhydrophobicity: Constructing Homogeneous Catalysts into Superhydrophobic Porous Frameworks to Protect Them from Hydrolytic Degradation. *Chem,* 2016, 1, 628-639.

[57] J. A. O'Neal, T. H. Boyer, Phosphate recovery using hybrid anion exchange: Application to source-separated urine and combined wastewater streams. *Water Res.,* 2013, 47(15), 5003-5007.

[58] V. C. Anigbogu, M. L. Dietz, A. Syty, Determination of ammonium, nitrate, and urea nitrogen in fertilizer by gas-phase molecular absorption spectrometry *Anal. Chem.,* 1983, 55(3), 535-539.

[59] E. W. Rice, L. Bridgewater; Association, A. P. H.; Association, A. W. W.; Federation, W. E., *Standard Methods for the Examination of Water and Wastewater.* 22$^{nd}$ Edition. American Public Health Association: 2012. Washington DC.

[60] D. P. Griffith, D. M. Musher, C. Itin, Urease, The primary cause of infection-induced urinary stones. *Invest. Urol.,* 1976, 13, 346-350.

[61] A. Torzewska, P. Stączak, A. Rózalski, Crystallization of urine mineral components may depend on the chemical nature of Protus endotoxine polysaccharides. *J. Med. Microbiol.,* 2003, 52, 471-477.

[62] J. Zhang, A. Amini, J. A. O'Neal, T. H. Boyer, Q. Zhang, Development and validation of a novel modeling framework integrating ion exchange and resin regeneration for water treatment. *Water Res.,* 2015, 84, 255-265.

Example 7: Optimizing Radionuclide Sequestration in Anion Nanotraps with Record Pertechnetate Sorption The elimination of specific contaminants from high concentrations of competitors poses a significant challenge. Rather than relying on a single direct interaction, the cooperation of multiple functionalities is an emerging strategy for adsorptive materials design to achieve this requisite affinity. Here, we describe that the interaction with the analyte of interest can be altered by modifying the local environment of the direct contact site, as demonstrated by manipulating the affinity of pyridinium-based anion nanotraps toward pertechnetate. Systematic control of the substituent effect allows the resulting anion nanotraps to combine multiple features as ideal pertechnetate scavengers with unprecedented performances, substantially overcoming the long-term challenge of $TcO_4^-$ segregation under extreme conditions of super acidity and basicity, strong irradiation field, and high ionic strength. The top material exhibits the highest sorption capacity together with the most promising extraction efficiencies from conditions relevant to the used nuclear (Hanford tank wastes) fuel and legacy nuclear wastes (Savannah River Sites) among materials reported thus far. Specifically, the material adsorbs up to 1127 mg $ReO_4^-$ $g^{-1}$ and even under conditions relevant to legacy waste, removal efficiencies approach 95%, after a single treatment. Altogether, these results provide clear, intuitive factors that govern the uptake, kinetics, and selectivity of adsorbents for strongly interacting targeted species.

Materials and Methods

Commercially available reagents were purchased in high purity and used without purification. The purity and structure of the compounds synthesized in this manuscript were determined by NMR technique. Nitrogen sorption isotherms at the temperature of liquid nitrogen were measured using Micromeritics ASAP 2020M and Tristar system. $^1$H NMR spectra were recorded on a Bruker Avance-400 (400 MHz) spectrometer. Chemical shifts are expressed in ppm downfield from TMS at δ=0 ppm, and J values are given in Hz. $^{13}$C (100.5 MHz) cross-polarization magic-angle spinning (CP-MAS) NMR experiments were recorded on a Varian infinity plus 400 spectrometer equipped with a magic-angle spin probe in a 4-mm $ZrO_2$ rotor. The samples were outgassed for 1000 min at 80° C. before the measurements. Scanning electron microscopy (SEM) and energy dispersive X-ray spectroscopy (EDX) mapping were performed on a Hitachi SU 8000. Transmission electron microscope (TEM) image was performed using a Hitachi HT-7700 or JEM-2100F field emission electron microscope (JEOL, Japan) with an acceleration voltage of 110 kV. High-angle-annular-dark-field (HAADF) scanning, STEM imaging, and energy dispersive X-ray spectroscopy (EDX) mapping were carried out by Titan ChemiSTEM operated at 200 kV. XPS spectra were performed on a Thermo ESCALAB 250 with Al Kα irradiation at θ=90° for X-ray sources, and the binding energies were calibrated using the C1s peak at 284.9 eV. IR spectra were recorded on a Nicolet Impact 410 FTIR spectrometer. The concentrations of $TcO_4^-$ in solution were measured using a UV-vis spectrometer (Varian Cary 6000i) by monitoring the characteristic absorption peak at 290 nm and the activity of $^{99}TcO_4^-$ was also analyzed by a liquid scintillation counting (LSC) system (Perkin Elmer Quantulus 1220). ICP-OES was performed on a Perkin-Elmer Elan DRC II Quadrupole. ICP-MS was performed on a Perkin-Elmer Elan DRC II Quadrupole Inductively Coupled Plasma Mass Spectrometer. Elemental analyses were performed via flask combustion followed by ion chromatography.

Synthesis of Porous Ion Exchange Material Constructed by 1-methylpyridinium chloride moieties (PQA-Py-I).

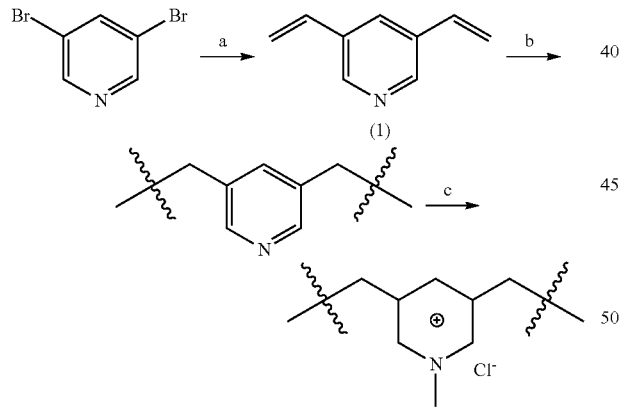

Reagent: (a) potassium vinyltrifluoroborate, Pd(PPh$_3$)$_4$; (b) AIBN; (c) CH$_3$I, NaCl 3,5-divinylpyridine (1): 3,5-dibromopyridine (3.0 g, 12.7 mmol), potassium vinyltrifluoroborate (4.06 g, 30.4 mmol), K$_2$CO$_3$ (5 g, 36.2 mmol), and Pd(PPh$_3$)$_4$ (0.37 g, 0.315 mmol) were dissolved in a mixture of toluene (25 mL), THF (25 mL), and H$_2$O (10 mL), and the resulting mixture was refluxed at 90° C. under N$_2$ atmosphere for 48 h. The product was extracted with ethyl acetate, washed with brine, dried over Na$_2$SO$_4$, and evaporated under reduced pressure, giving the crude compound which was then purified by flash chromatography with hexane/ethyl acetate (5:1) and 1% v/v triethylamine as eluent to afford the title compound as a colorless liquid. Yield: 1.44 g (86%). $^1$H NMR (400 MHz, CDCl$_3$, 298K, TMS): δ 8.50 (d, 2H, J=1.2 Hz), 7.73 (s, 1H), 6.68-6.74 (m, 2H), 5.85 (d, 2H, J=14 Hz), 5.40 (d, 2H, J=8.8 Hz) ppm. $^{13}$C NMR (125 MHz, CDCl$_3$, 298K, TMS) 147.35, 133.35, 132.81, 129.43, 116.46 ppm.

Synthesis of porous polymer constructed by pyridine moieties (POP-Py): 1 (1.0 g) was dissolved in DMF (10 mL), followed by the addition of free radical initiator azobisisobutyronitrile (AIBN, 25 mg). After stirring at room temperature to achieve homogeneity, the mixture was transferred into a 20 mL autoclave and maintained at 100° C. for 24 h. A white solid product (1.0 g, 100% yield) was obtained by extracting the DMF solvent with EtOH and drying in vacuum at 50° C. for 12 h.

Synthesis of porous ion exchange material constructed by 1-methylpyridinium chloride (PQA-Py-Cl): POP-Py (0.5 g) was swelled in acetonitrile (40 mL), followed by addition of iodomethane (1 g). The mixture was then stirred and heated to 80° C. for 48 h. The resulting powder was washed with ethanol and then exchanged with 1 M NaCl solution three times to afford the title product as a light yellow powder.

*Synthesis of porous ion exchange material constructed by 4-amino-1-methylpyridinium chloride moieties (PQA-pNH$_2$Py-Cl).*

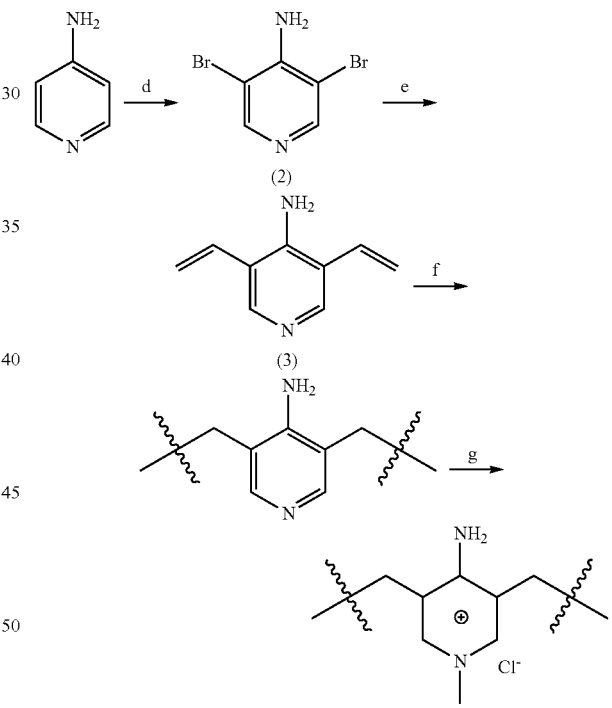

Reagent: (d) N-bromosuccinimide; (e) potassium vinyltrifluoroborate, Pd(PPh$_3$)$_4$; (f) AIBN; (g) CH$_3$I, NaCl 3,5-dibromopyridin-4-amine (2): To a mixture of 4-aminopyridine (1.88 g, 20 mmol) in carbon tetrachloride (80 mL), N-bromosuccinimide (7.12 g, 40 mmol) was added in portions. After stirring at room temperature for 24 h, the product was extracted with chloroform, washed with brine, dried over Na$_2$SO$_4$, and evaporated under reduced pressure, giving the crude compound which was then purified by flash chromatography with hexane/ethyl acetate (2:1) and 1% v/v triethylamine as eluent to afford the title compound as a yellow powder. Yield: 4.6 g (92%). $^1$H NMR (400 MHz, DMSO-d6, 298K, TMS): δ 8.21 (s, 2H), 6.40 (s, 2H) ppm.

3,5-divinylpyridin-4-amine (3): 3,5-dibromopyridin-4-amine (3.0 g, 12 mmol), potassium vinyltrifluoroborate (3.96 g, 28.8 mmol), K₂CO₃ (4.8 g, 36 mmol), and Pd(PPh₃)₄ (0.348 g, 0.3 mmol) were dissolved in a mixture of toluene (25 mL), THF (25 mL), and H₂O (10 mL), and the resulting mixture was refluxed at 90° C. under N₂ atmosphere for 48 h. The product was extracted with ethyl acetate, washed with brine, dried over Na₂SO₄, and evaporated under reduced pressure, giving the crude compound which was then purified by flash chromatography with hexane/ethyl acetate (5:1) and 1% v/v triethylamine as eluent to afford the title compound as a yellow powder. Yield: 1.56 g (89%). ¹H NMR (400 MHz, DMSO-d6, 298K, TMS): δ 8.11 (s, 2H), 6.81-6.88 (m, 2H), 5.96 (s, 2H), 5.59-5.64 (m, 2H), 5.19-5.22 (m, 2H) ppm.

Synthesis of porous polymer constructed by 4-aminepyridine moieties (POP-pNH₂Py): 3 (1.0 g) was dissolved in DMF (10 mL), followed by the addition of AIBN (25 mg). After stirring at room temperature to achieve homogeneity, the mixture was transferred into a 20 mL autoclave and maintained at 100° C. for 24 h. A yellow solid product was obtained by extracting the DMF solvent with EtOH and drying in vacuum at 50° C. for 12 h.

Synthesis of porous ion exchange material constructed by 4-amino-1-methylpyridinium chloride moieties (PQA-pNH₂Py-Cl): POP-pNH₂Py (0.5 g) was swelled in acetonitrile (40 mL), followed by the addition of iodomethane (1 g). The mixture was then stirred and heated to 80° C. for 48 h. The resulting powder was washed with ethanol and then exchanged with 1 M NaCl solution three times to afford the title product as a yellow powder.

Synthesis of porous ion exchange material constructed by 4-amino-1-methylpyridinium chloride moieties [PQA-pN(Me)₂Py-Cl].

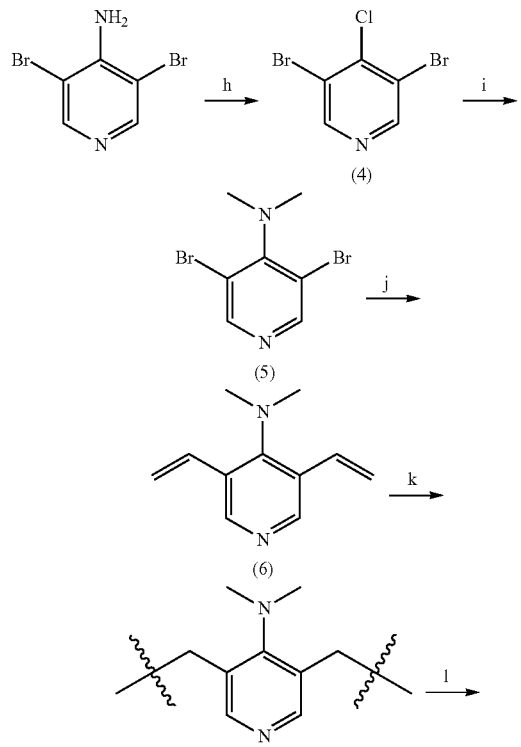

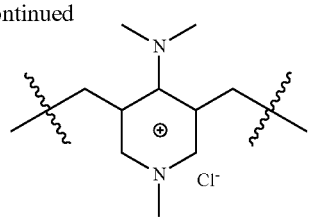

Reagent: (h) HCl, NaNO₂; (i) dimethylamine; (j) potassium vinyltrifluoroborate, Pd(PPh₃)₄; (k) AIBN; (l) CH₃I, NaCl 3,5-dibromo-4-chloropyridine (4): 3,5-dibromopyridin-4-amine (4.50 g, 18 mmol) was stirred in concentrated HCl (700 mL) with sodium nitrite (4.5 g, 18 mmol) added in portions at 0-5° C. After 1 h the temperature was increased to room temperature and stirred for 2 h. Following, 40 wt. % sodium hydroxide was added dropwise, with the temperature kept below 50° C. using an ice bath. After the reaction, the mixture was extracted with ethyl acetate, dried with K₂CO₃, and evaporated under vacuum to give the title product as white needles. Yield: 4.37 g (90%). ¹H NMR (400 MHz, DMSO-d6, 298K, TMS): δ 8.79 (s, 2H) ppm.

3,5-dibromo(pyridine-4-yl)dimethylamine (5): 4 (2.69 g, 10 mmol) and 33 wt. % aqueous solution of dimethylamine (27 mL, 22 mmol), was heated in a Schlenk tube at 118° C. for 20 h. The reaction mixture was then cooled to room temperature, extracted with ethyl acetate, and washed with 1 M K₂CO₃ and water. The organic layer was dried with MgSO₄ and evaporated under vacuum to give a pale yellow product. Yield: 4.37 g (90%). ¹H NMR (400 MHz, CDCl₃, 298K, TMS): δ 8.47 (s, 2H), 3.02 (s, 6H) ppm.

3,5-divinyl(pyridine-4-yl)dimethylamine (6): 5 (3.0 g, 11.8 mmol), potassium vinyltrifluoroborate (3.96 g, 28.8 mmol), K₂CO₃ (4.8 g, 36 mmol), and Pd(PPh₃)₄ (0.348 g, 0.3 mmol) were dissolved in a mixture of toluene (25 mL), THF (25 mL), and H₂O (10 mL), and the resulting mixture was refluxed at 90° C. under N₂ atmosphere for 48 h. The product was extracted with ethyl acetate, washed with brine, dried over Na₂SO₄, and evaporated under reduced pressure, giving the crude compound which was then purified by flash chromatography with hexane/ethyl acetate (5:1) and 1% v/v triethylamine as eluent to afford the title compound as a yellow powder. Yield: 1.44 g (86%). ¹H NMR (400 MHz, CDCl₃, 298K, TMS): δ 8.36 (s, 2H), 6.79-6.86 (m, 2H), 5.66-5.71 (m, 2H), 5.33-5.36 (m, 2H), 2.88 (s, 6H) ppm. ¹³C NMR (125 MHz, CDCl₃, 298K, TMS) 154.33, 148.68, 133.40, 129.04, 115.99, 44.04 ppm.

Synthesis of porous polymer constructed by dimethylaminopyridine [POP-pN(Me)₂Py]: 6 (1.0 g) was dissolved in DMF (10 mL), followed by the addition of free radical initiator azobisisobutyronitrile (AIBN, 0.025 g). After stirring at room temperature to achieve homogeneity, the mixture was transferred into a 20 mL autoclave and maintained at 100° C. for 24 h. A yellow solid product was obtained by extracting the DMF solvent with EtOH and drying in vacuum at 50° C. for 12 h.

Synthesis of porous ion exchange material constructed by 4-(dimethylamino)-1-methylpyridin-1-ium moieties [PQA-pN(Me)₂Py-Cl]: POP-pN(Me)₂Py (0.5 g) was swelled in acetonitrile (40 mL), followed by the addition of iodomethane (1 g). The mixture was then stirred and heated to 80° C. for 48 h. The resulting powder was washed with ethanol and then exchanged with 1 M NaCl solution three times to afford the title product as a yellow powder.

To target the desired materials, our initial step was to construct pyridine moieties with various anchor groups into porous frameworks, due to the low solubility of pyridinium in organic solvents, which is detrimental to yield highly porous polymers. To construct these moieties into porous polymers, we decided to use free radical induced polymerization with the following considerations: i) the resultant highly cross-linked polymer chains and thus the rigidity of the matrix, reduce the ability of the pyridinium to congregate in hydrated domains, which decrease the affinity for more hydrated anions and thereby enhance the selectivity for less hydrated anions such as $TcO_4^-$ [43]; and ii) the adapted synthesis allows for the introduction of hierarchical porosity in the resultant polymers, which is expected to enhance the kinetics, thereby offering an opportunity to meet the challenges posed by the vast volumes of wastewater[44,45]. To this end, we further functionalized the pyridine moieties with vinyl groups, affording V-Py, V-pNH$_2$Py, and V-pN(Me)$_2$Py, respectively (Table 6). Under solvothermal conditions in dimethylformamide (DMF) at 100° C., polymerization of these monomers in the presence of azobisisobutyronitrile (AIBN) gave rise to the porous pyridine-based polymers in quantitative yields, which were denoted as POP-Py, POP-pNH$_2$Py, and POP-pN(Me)$_2$Py, respectively. To introduce ion-exchange sites, the pyridine moieties in the resultant materials underwent a quaternization reaction with methyl iodide (CH$_3$I), yielding the porous ionic organic polymer of polymerized quaternary ammonium (PQA) salt PQA-Py-I, PQA-pNH$_2$Py-I, and PQA-pN(Me)$_2$Py-I, respectively.

TABLE 6

| Structure of building units, surface area, and pore volume of various pyridinium functionalized hierarchical porous polymers.

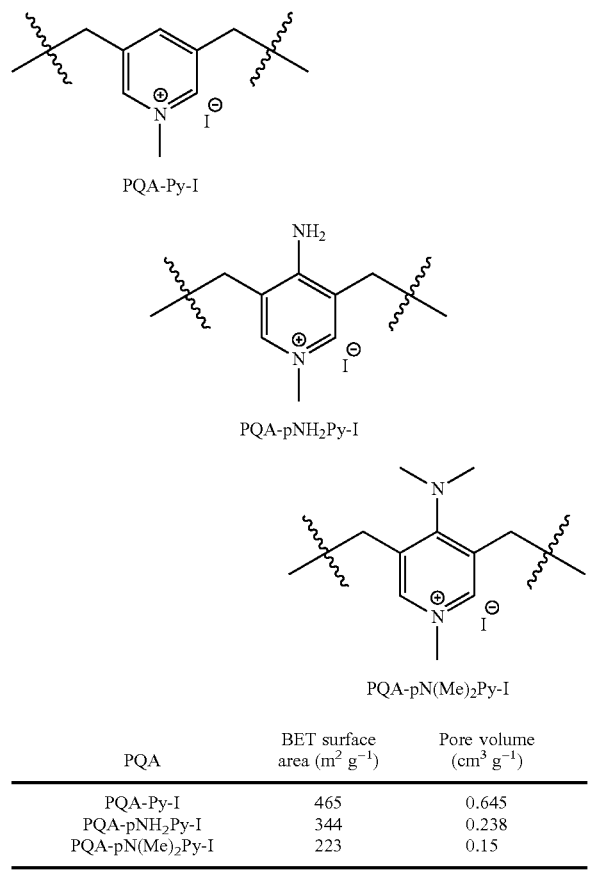

| PQA | BET surface area (m$^2$ g$^{-1}$) | Pore volume (cm$^3$ g$^{-1}$) |
| --- | --- | --- |
| PQA-Py-I | 465 | 0.645 |
| PQA-pNH$_2$Py-I | 344 | 0.238 |
| PQA-pN(Me)$_2$Py-I | 223 | 0.15 |

Among the synthesized porous materials, POP-pN(Me)$_2$Py and corresponding quaternization product PQA-pN(Me)$_2$Py-I were chosen as representative samples for thorough illustration. As probed by scanning electron microscopy (SEM) and transmission electron microscopy (TEM), it is revealed that no noticeable morphological changes occurred after quaternization, both POP-pN(Me)$_2$Py and PQA-pN(Me)$_2$Py-I feature aggregates comprising interconnected nanoparticles with sizes of 50-100 nm. Structural details of these materials were elaborated by solid-state $^{13}$C NMR spectroscopy. The characteristic vinyl $^{13}$C resonance located in the range of 100.0 to 110.0 ppm in the monomers disappears with the concomitant appearance of the polymerized vinyl group peak at 31.8 ppm, confirming the conversion of the monomer into the respective polymer[45]. In addition, the increased relative intensity of the peak at 44.9 ppm, ascribed to the methyl group from iodomethane (CH$_3$I), verified the occurrence of the quaternization reaction between the pyridine moiety on POP-pN(Me)$_2$Py and CH$_3$I. To provide additional proof, we employed X-ray photoelectron spectroscopy (XPS). The appearance of strong signals of iodine species at 629.3 and 617.8 eV for I3d$_{5/2}$ and I3d$_{7/2}$, respectively, confirmed the success of this transformation. To quantify the degree of quaternization, we evaluated the content of iodine species in PQA-pN(Me)$_2$Py-I by elemental analysis. The results showed that the weight percentage of iodine species in PQA-pN(Me)$_2$Py-I was 38.3 wt. %, which means about 95% of the pyridine moieties were involved in the quaternization reaction, revealing the high throughput of this reaction. The details of the pore properties of the resultant materials were investigated by N$_2$ sorption isotherms collected at 77 K. It is shown that both samples exhibit type-I plus type-IV sorption curves, suggesting the retention of the pore structure. A steep step in the curve at relative pressure (P/P$_0$) less than 0.01 is due to the filling of micropores, whereas a hysteresis loop at P/P$_0$ in the range of 0.45~0.95 is mainly from the contribution of the sample mesoporosity[46]. The calculated specific surface areas were 535 and 223 m$^2$ g$^{-1}$ for POP-pN(Me)$_2$Py and PQA-pN(Me)$_2$Py-I, respectively. The decreased surface area can be reasonably attributed to the increased mass after the functionality addition.

Sorption Experiments

Caution! Although Tc-99 is a low-energy β-emitter (t$_{1/2}$=2.13×10$^5$ a), it still possesses significant health risks when inhaled or digested. Standard precautions and procedures for handling radioactive materials should be followed, and all Tc-99 studies were conducted in a licensed laboratory dedicated to radiological investigations.

The aqueous solutions with different rhenium concentrations were obtained by diluting the stock KReO$_4$ solution with the proper amount of distilled water unless otherwise indicated. The pH levels of the solutions were adjusted by HNO$_3$ or NaOH aqueous solution. The concentrations of uranium during all the experiments were detected by inductively coupled plasma-optical emission spectroscopy (ICP-OES) and inductively coupled plasma-mass spectrometry (ICP-MS) for extra low concentrations. All the adsorption experiments were performed at ambient conditions.

Rhenium sorption isotherms. To obtain adsorption isotherms for PQA-Py-Cl, PQA-pNH$_2$Py-Cl, and PQA-pN(Me)$_2$Py-Cl, 5 mg of adsorbent was placed in 10 mL aqueous solutions of varying rhenium concentrations (25-800 ppm). The solutions were then stirred overnight to achieve equilibrium. The solutions were filtered through a 0.45 μm membrane filter and the filtrate was analyzed via ICP to determine the residual rhenium species concentrations. The amount adsorbed or ion-exchange capacity, $q_e$ (mg g$^{-1}$), at equilibrium was calculated using Equation 16.

$$q_e = \frac{(C_0 - C_e) \times V}{m} \quad (16)$$

Where $C_0$ and $C_e$ are the initial and equilibrium concentrations, respectively, V is the volume of solution used (mL), and m is the mass of adsorbent (g).

Rhenium sorption kinetics. 16 mg of PQA-Py-Cl, PQA-pNH$_2$Py-Cl, or PQA-pN(Me)$_2$Py-Cl was added to an Erlenmeyer flask containing 400 mL of a 50 ppm rhenium aqueous solution. The mixture was then stirred. At increasing time intervals 3 mL aliquots were removed from the mixture, filtered through a 0.45 μm membrane filter, and the filtrate was analyzed by ICP for the remaining rhenium concentration. The adsorption capacity at different intervals was calculated using Equation 17.

$$\text{Adsorption capacity (mg/g)} = (C_0 - C_t) \times V/m \quad (17)$$

where V is the volume of the treated solution (mL), m is the amount of used adsorbent (mg), and $C_0$ and $C_t$ are the initial concentration and the concentration of rhenium at t (min), respectively.

$K_d$ value calculation. The distribution coefficient ($K_d$) value as used for the determination of the affinity and selectivity of sorbents for ReO$_4^-$, is given by Equation 18.

$$K_d = \left(\frac{C_0 - C_e}{C_c}\right) \times \frac{V}{m} \quad (18)$$

where V is the volume of the treated solution (mL), m is the amount of adsorbent (g), $C_0$ is the initial concentration of rhenium, and $C_e$ is the equilibrium concentration of uranium. In the present work, 10 ppm rhenium aqueous solutions were treated by the various adsorbents overnight at a V/m ratio of 1000 mL g$^{-1}$.

Rhenium removal from groundwater. Rhenium spiked groundwater sample (50 mL, 1000 ppb) and adsorbents (10 mg) were added to an Erlenmeyer flask with a magnetic stir bar. The mixture was stirred at room temperature. At increasing time intervals 3 mL aliquots were removed from the mixture, filtered through a 0.45 μm membrane filter, and the filtrate was analyzed by ICP-MS for the remaining ReO$_4^-$ concentration. The percentage removal of rhenium species was calculated by Equation 19.

$$\text{Removal percentage (\%)} = \frac{C_0 - C_t}{C_0} \times 100 \quad (19)$$

Where $C_0$ is the initial concentration of rhenium, and $C_t$ is the concentration of rhenium at t (min).

Anion-exchange selectivity against SO$_4^{2-}$ and NO$_3^-$ anions. 5 mg of each adsorbent was weighed into a 20 mL glass vial, and 5 mL of ReO$_4^-$-spiked double distilled water (0.15 mM, 28 ppm) containing different concentrations of NaNO$_3$ (0.15 mM, 1.5 mM, 15 mM, 150 mM, and 450 mM) or Na$_2$SO$_4$ (0.015 mM, 0.15 mM, 1.5 mM, 15 mM, 150 mM, and 900 mM) was delivered to the sample vial. After being stirred at room temperature for 24 h, the solutions were filtered through a 0.45 μm membrane filter and the filtrate was analyzed via ICP-OES or ICP-MS to determine the residual rhenium species concentrations.

PQA-pN(Me)$_2$Py-Cl recyclability test. The rhenium species included PQA-pN(Me)$_2$Py-Cl [Re@PQA-pN(Me)$_2$Py-Cl, ca. 50 mg] was stirred in saturated NaCl aqueous solution (200 mL) for 12 h. The solid was collected by centrifugation and repeated ion exchange with NaCl aqueous solution was performed for another two times. After that, the solid was washed with deionized water until the filtrate was Cl$^-$ free and the solid was dried under vacuum to produce PQA-pN(Me)$_2$Py-Cl.

Radiation-resistance measurements. The β-ray and the γ-ray used was provided by an electron accelerator equipped with an electron beam (10 MeV) and a $^{60}$Co irradiation source (92.42 PBq), respectively. A β-ray irradiation experiment was conducted by irradiating PQA-pN(Me)$_2$Py-Cl at a dose rate of 50 kGy h$^{-1}$ for three different doses (400, 800, and 1000 kGy). A γ-ray irradiation experiment was performed by irradiating PQA-pN(Me)$_2$Py-Cl at a dose rate of 3.125 kGy h$^{-1}$ for three different doses (400, 800, and 1000 kGy). The radiation-resistance of PQA-pN(Me)$_2$Py-Cl was characterized by FT-IR spectroscopy and further checked by ReO$_4^-$ uptake capacity of the irradiated samples.

Technetium removal from distilled water. TcO$_4^-$ spiked groundwater sample (10 mL, 14.3 ppm based on technetium species) and adsorbents (10 mg) were added to a glass vial with a magnetic stir bar. The mixture was stirred at room temperature. At increasing time intervals aliquots were taken out from the mixture and the remaining TcO$_4^-$ concentration was analyzed by a liquid scintillation counting (LSC) system (Perkin Elmer Quantulus 1220). The percentage removal of technetium species was calculated by Equation 19.

Exchange experiments with simulated wastes. The simulated Hanford Low Activity Waste (LAW) Melter Recycle Stream and the simulated Savannah waste solution were prepared according to a reported protocol. A certain amount of PQA-pN(Me)$_2$Py-Cl was added to 10 mL of the above simulated wastes at V/m values of 200 mL g$^{-1}$ and 100 mL g$^{-1}$, respectively. After being stirred for 12 h, the suspension was separated with a 0.22 μm nylon membrane filter for LSC analysis.

Figure 14A:
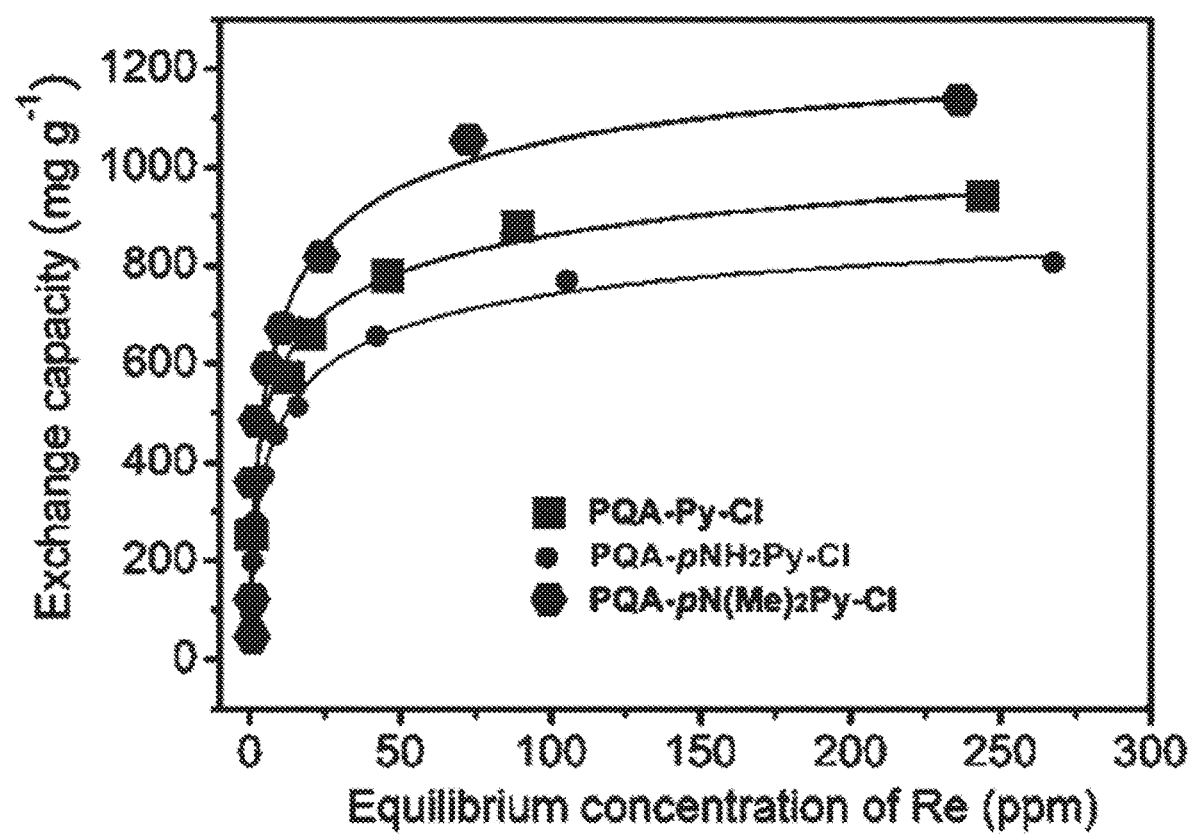
FIGS. 14A-14C shows $ReO_4^-$ adsorption isotherms and kinetics investigations.

Sorption Isotherms. The full availability of ion exchange sites within the pores of these materials is indicated by a complete anion-exchange process between I$^-$ and Cl$^-$, which was verified by TEM-EDS mapping and XPS analyses. This feature spurred their exploration for radionuclide polluted water treatment. Sorption experiments were first performed to evaluate the working capacities of these materials. Due to the limited availability and the rarity of the purified isotope $^{99}$Tc, combined with its highly radioactive nature, perrhenate (ReO$_4^-$) was first used as a nonradioactive surrogate for pertechnetate ($^{99}$TcO$_4^-$) given their similarities in both magnitude and trend between the solubilities[47]. The amounts of rhenium species enriched by these materials as a function of its concentration in the supernatant at the equilibrium state were determined by varying the initial concentrations from 25 to 800 ppm with a material-to-solution ratio of 0.5 mg mL$^{-1}$. An overnight reaction time was used to ensure that the ion exchange reached equilibrium. Results indicate that the equilibrium adsorption data of ReO$_4^-$ appeared to follow the Langmuir isotherm model (FIG. 14A); sorption increases rapidly at low ReO$_4^-$ concentrations and slows appreciably as the sorption capacity of the adsorbent is approached, yielding high correlation coefficients ($R^2 > 0.99$). Exchange capacities up to 936, 806, and 1127 mg of ReO$_4^-$ per gram of polymer were observed for PQA-Py-Cl, PQA-pNH$_2$Py-Cl, and PQA-pN(Me)$_2$Py-Cl, respectively, almost 20 times that observed for the unmodified counterparts (POP-Py, POP-pNH$_2$Py, and POP-pN(Me)$_2$Py), affording 53, 46, and 37 mg g$^{-1}$, respectively. Given the greatly enhanced performances after quaternization, we establish that the high density of the ion exchange sites on the polymer backbone is the fundamental contributor to their high working capacities and the mechanism for uptake of ReO$_4^-$ is thus believed to be predominantly ion exchange.

Figure 14B:
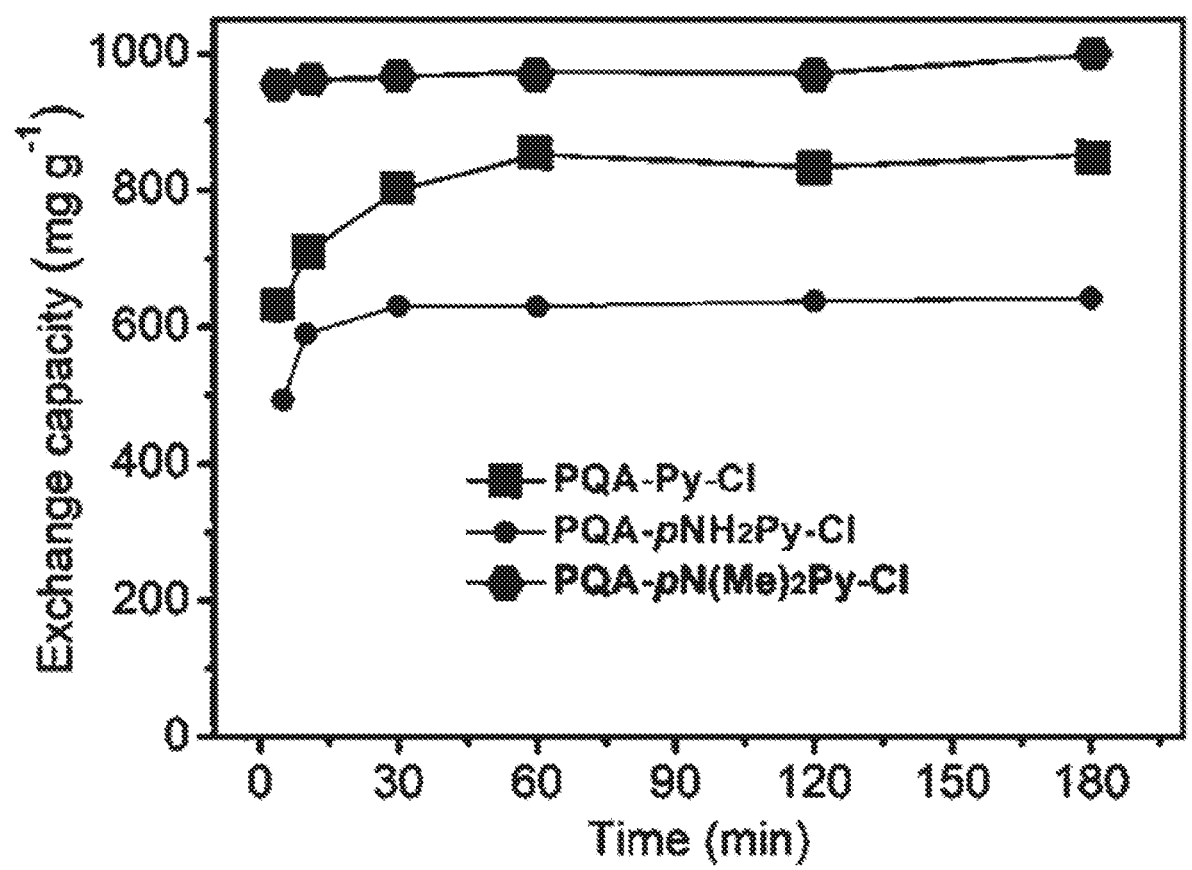

The high extraction capacities for these materials prompted us to evaluate their ion exchange kinetics, which were determined from distilled water samples spiked with 50 ppm of rhenium in the form of ReO$_4^-$. Remarkably, when the solutions were treated with these materials at a phase ratio of 25000 mL g$^{-1}$, extremely rapid ion exchange and high uptake were recognized. All three materials reached their equilibrium exchange capacities within 60 min and in particular, 95.3% removal was achieved after 5 min for PQA-pN(Me)$_2$Py-Cl (FIG. 14B). This is in stark contrast to the lengthy contact times required for many sorbent materials, which routinely range from several hours to as much as several days[48]. The fast kinetics should be an advantage for the continuous treatment of relatively large volumes of slightly contaminated water. We surmise that the impressive uptake capacity along with the fast removal rate is due to the high density of ion-exchange sites and intrinsic porosities allowing for rapid diffusion of ReO$_4^-$ throughout the materials. Notably, in addition to rapid saturation, PQA-pN(Me)$_2$Py-Cl also possessed a higher capacity, yielding an equilibrium value of 997 mg g$^{-1}$, in comparison with 849 and 642 mg g$^{-1}$ afforded by PQA-Py-Cl and PQA-pNH$_2$Py-Cl, respectively, positioning PQA-pN(Me)$_2$Py-Cl as the material with the highest ReO$_4^-$ uptake among all adsorbents reported so far (FIG. 14B). Intriguingly, the increase in gravimetric capacity in going from PQA-pN(Me)$_2$Py-Cl to PQA-Py-Cl and PQA-pNH$_2$Py-Cl is opposite to what would be expected from the density of ion-exchange sites. For instance, on the basis of elemental analysis, it was found to have a Cl$^-$ species content of 10.3, 11.1, and 12.5 wt. %, for PQA-pN(Me)$_2$Py-Cl, PQA-Py-Cl, and PQA-pNH$_2$Py-Cl, respectively. We therefore attribute this anomalous increase in ReO$_4^-$ uptake capacity for PQA-pN(Me)$_2$Py-Cl to the higher electrostatic ion-pairing attraction energies between the cationic polymer backbone of PQA-pN(Me)$_2$Py-Cl and ReO$_4^-$ ions. To rationalize this assumption, we measured the distribution coefficient values (K$_d$, for definition, see the Experimental Section) of these materials toward ReO$_4^-$. Under the conditions of 10 ppm rhenium with a V/m of 1000 mL g$^{-1}$, the K$_d$ values were calculated and found to equal 1.13×10$^6$ (8.82 ppb), 5.44×10$^5$ (18.35 ppb), and 1.00×10$^7$ (1.00 ppb) for PQA-Py-Cl, PQA-pNH$_2$Py-Cl, and PQA-pN(Me)$_2$Py-Cl, respectively (number given in parentheses is the residual rhenium concentration), with PQA-pN(Me)$_2$Py-Cl showing almost more than an order of magnitude improvement in performance over the other two, indicative of its stronger affinity toward ReO$_4^-$ and thereby facilitating the ion exchange between Cl$^-$ and ReO$_4^-$.

Figure 14C:
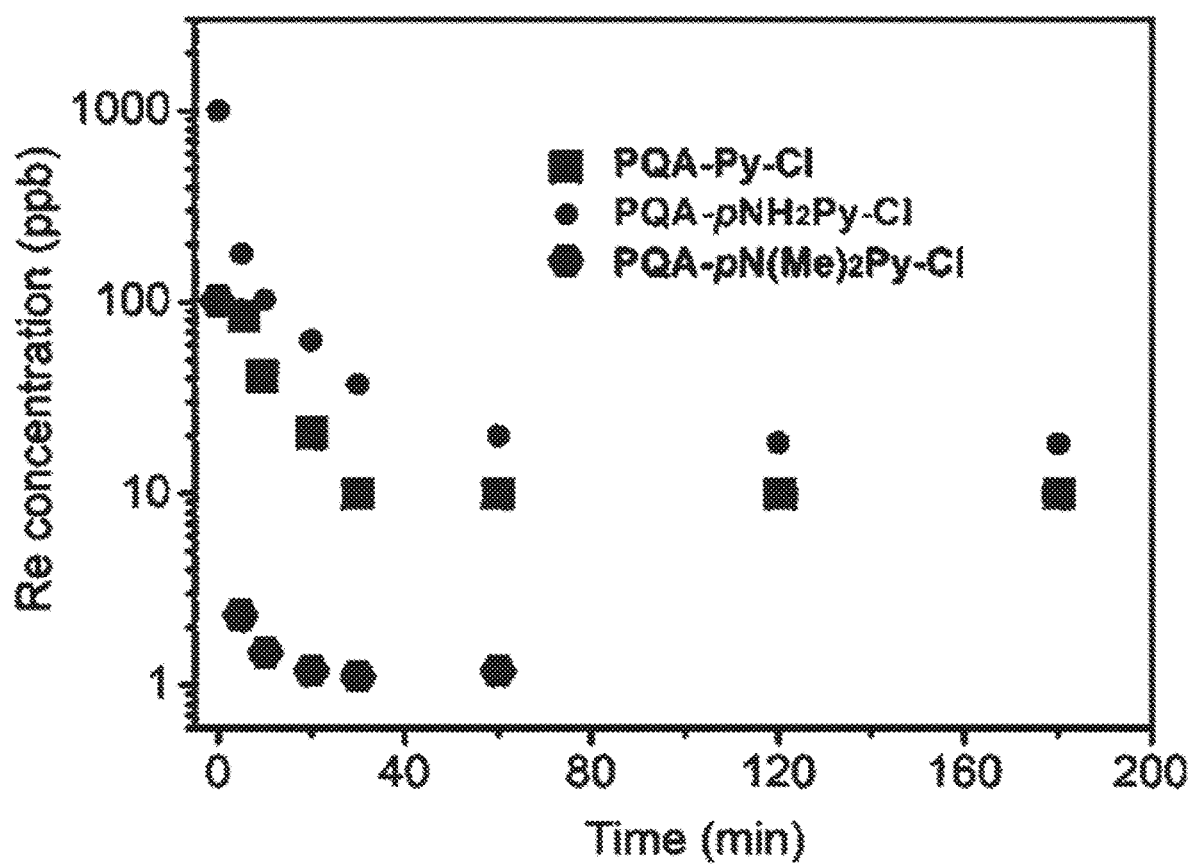

Next, we assessed selectivity over common anions. The material's ability to competitively maintain efficiencies and rapid extraction rates at sub ppm levels, more typical of exposure cases, is one of the most important factors when evaluating a material for water treatment applications. Given the high environmental mobility, any accidental leaching of TcO$_4^-$ poses a real threat to groundwater contamination and aquatic life forms. As such, to access the ion-exchange properties associated with these materials, treatability studies were carried out using groundwater spiked with 1000 ppb of rhenium to simulate the contaminated water from on-site and off-site wells. PQA-pN(Me)$_2$Py-Cl was shown to remove more than 99.8% of ReO$_4^-$ from the groundwater, bringing rhenium concentrations to 1.2 ppb, implying that the interferences commonly found in surface waters have a minimal effect on its performance. It is worth mentioning that the residual rhenium concentrations treated by PQA-pN(Me)$_2$Py-Cl are 8 and 15 times lower than that of PQA-Py-Cl and PQA-pNH$_2$Py-Cl, respectively (FIG. 14C). In addition to the impressive removal efficiency, it is outstanding from the viewpoint of kinetic efficiency, reaching the equilibrium exchange capacity within 20 min and over 99.7% of the rhenium species removed within 5 min. These results highlight the vast potential of PQA-pN(Me)$_2$Py-Cl in accomplishing radionuclide removal from groundwater.

Figure 15A:
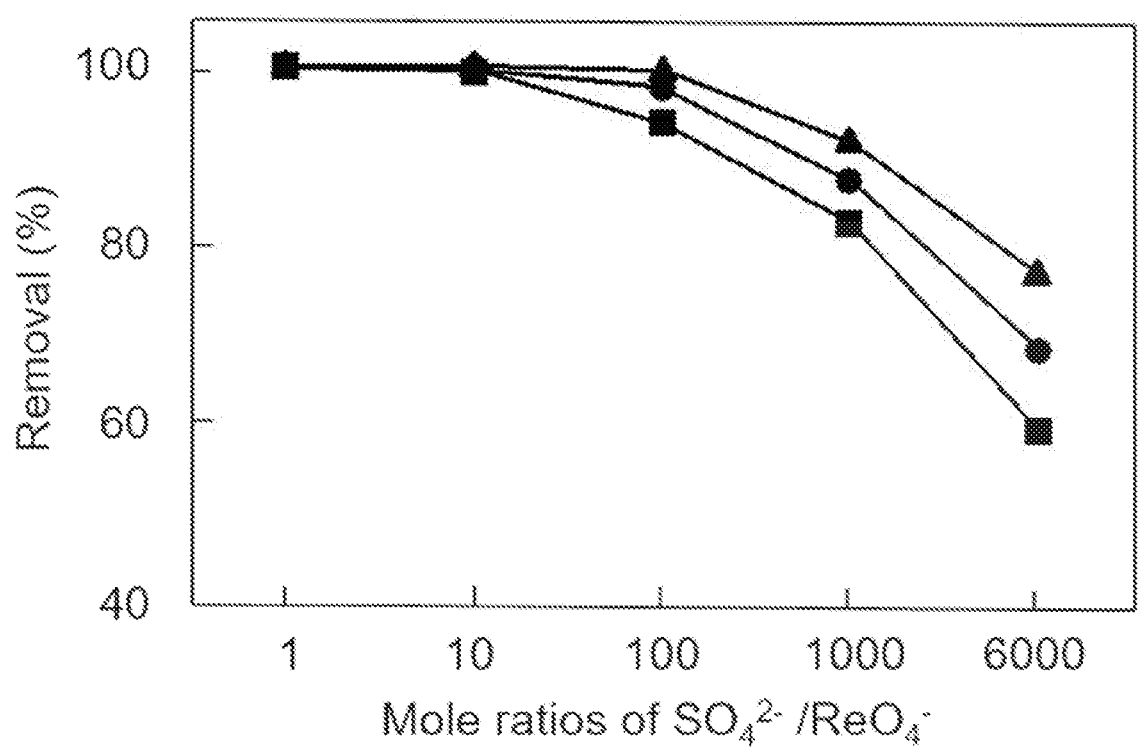
FIGS. 15A-15B show selectivity evaluation. Effect of competing (FIG. 15A) $SO_4^{2-}$ and (FIG. 15B) $NO_3^-$ anions on the anion-exchange of $ReO_4^-$ by (gray) PQA-Py-Cl, (blue) PQA-pNH$_2$Py-Cl, and (red) PQA-pN(Me)$_2$Py-Cl (lines are guidelines for the eyes).
Figure 15B:
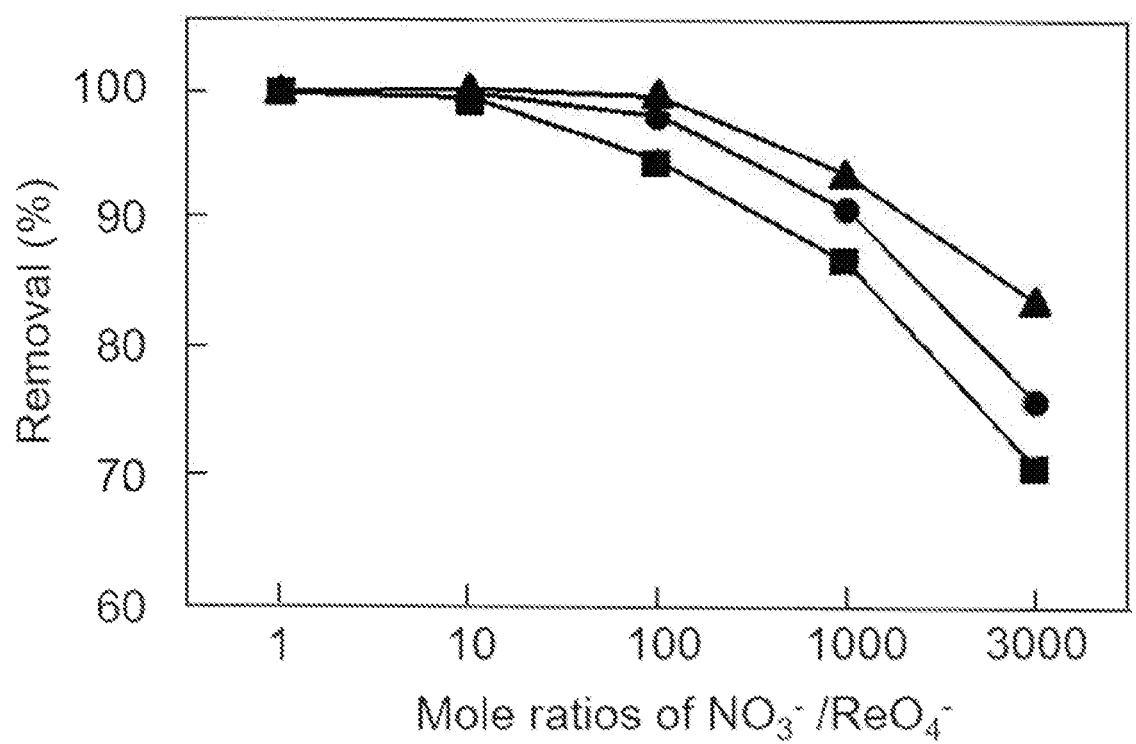

Encouraged by the results above, we then evaluated wastewater samples. Compared to surface water samples, wastewater is often comprised of fewer competing ions but significantly higher concentrations. Given this, to evaluate the sorption selectivity of ReO$_4^-$ against the major anions NO$_3^-$ or SO$_4^{2-}$, we performed binary exchange reactions by varying the equivalent ionic fractions of these anions in reactant solutions. A plot of the removal efficiencies of ReO$_4^-$ against mole fractions of NO$_3^-$ or SO$_4^{2-}$ to ReO$_4^-$ clearly indicated that PQA-pN(Me)$_2$Py-Cl showed a remarkably high tolerance to ReO$_4^-$ sorption ability in the presence of SO$_4^{2-}$ and NO$_3^-$ competition with very high removal efficiencies and excellent K$_d$(Re) values (FIGS. 15A-15B). Specifically, at SO$_4^{2-}$/NO$_3^-$:ReO$_4^-$ molar ratios of 1 to 100, more than 99.9% of ReO$_4^-$ ions were sequestered with K$_d$(Re) values in the range of 1.5×10$^5$-6.6×10$^6$ mL g$^{-1}$. It is interesting that even with a tremendous excess of Na$_2$SO$_4$ (SO$_4^{2-}$:ReO$_4^-$ molar ratio at 6000), PQA-pN(Me)$_2$Py-Cl still retained a very good ReO$_4^-$ removal efficiency (83.4%) and high K$_d$(Re) value (5034 mL g$^{-1}$), indicative of an exceptional selectivity of PQA-pN(Me)$_2$Py-Cl for ReO$_4^-$ against SO$_4^{2-}$. This feature makes it an extremely attractive candidate to selectively remove ReO$_4^-$/TcO$_4^-$ from waste solutions with high ionic strengths. By contrast, under identical conditions, PQA-Py-Cl and PQA-pNH$_2$Py-Cl afforded ReO$_4^-$ removal efficiencies of 75.7% and 70.6%, with corresponding K$_d$(Re) values of 3123 and 2402 mL g$^{-1}$, respectively, inferior to those for PQA-pN(Me)$_2$Py-Cl.

Under all conditions tested, the preference of these pyridinium-based sorbents towards ReO$_4^-$ complexation follows the same order: PQA-pN(Me)$_2$Py-Cl>PQA-Py-Cl>PQA-pNH$_2$Py-Cl. This trend may not be pinpointed to a single property change of the adsorbents but rather as a consequence of a complex interplay of several factors. For example, an increase in surface area may play a key role in the uptake capacity by providing a greater number of exposed exchangeable sites. However, in the present case, only a very weak correlation with the surface area of these materials could be established, thus suggesting that surface area is not the central factor determining the sorption performance; rather, the interaction strength between bonding sites and guest species is a more important factor for determining guest uptake. To understand the lack of dependence on the materials' textural parameters, we investigated the distribution of ReO$_4^-$ in solid samples. Elemental distribution mapping was performed by SEM. We found homogeneously and densely distributed rhenium species throughout each sample. To examine the binding behavior of ReO$_4^-$ in these adsorbents, XPS and IR spectroscopy were carried out. Comparison of Re4f signals in the reacted samples (Re@PQA-Py-Cl, Re@PQA-pNH$_2$Py-Cl, and Re@PQA-pN(Me)$_2$Py-Cl), Re@PQA-pNH$_2$Py-Cl and Re@PQA-pN(Me)$_2$Py-Cl displayed very similar binding energies, giving Re4f$_{7/2}$ signals at 45.1 and 45.0 eV, respectively, which are lower than those in Re@PQA-Py-Cl (45.6 eV) and KReO$_4^-$ (46.1 eV). This presumably arises from the electron donating groups present in PQA-pNH$_2$Py-Cl and PQA-pN(Me)$_2$Py-Cl, which weakens the partial positive charge on the cations and thereby that on the rhenium species. These observations were further corroborated by the IR spectra), a slight red-shift of the ReO$_4^-$ antisymmetric vibration was detected in Re@PQA-pNH$_2$Py-Cl and Re@PQA-pN(Me)$_2$Py-Cl (893.8 cm$^{-1}$) compared to that in Re@PQA-Py-Cl (901.6 cm$^{-1}$) and KReO$_4^-$ samples (906.8 cm$^{-1}$). Regarding electronic factors, the introduction of electron donating groups facilitates the formation of kinetically labile complexes, which allows for rapid guest exchange. However, the relevant explanations cannot correlate with the observed trend, wherein the introduction of the amino group gave adverse results, with the lowest performance of the three materials. To explain this, we reasoned that, different from the dimethylamino group, the amino group acts both as a hydrogen bond donor and a hydrogen bond acceptor. Anions, such as Cl$^-$, are inclined to interact with it via hydrogen bonding, thereby compromising the ion-exchange capability for ReO$_4^-$ ions. Such an interaction between the amino group and the Cl$^-$ ion is expected considering the successful Cl$^-$ extraction solely on an amine-based neutral anion receptor[27].

Computational Methods

Since the polymer is cross-linked and not dissolved in water, we treat it as a separate phase which contains one anion binding site per monomer. The monomer formula weights are 181.07 g mol$^{-1}$, 196.08 g mol$^{-1}$, and 224.11 g mol$^{-1}$. The fraction of binding sites occupied by anion X$^-$ is computed as the ratio, $\theta_{X^-}=n_{X^-,S}/n_{S,total}$, of polymer sites bound to X$^-$ to total polymer sites, $n_{S,total}$. Assuming the polymer phase occupies a negligible fraction of the total solution volume, the occupancy fraction is also related to the solution concentration of ions through mass balance. Mass balance states that the formal concentration of X$^-$ ions is $$\frac{n_{X,total}}{V_{total}} = f_X = [X^-] + [S]\theta_X \quad (20)$$

where [X$^-$] is the concentration of anions in the aqueous phase and $$[S] = \frac{n_{S,total}}{V_{total}}$$

is the formal concentration of polymer binding sites. Finally, the equilibrium constant for the anion exchange reaction, is $$S^+ \cdot Cl^- + X^-_{(aq)} \rightarrow S^+ \cdot X^- + Cl^-_{(aq)} \text{ is} \quad (21)$$

$$K_{Cl^- \rightarrow X^-} = \frac{\theta_{X^-} \gamma_{Cl^-} [Cl^-]}{\theta_{Cl^-} \gamma_{X^-} [X^-]} \approx \frac{[Cl^-](f_X - [X^-])}{[X^-](f_{Cl^-} - [Cl^-])}. \quad (22)$$

The approximation assumes the two aqueous Debye-Huckel ionic activity coefficients are similar so $$\frac{\gamma_{Cl^-}}{\gamma_{X^-}} = 1$$

(appropriate for ions of the same charge and hydrated radius). For isotherms where all Cl$^-$ comes from the polymer, $f_{Cl^-}=[S]$ and the equation for the isotherm is:

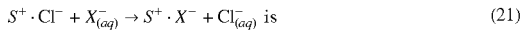

$$\rho_S \theta_X = f_{X^-} - [X^-] = \frac{K_{Cl^- \rightarrow X^-}}{2}\left(\sqrt{\frac{[X^-]^2 + 4[X^-][S]/}{K_{Cl^- \rightarrow X^-}}} - [X^-]\right) \quad (23)$$

However, a more direct way to plot the isotherm would be to take the logarithm of Eq. 22 and show log ([X$^-$]/[Cl$^-$]) as the independent variable.

Ion-binding free energies for each polymer were estimated from calculations on the truncated fragments. Quantum calculations were carried out using density functional theory with the M06 exchange and correlation functionals. A 6-311++G(2d,2p) basis was used for all atoms except Tc, which was treated with the def2-tzvp basis and associated empirical core potential. This combination was found previously to reproduce the experimental structure of the pertechnetate anion.[1,2]

Solvation free energies were computed using the 3D RISM method with the Kovalenko-Hirata closure[3] as implemented by Case and coworkers.[4] We also applied the pressure correction of Ref. 5 as implemented by Misin and coworkers.[8] Solvent interaction Lennard-Jones parameters for all atoms were computed from MMFF94 nonbonded parameters between each atom and water oxygen. These were calibrated so that the parameters would be computed correctly by the Lorentz-Berthelot combination rule employed by the 3D RISM model with its SPC water model.

The trends show that all structures are selective for TcO$_4^-$ over NO$_3^-$ and HSO$_4^-$. Comparison was not made directly to SO$_4^{2-}$ because the difference in net charge would introduce long-range correction terms, incurring additional numerical error, and a dependence on solution ionic strength. However, the polymer environment is relatively hydrophobic, and it may be the case that SO$_4^{2-}$ is deprotonated during exchange. On the other hand, if the pKa of HSO$_4^-$ is identical in both the polymer and aqueous phases, then the free energy of exchanging HSO$_4^-$ will also equal the free energy of exchanging SO$_4^{2-}$.

Gas-phase partition coefficients were calculated considering only the anion translational and rotational contributions using:

$$\frac{q(C^+X^-)}{q(C^+)q(X^-)} \approx \frac{q_{vib}(X^-|C^+)}{q_{tr}(X^-)q_{rot}(X^-)} e^{-\beta(E_{C^+X^-}-E_{C^+}-E_{X^-})} \quad (24)$$

With energies, E, computed from the ground state energy of each molecule and q$_{tr}$(X$^-$)q$_{rot}$(X$^-$) the standard expressions for ligand gas-phase translational and rotational partition functions including symmetry numbers (1 for Cl$^-$, 2 for HSO$_4^-$, and 12 for NO$_3^-$ and TcO$_4^-$). Eq.S.5 is appropriate if the polymer and anion behave as rigid bodies during binding, so their internal degrees of freedom are frozen. The numerator treats the anion as a rigid body with 6 (or 3 for Cl$^-$) vibrational degrees of freedom, $$q_{vib}(X^-|C^+) = \Pi_{j=1}^{6} \frac{e^{-\beta h \nu_j/2}}{1 - e^{-\beta h \nu_j}}. \quad (25)$$

Here $v_j$ are the vibrational frequencies of external coordinates for $X^-$ in the field of $C^+$ obtained by diagonalizing the mass-weighted projected Hessian matrix, $diag(M,I)^{-1/2}$ $[T|R]^T H [T|R] diag(M,I)^{-1/2}$, with H the Hessian for the anion coordinates in the presence of $C^+$, M the total mass of $X^-$ (scaling translations, T), I the principle moments of inertia for $X^-$ (scaling infinitesimal rotations, R). The 3N by 3 matrices T and R are given explicitly by, $$T_{ij} = \begin{cases} 1, i \bmod 3 = j \\ 0, \text{otherwise} \end{cases}, R_{ij} = r_{\lfloor i/3 \rfloor} \times L_{i \bmod 3} \quad (26)$$

with r the vector of anion coordinates and L; a unit vector in the direction of the $j^{th}$ moment of inertia ($I_j$). For $X=Cl^-$, the rotational modes are omitted.

Density Functional Theory Calculation Studies.

We carried out quantum density functional theory (DFT) computations to understand the chemical basis of the binding selectivities toward $ReO_4^-/TcO_4^-$. Calculations on truncated fragments were performed using M06 exchange and correlation functionals as implemented in NWChem. A 6-311++G(2d,2p) basis was used for all atoms except technetium, which was treated with the def2-tzvp basis and associated empirical core potential. Distribution of the charge density around the aromatic ring was shown by examining a plot of the electrostatic potential surface just below the molecule. The most favorable binding geometry for a triangular face of an anion was observed to have opposite orientations between the cationic building blocks of PQA-Py-Cl, PQA-pNH$_2$Py-Cl, and PQA-pN(Me)$_2$Py-Cl. Methyl groups were introduced to take the electrostatic effects of the polymer chain into account. Comparison demonstrated some negative charge is donated to the ring system during formation of a hydrogen bond.

Binding free energies were computed for $Cl^-$, $TcO_4^-$, $NO_3^-$, and $HSO_4^-$ to all four structures using the quasichemical method. The anion $HSO_4^-$ was used in place of $SO_4^{2-}$ because the computational results are more reliable when comparing ions of equal valence. The difference in binding free energies between $HSO_4^-$ and $SO_4^{2-}$ is the same as the difference between the pKas of $HSO_4^-$ in bulk solution compared to $HSO_4^-$ bound to the polymer.

A large portion of the binding free energies is due to solvation effects. These increase polymer binding affinity of the larger (less hydrophilic) $TcO_4^-$ over the smaller $Cl^-$ and $NO_3^-$. Although our solvation free energy calculations were carried out for liquid water, the polymer environment is expected to be slightly more hydrophobic. This will give $TcO_4^-$ and additional boost relative to other ions that is not reflected in our final calculated selectivities. Entropic effects also contribute additional uncertainty to the calculations because it is difficult to predict the change in volume or rigidity of the surrounding polymer environment upon ion binding. Because of this, our free energy computations include only ligand translational and rotational entropy contributions (treating both binding partners as rigid bodies). Relative to $Cl^-$ (which has no rotational entropy), the entropy contributions decrease the overall affinity for all ions by 2.5-6 kcal mol$^{-1}$.

The chemical portion of the binding free energies is provided by energy differences in minimum energy configurations. The energy difference itself favors binding of $NO_3^-$ and $HSO_4^-$ over $TcO_4^-$ by 7, 5, and 4 kcal mol$^{-1}$. Just as seen in experiments, the final order of ion exchange affinity in solution is $TcO_4^- > HSO_4^- > NO_3^- > Cl^-$ for all polymers.

Stability Test.

Figure 16A:
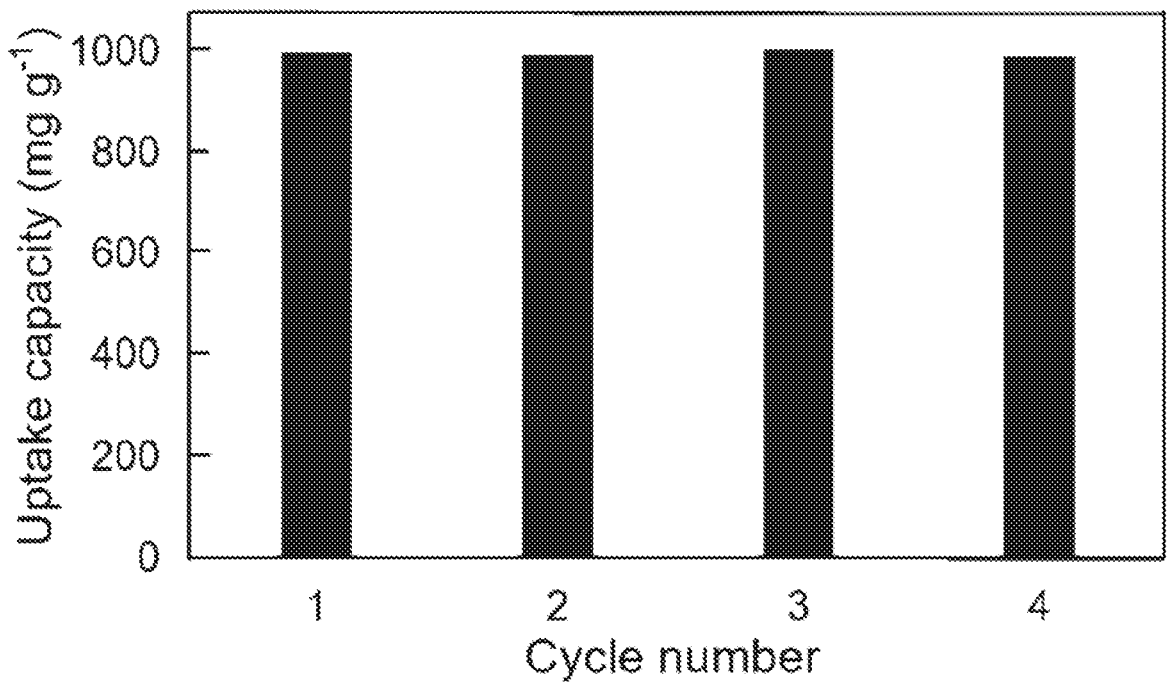
FIGS. 16A-16D show stability evaluation.
Figure 16B:
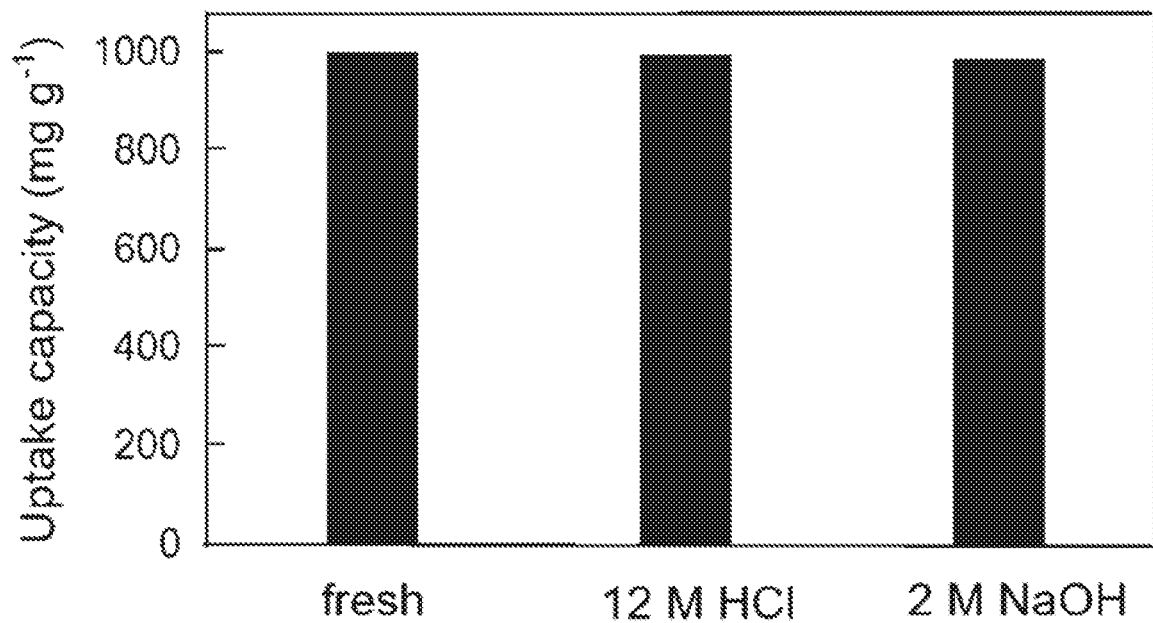
Figure 16C:
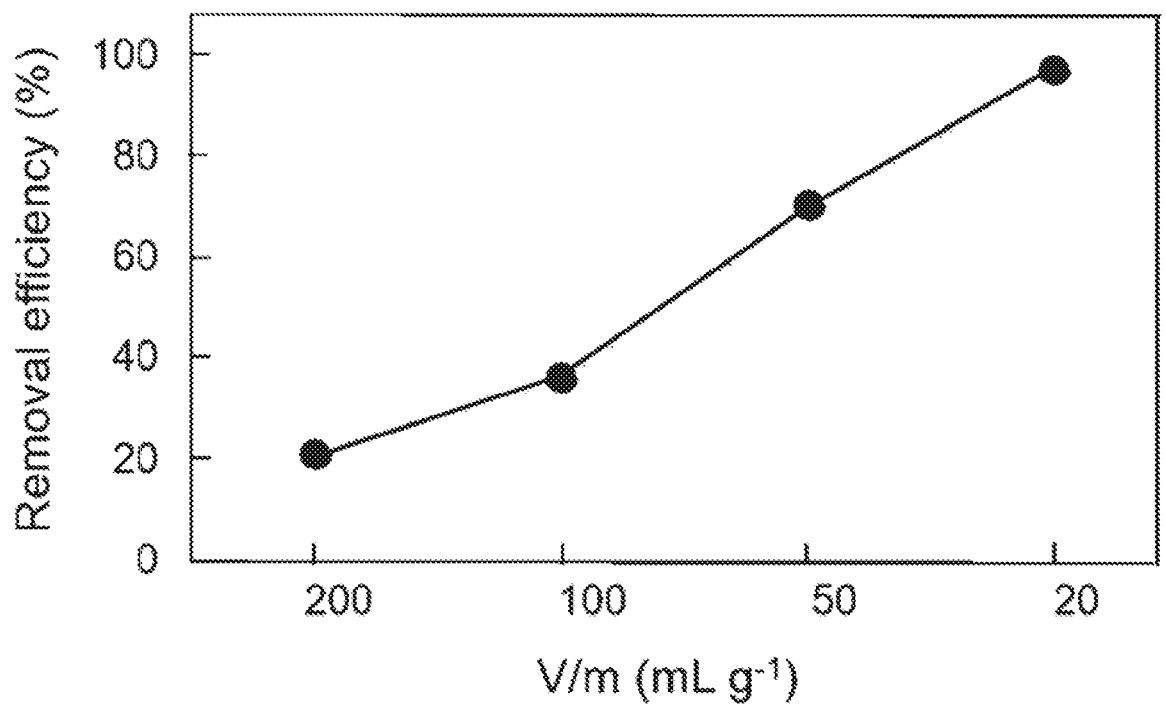

Considering the superior performance of PQA-pN(Me)$_2$Py-Cl to extract $ReO_4^-$ with good affinity and selectivity in the aforementioned situations, it was therefore the sample of choice for more detailed studies. The ability to regenerate and recycle the material would afford great advantages in reducing the overall cost and hence facilitating practical applications. To this end, the possibility of regeneration and reusing of PQA-pN(Me)$_2$Py-Cl were evaluated. Significantly, the ion exchange processes were fully reversible as reflected by the fact that the loaded $ReO_4^-$ ions can be washed off by saturated NaCl aqueous solutions with maintained ion-exchange capacity for at least three cycles, affording 990, 1003, and 987 mg g$^{-1}$, respectively (FIG. 16A). These results suggestthe adequate chemical and structural stability of PQA-pN(Me)$_2$Py-Cl, which was further established by the following experiments. The $ReO_4^-$ uptake capacities of PQA-pN(Me)$_2$Py-Cl remained almost unchanged after being soaked in 12 M HCl or 2 M NaOH in saturated NaCl aqueous solution for one week (FIG. 16B). More impressively, PQA-pN(Me)$_2$Py-Cl was able to maintain its performance in extraction of $ReO_4^-$ from 3 M $HNO_3$ solution for more than 3 times with approximately 70% of $ReO_4^-$ from 3 M $HNO_3$ solution containing 1.6 mM of $ReO_4^-$ ($NO_3^-$:$ReO_4^-$ molar ratio=1875) at a phase ratio of 50 mL g$^{-1}$ after a single treatment (FIG. 16C). Notably, a removal efficiency of 97% can be reached at a phase ratio of 20 mL g$^{-1}$ (a number that is nearly half that used for the chromatographic column application, 11 mL g$^{-1}$). These features clearly represent a priority in uptake for $ReO_4^-$/$TcO_4^-$ over $NO_3^-$, thereby showing its potential for removing $TcO_4^-$ from reprocessed used fuel prior to the plutonium uranium redox extraction (PUREX) process.

Figure 16D:
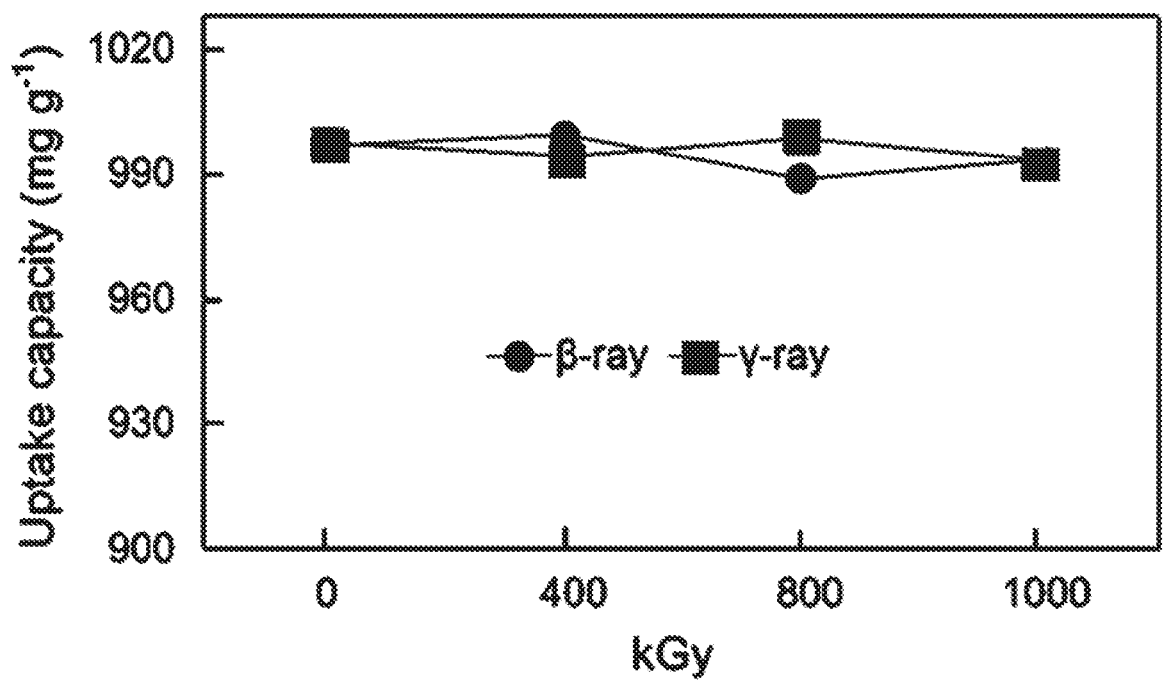

Given that the above studies were done with non-radioactive elements, how radiation interacts with the materials was not taken into account[49]. Therefore, to rationalize results obtained from simulants, external radiation sources were exerted. Very impressively, PQA-pN(Me)$_2$Py-Cl exhibits outstanding resistance toward high-energy ionizing radiation of both β- and γ-rays, indicative by no noticeable change in the IR spectra or the sorption performance measurements on the irradiated samples in relation to the pristine material, thereby providing a substantial prerequisite for application in used nuclear fuel reprocessing and waste management. Remarkably, even after irradiation with extremely large doses of 1000 kGy of β- or γ-rays, the sorption rate and capacity for $ReO_4^-$ by PQA-pN(Me)$_2$Py-Cl remained unaffected (FIG. 16D). PQA-pN(Me)$_2$Py-Cl combines the attributes of high capacity, reusability, and resistance against radiation, providing an extended lifetime that is sought after for long-term use in nuclear waste water treatment applications.

Removal from Simulated Nuclear Wastes.

To further validate the results, $TcO_4^-$ uptake experiments were performed by contacting PQA-pN(Me)$_2$Py-Cl with an aqueous solution of $TcO_4^-$. The concentration of $TcO_4^-$ was monitored by liquid scintillation counting measurements. PQA-pN(Me)$_2$Py-Cl was kinetically favored, 99% of $TcO_4^-$ could be removed within 5 min.

With this success, it promoted us to investigate performance of PQA-pN(Me)$_2$Py-Cl in legacy nuclear waste. Previous estimates of Hanford tank waste inventories indicated that the amount of technetium in the waste needed to be reduced substantially to prepare immobilized low activity waste (ILAW) glass that meets performance assessment requirements. To investigate the removal of $TcO_4^-$ for this application, we prepared a simulated Hanford LAW melter recycle stream, where the amounts of $NO_3^-$, $NO_2^-$, and $Cl^-$ are more than 300 times that of $TcO_4^-$, resulting in an enormous challenge to selectively remove $TcO_4^-$. Following similar experimental conditions as the established procedures, PQA-pN(Me)$_2$Py-Cl was found to remove about 95% of available $TcO_4^-$ from the waste at a phase ratio of 200 mL g$^{-1}$, placing it within striking distance of the all-time $TcO_4^-$ removal record. To further extend the potential application of PQA-pN(Me)$_2$Py-Cl in nuclear waste remediation, we tested its capability for the decontamination of $TcO_4^-$ in Savannah River Sites. It was shown to be effective for the segregation of $TcO_4^-$ from simplified simulants, a strong basic $TcO_4^-$ solution with the strength of other anions over 70 000 times that of $TcO_4^-$. Approximately 80% of available $TcO_4^-$ was extracted from the waste at a phase ratio of 100 mL g$^{-1}$, which to date, we have found no materials in the literature with comparable selectivity under similar conditions. Although applicable to pertechnetate-containing waste streams in general, these two examples discussed here were directed at two specific potential applications at the U.S. Department of Energy's legacy site: i) the removal of dilute pertechnetate from near-neutral solutions, typical of the eluent streams from pretreated Hanford tank wastes, and ii) the direct removal of pertechnetate from highly alkaline solutions, typical of those found in Savannah River Sites.

Discussion

In summary, based on the results above, we can now formulate clear design rules to achieve ideal $ReO_4^-/TcO_4^-$ scavengers with optimal uptake capacity and selectivity. The presented case shows that a subtle interplay between various functions in the adsorbent-in this case incorporation of a distinct functionality on a cation moiety-would be used to obtain an optimally performing adsorbent. Given the fact that ion exchange often follows a similar mechanism, we expect that the trends discovered here will also be of high relevance for many other sequestration processes, such as coordinative binding. We conceptually showed the potential for tuning binding sites in selective capture to a greater degree of complexity. Given the demonstrated easy tunability, regeneration, and separation combined with radioactive resistance, long-term stability, and high performance in application relevant conditions, these new materials presented here could become highly influential for nuclear wastewater treatment technologies, particularly in the event of an impending water crisis. Also, potential cost savings and schedule acceleration could be anticipated based on consequent improvements in vitrification processing, reduction in waste form volumes, and higher waste-package performance.

References for Example 7
1. Dresselhaus, M. S. & Thomas, I. L. Alternative energy technologies. *Nature* 414, 332-337 (2001).
2. Li, B., Dong, X., Wang, H., Ma, D., Tan, K., Jensen, S., Deibert, B. J., Butler, J., Cure, J., Shi, Z., Thonhauser, T., Chabal, Y. J., Han, Y. & Li, J. Capture of organic iodides from nuclear waste by metal-organic framework-based molecular traps. *Nat. Commun.* 8, 485 (2017).
3. Abney, C. W., Mayes, R. T., Saito, T. & Dai, S. Materials for the recovery of uranium from seawater. *Chem. Rev.* 117, 13935-14013 (2017).
4. Yue, Y., Mayes, R. T., Kim, J., Fulvio, P. F., Sun, X.-G., Tsouris, C., Chen, J., Brown S. & Dai, S. Seawater uranium sorbents: preparation from a mesoporous copolymer initiator by atom-transfer radical polymerization. *Angew. Chem. Int. Ed.* 52, 13458-13462 (2013).
5. Yuan, Y., Yang, Y., Ma, X., Meng, Q., Wang, L., Zhao, S. & Zhu, G. Molecularly imprinted porous aromatic frameworks and their composite components for selective extraction of uranium ions. *Adv. Mater.* 30, 1706507 (2018).
6. Sun, Q., Aguila, B., Earl, L. D., Abney, C. W., Wojtas, L., Thallapally, P. K. & Ma, S. Covalent organic frameworks as a decorating platform for utilization and affinity enhancement of chelating sites for radionuclide sequestration. *Adv. Mater.* 30, 1705479 (2018).
7. Taylor, R. Reaction: a role for actinide chemists. Chem 1, 659-665 (2016).
8. zur Loye, H.-C., Besmann, T., Amoroso, J., Brinkman, K., Grandjean, A., Henager, C. H., Hu, S., Misture, A. T., Phillpot, S. R., Shustova, N. B., Wang, H., Koch, R. J., Morrison, G. & Dolgopolova, E. Hierarchical materials as tailored nuclear waste forms: a perspective. *Chem. Mater.* 30, 4475-4488 (2018).
9. Abney, C. W., Taylor-Pashow, K. M. L., Russell, S. R., Chen, Y., Samantaray, R., Lockard, J. V. & Lin, W. Topotactic transformations of metal-organic frameworks to highly porous and stable inorganic sorbents for efficient radionuclide sequestration. *Chem. Mater.* 26, 5231-5243 (2014).
10. Harvey, P., Nonat, A., Platas-Iglesias, C., Natrajan, L. S. & Charbonniére, L. J. Sensing uranyl(VI) ions by coordination and energy transfer to a luminescent europium (III) complex. *Angew. Chem. Int. Ed.* 57, 9921-9924 (2018).
11. Seliman, A. F., Samadi, A., Husson, S. M., Borai, E. H. & DeVol, T. A. Preparation of polymer-coated, scintillating ion-exchange resins for monitoring of $^{99}$Tc in groundwater. *Anal. Chem.* 83, 4759-4766 (2011).
12. Amendola, V., Bergamaschi, G., Boiocchi, M., Alberto, R. & Braband, H. Fluorescent sensing of $^{99}$Tc pertechnetate in water. *Chem. Sci.* 5, 1820-1826 (2018).
13. Del Cul, G. D., Bostick, W. D., Trotter, D. R. & Osboren, P. E. Technetium-99 removal from process solutions and contaminated groundwater. *Sep. Sci. Technol.* 28, 551-564 (1993).
14. Darab, J. G., Amonette, A. B., Burke, D. S. D., Orr, R. D., Ponder, S. M., Schrick, B., Mallouk, T. E., Lukens, W. W., Caulder, D. L. & Shuh, D. K. Removal of pertechnetate from simulated nuclear waste streams using supported zero valent iron. *Chem. Mater.* 19, 5703-5713 (2007).
15. Lee, M.-S., Um, W., Wang, G., Kruger, A., Luken, W. W., Rousseau, R. & Glezakou, V.-A. Impeding $^{99}$Tc(IV) mobility in novel waste forms. *Nat. Commun.* 7, 12067 (2016).
16. Drout, R. J., Otake, K., Howarth, A. J., Islamoglu, T., Zhu, L., Xiao, C., Wang, S. & Farha, O. K. Efficient capture of perrhenate and pertechnetate by a mesoporous Zr metal-organic framework and examination of anion binding motifs. *Chem. Mater.* 30, 1277-1284 (2018).
17. Banerjee, D., Kim, D., Schweiger, M. J., Kruger, A. A. & Thallapally, P. K. Removal of $TcO_4^-$ ions from solution: materials and future outlook. *Chem. Soc. Rev.* 45, 2724- 2739 (2016).
18. Li, J., Wang, X., Zhao, G., Chen, C., Chai, Z., Alsaedi, A., Hayat, T. & Wang X. Metal-organic framework-based materials: superior adsorbents for the capture of toxic and radioactive metal ions. *Chem. Soc. Rev.* 47, 2322-2356 (2018).
19. Li, B., Zhang, Y., Ma, D., Xing, Z., Ma, T., Shi, Z., Ji, X. & Ma, S. Creation of a new type of ion exchange material for rapid, high-capacity, reversible and selective ion exchange without swelling and entrainment. *Chem. Sci.* 7, 2138-2144 (2016).

20. Wang, S., Alekseev, E. Y., Diwu, J., Casey, W. H., Phillips, B. L., Depmeier, W. &Albrecht-Schmitt, T. E. NDTB-1: A supertetrahedral cationic framework that removes $TcO_4^-$ from solution. *Angew. Chem. Int. Ed.* 49, 1057-1060 (2010).
21. Wang, S., Yu, P., Purse, B. A., Orta, M. J., Diwu, J., Casey, W. H., Phillips, B. L., Alekseev, E. V., Depmeier, W., Hobbs, D. T. & Albrecht-Schmitt, T. E. Selectivity, kinetics, and efficiency of reversible anion exchange with $TcO_4^-$ in a supertetrahedral cationic framework. *Adv. Funct. Mater.* 22, 2241-2250 (2012).
22. Sheng, D., Zhu, L., Xu, C., Xiao, C., Wang, Y., Wang, Y., Chen, L., Diwu, J., Chen, J., Chai, Z., Albrecht-Schmitt, T. E. & Wang, S. Efficient and selective uptake of $TcO_4^-$ by a cationic metal-organic framework material with open $Ag^+$ sites. *Environ. Sci. Technol.* 51, 3471-3479 (2017).
23. Zhu, L., Sheng, D., Xu, C., Dai, X., Silver, M. A., Li, J., Li, P., Wang, D., Wang, Y., Chen, L., Xiao, C., Chen, J., Zhou, R., Zhang, C., Farha, O. K., Chai, Z., Albrecht-Schmitt, T. E. & Wang, S. Identifying the recognition site for selective trapping of $^{99}TcO_4^-$ in a hydrolytically stable and radiation resistant cationic metal-organic framework. *J. Am. Chem. Soc.* 139, 14873-14876 (2017).
24. Li, J., Dai, X., Zhu, L., Xu, C., Zhang, D., Silver, M. A., Li, P., Chen, L., Li, Y., Zuo, D., Zhang, H., Xiao, C., Chen, J., Diwu, J., Farha, O. K., Albrecht-Schmitt, T. E., Chai, Z. & Wang, S. $^{99}TcO_4^-$ remediation by a cationic polymeric network. *Nat. Commun.* 9, 3007 (2018).
25. Zhang, D., Ronson, T. K., Mosquera, J., Martinez, A. & Nitschke, J. R. Selective anion extraction and recovery using a $Fe^{II}_4L_4$ cage. *Angew. Chem. Int. Ed.* 57, 3717-3721 (2018).
26. He, Q., Williams, N. J., Oh, J. H., Lynch, V. M., Kim, S. K., Moyer, B. A. & Sessler, J. L. *Angew. Chem. Int. Ed.* 57, 11924⁻ 11928 (2018).
27. Schmidtchen, F. P. & Berger M. Artificial organic host molecules for anions. *Chem. Rev.* 97, 1609-1646 (1997).
28. Ji, X., Wu, R.-T., Long, L., Guo, C., Khashab, N. M., Huang, F. & Sessler, J. L. Physical removal of anions from aqueous media by means of a macrocycle-containing polymeric network. *J. Am. Chem. Soc.* 140, 2777-2780 (2018).
29. Huang, N., Zhai, L., Xu, H. & Jiang, D. Stable covalent organic frameworks for exceptional mercury removal from aqueous solutions. *J. Am. Chem. Soc.* 139, 2428-2434 (2017).
30. Ding, S.-Y., Dong, M., Wang, Y.-W., Chen, Y.-T., Wang, H.-Z., Su, C.-Y. & Wang, W. Thioether-based fluorescent covalent organic framework for selective detection and facile removal of mercury(II). *J. Am. Chem. Soc.* 138, 3031-3037 (2016).
31. Li, Z., Li, H., Guan, X., Tang, J., Yusran, Y., Li, Z., Xue, M., Fang, Q., Yan, Y., Valtchev, V. & Qiu, S. Three-dimensional ionic covalent organic frameworks for rapid, reversible, and selective ion exchange. *J. Am. Chem. Soc.* 139, 17771-17774 (2017).
32. Alsbaiee, A., Smith, B. J., Xiao, L., Ling, Y., Helbling, D. E. & Dichtel, W. R. Rapid removal of organic micropollutants from water by a porous β-cyclodextrin polymer. *Nature* 529, 190-194 (2016).
33. Sun, D. T., Peng, L., Reeder, W. S., Moosavi, S. M., Tiana, D., Britt, D. K., Oveisi, E. & Queen, W. L. Rapid, selective heavy metal removal from water by a metal-organic framework/polydopamine composite. *ACS Cent. Sci.* 4, 349-356 (2018).
34. Alvarez, P. J., Chan, C. K., Elimelech, M., Halas, N. J. & Villagrán, D. Emerging opportunities for nanotechnology to enhance water security. *Nat. Nanotech.* 13, 634-641(2018).
35. Slater, A. G. & Cooper, A. I. Function-led design of new porous materials. *Science* 348, aaa988 (2015).
36. Das, S.; Heasman, P.; Ben, T. & Qiu, S. Porous organic materials: strategic design and structure-function correlation. *Chem. Rev.* 117, 1515-1563 (2017).
37. Xu, Y.; Jin, S.; Xu, H.; Nagai, A. & Jiang, D. Conjugated microporous polymers: design, synthesis and application. *Chem. Soc. Rev.* 42, 8012-8031 (2013).
38. Wu, D.; Xu, F.; Sun, B.; Fu, R.; He, H. & Matyjaszewski, K. Design and preparation of porous polymers. *Chem. Rev.* 112, 3959-4015 (2012).
39. Li, B.; Zhang, Y.; Ma, D.; Shi, Z. & Ma, S. Mercury nano-trap for effective and efficient removal of mercury (II) from aqueous solution. *Nat. Commun.* 5, 5537 (2014).
40. Byun, J.; Patel, H. A.; Thirion, D. & Yavuz, C. T. Charge-specific size-dependent separation of water-soluble organic molecules by fluorinated nanoporous networks. *Nat. Commun.* 7, 13377 (2016).
41. Sun, Q.; Aguila, B.; Perman, J.; Ivanov, A. S.; Bryantsev, V. S.; Earl, L. D.; Abney, C. W.; Wojtas, L. & Ma, S. Bio-inspired nano-traps for uranium extraction from seawater and recovery from nuclear waste. *Nat. Commun.* 9, 1644 (2018).
42. Sun, X.; Luo, H. & Dai, S. Ionic liquids-based extraction: a promising strategy for the advanced nuclear fuel cycle. *Chem. Rev.* 112, 2100-2128 (2012).
43. Bonnesen, P. V., Brown, G. M., Alexandratos, S. D., Bavoux, L. B., Presley, D. J., Patel, V., Ober, R. & Moyer, B. A. Development of bifunctional anion-exchange resins with improved selectivity and sorptive kinetics for pertechnetate: batch-equilibrium experiments. *Environ. Sci. Technol.* 34, 3761-3766 (2000).
44. Sun, Q.; Aguila, B.; Verma, G.; Liu, X.; Liu, X.; Dai, Z.; Deng, F.; Meng, X.; Xiao, F.-S. & Ma, S. Superhydrophobicity: constructing homogeneous catalysts into superhydrophobic porous frameworks to protect them from hydrolytic degradation. *Chem* 1, 628-639 (2016).
45. Sun, Q.; Dai, Z.; Liu, X.; Sheng, N.; Deng, F.; Meng, X. & Xiao, F.-S. Highly efficient heterogeneous hydroformylation over Rh-metalated porous organic polymers: synergistic effect of high ligand concentration and flexible framework. *J. Am. Chem. Soc.* 137, 5204-5209 (2015).
46. Sun, Q., Ma, S., Dai, Z., Meng, X. & Xiao, F.-S. A hierarchical porous ionic organic polymer as a new platform for heterogeneous phase transfer catalysis. *J. Mater. Chem. A* 47, 23871-23875 (2015).
47. Darab, J. G. & Smith, P. A. Chemistry of technetium and rhenium species during low-level radioactive waste vitrification. *Chem. Mater.* 8, 1004-1021 (1996).
48. Santhosh, C., Velmurugan, V., Jacob, G., Jeong, S. K., Grace, A. N. & Bhatnagar, A. Role of nanomaterials in water treatment applications: A review. *Chem. Eng. J.* 306, 1116-1137 (2016).
49. Pillay, K. K. S. A review of the radiation stability of ion exchange materials. *J. Radioanal. Nucl. Chem.* 102, 247-268 (1986).

Example 8: Borate/Boric Acid Functionalized Covalent Organic Frameworks

Synthesis of Borate/Boric Acid Functionalized Covalent Organic Frameworks

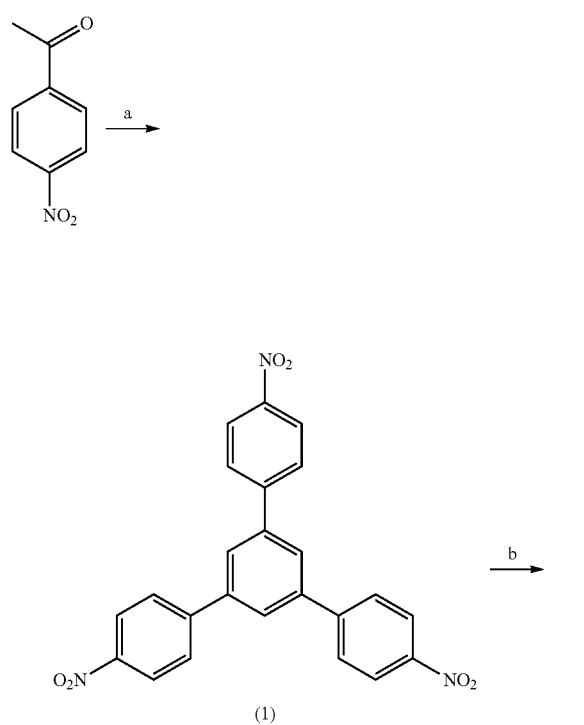

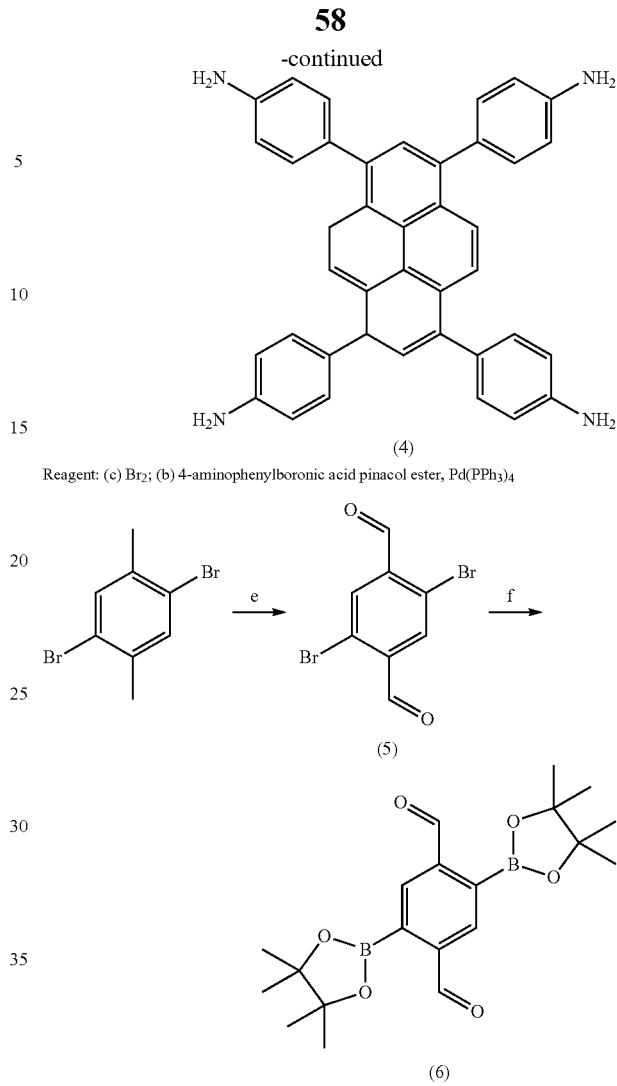

Reagent: (c) Br₂; (b) 4-aminophenylboronic acid pinacol ester, Pd(PPh₃)₄

Reagent: (e) CH₃COOH, (CH₃CO)₂O, H₂SO₄, CrO₃; (b) bis(pinacolato)diboron, Pd(dppf)Cl₂

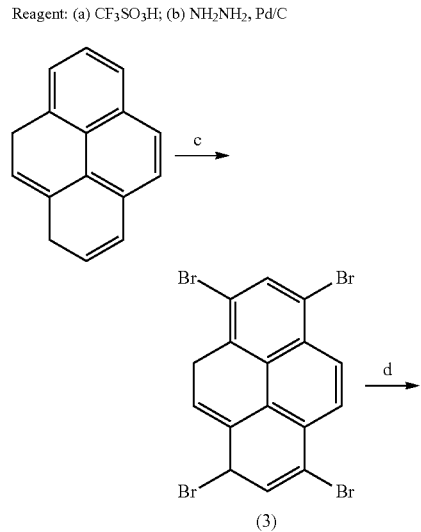

Reagent: (a) CF₃SO₃H; (b) NH₂NH₂, Pd/C 1,3,5-tris(4-nitrophenyl)benzene (1). 4-Nitroacetophenone (50 g), toluene (200 mL), and CF$_3$SO$_3$H (2.0 mL) were added to a flask equipped with a water separator and a cooling condenser. The mixture was refluxed for 48 h, during this time the formed water was eliminated as a toluene azeotrope. After being cooled to room temperature, the mixture was filtered and washed with DMF under refluxing to yield a grey-green solid product after drying. This product is insoluble in any common solvent.

1,3,5-tris-(4-aminophenyl)benzene (2). A suspension of 1,3,5-tris(4-nitrophenyl)benzene (12.5 g, 28.4 mmol) and Pd/C (5 wt %, 2.0 g) in ethanol (200 mL) was heated to reflux. Hydrazine hydrate (30 mL) was added in portions, and the resulting mixture was refluxed overnight. After that, the mixture was filtered through celite in hot and left the filtrate undisturbed to fully crystallize the product. The solid was collected by filtration and washed with cold ethanol. Yield: 8.3 g (84%). $^1$H NMR (400 MHz, d$_6$-DMSO, 298K, TMS): δ 7.50 (t, 9H, J=5.8 Hz), 6.69 (d, 6H, J=8.4 Hz), 5.22 (s, 6H) ppm. $^{13}$C NMR (125 MHz, d$_6$-DMSO, 298K, TMS) 193.65, 138.46, 135.77, 132.45, 130.59, 120.48 ppm.

1,3,6,8-tetrabromopyrene (3): To a mixture of pyrene (10.1 g, 50.0 mmol) and nitrobenzene (350 mL), Br$_2$ (220 mmol in 200 mL of nitrobenzene,) was added dropwise.

After the addition was complete, the yellow suspension was heated at 120° C. for 18 h and then cooled to room temperature. The precipitate was filtered off, washed with ethanol, and dried under vacuum to yield 1,3,6,8-tetrabromopyrene as a pale yellow solid (24.2 g, 94%). The product was found to be insoluble in all common organic solvents, limiting characterization.

1,3,6,8-tetrakis(4-aminophenyl)pyrene (4): 1,3,6,8-Tetrabromopyrene (1.48 g, 2.86 mmol), 4-aminophenylboronic acid pinacol ester (3.0 g, 13.7 mmol), $K_2CO_3$ (2.2 g, 15.8 mmol), and $Pd(PPh_3)_4$ (0.33 g, 0.29 mmol) were introduced into a mixture of 1,4-dioxane (50 mL) and $H_2O$ (10 mL). The resulting mixture was refluxed at 115° C. under $N_2$ atmosphere for 3 d. After cooling to room temperature, the solution was poured into water and the resulting precipitate was filtered off, washed with water and methanol. The resulting solid was further purified by flash chromatography with acetone as eluent to afford the title compound as a yellow-brown solid. Yield: (1.49 g, 92%). $^1$H NMR (400 MHz, $d_6$-DMSO, 298K, TMS): δ 8.13 (s, 4H), 7.79 (s, 2H), 7.35 (d, 8H, J=8.4 Hz), 6.77 (d, 8H, J=8 Hz), 5.32 (s, 8H) ppm. $^{13}$C NMR (125 MHz, $d_6$-DMSO, 298K, TMS) 148.69, 137.59, 131.52, 129.50, 128.03, 127.17, 126.58, 124.89, 114.4 ppm.

2,5-dibromobenzene-1,4-dicarbaldehyde (5). To a mixture of 2,5-dibromo-p-xylene (8 g), acetic acid (40 mL), acetic anhydride (80 mL) at 0° C., sulfuric acid (28 mL) was added dropwise. $CrO_3$ (12 g) was then added to the mixture in small portions. The resultant mixture was stirred at 0° C. overnight. The greenish slurry was poured into ice water, filtrated, and washed with water and methanol. The obtained diacetate was then hydrolyzed by refluxing with a mixture of water (40 mL), ethanol (40 mL) and sulfuric acid (4 mL) overnight. The title product was obtained by filtration, which was used directly for the next step without further purification. Yield: 2.83 g (32%). $^1$H NMR (400 MHz, $d_6$-DMSO, 298K, TMS): δ 10.14 (s, 2H), 8.07 (s, 2H) ppm.

2,5-bis(4,4,5,5-tetramethyl-1,3,2-dioxaborolan-2-yl)terephthalaldehyde (6). 5 (1.0 g, 3.5 mmol), bis(pinacolato)diboron (2.2 g, 86.6 mmol), KOAc (0.85 g, 86.3 mmol), and $Pd(dppf)Cl_2$ (0.255 g, 0.34 mmol) were dissolved in 1,4-dioxane (20 mL), the resulting mixture was refluxed at 110° C. under $N_2$ atmosphere for 24 h. The residue was extracted with ethyl acetate, washed with brine, dried over $Na_2SO_4$, and evaporated under reduced pressure, giving the crude compound which was purified by flash chromatography with hexane/ethyl acetate (5:1) as eluent to afford the title compound as a light yellow solid. Yield: 1.23 g (92%). $^1$H NMR (400 MHz, $CDCl_3$, 298K, TMS): δ 10.56 (s, 2H), 8.38 (s, 2H), 1.41 (s, 24H) ppm. $^1$H NMR (400 MHz, $CDCl_3$, 298K, TMS): δ 31.27. $^{13}$C NMR (125 MHz, $CDCl_3$, 298K, TMS) 194.12, 143.26, 135.12, 84.86, 24.92 ppm.

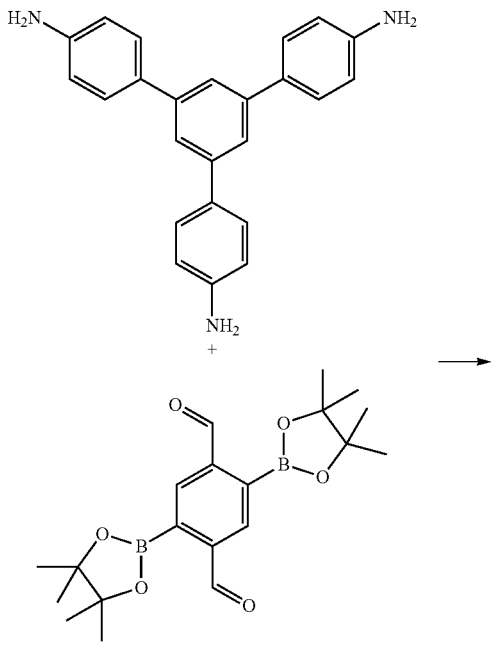

-continued
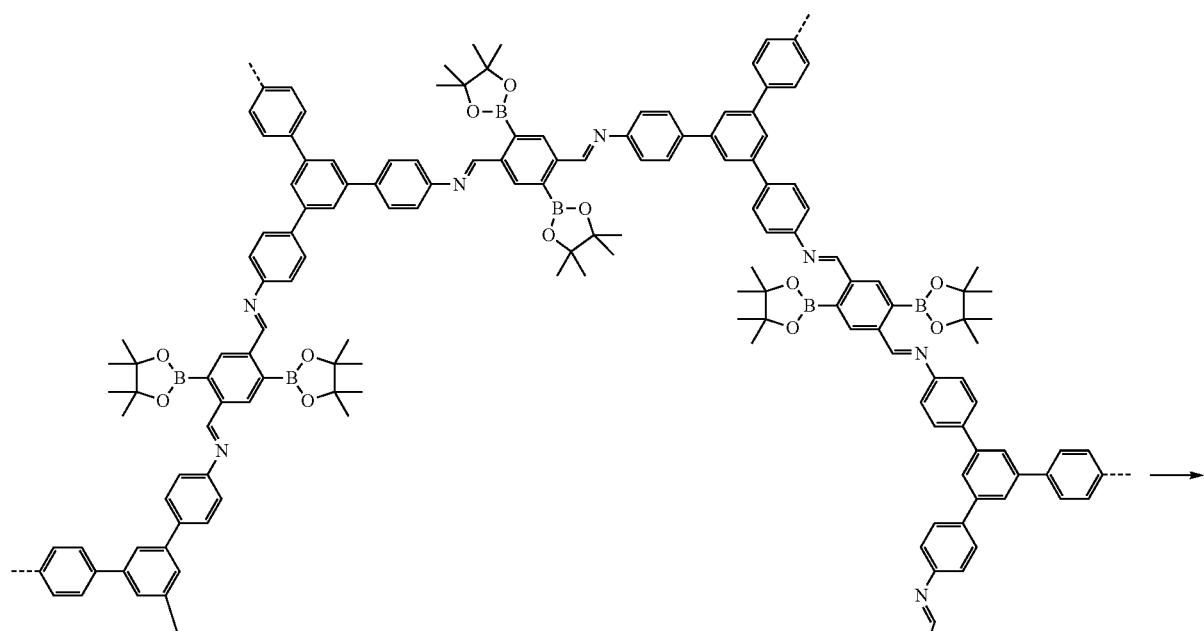
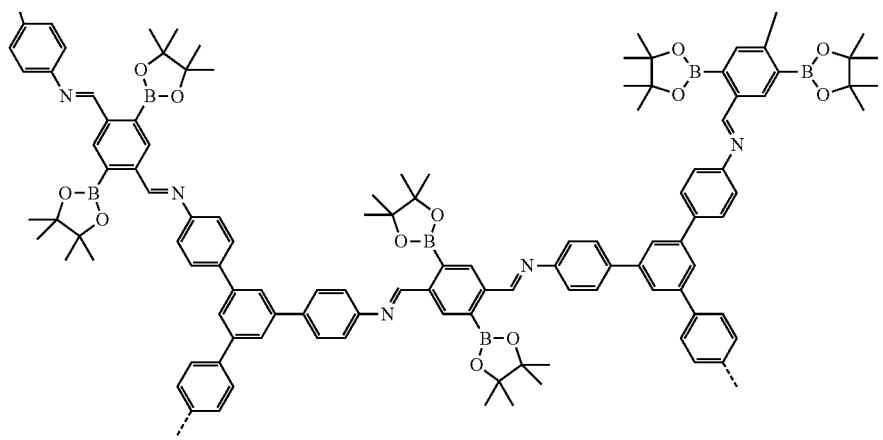
COF-1

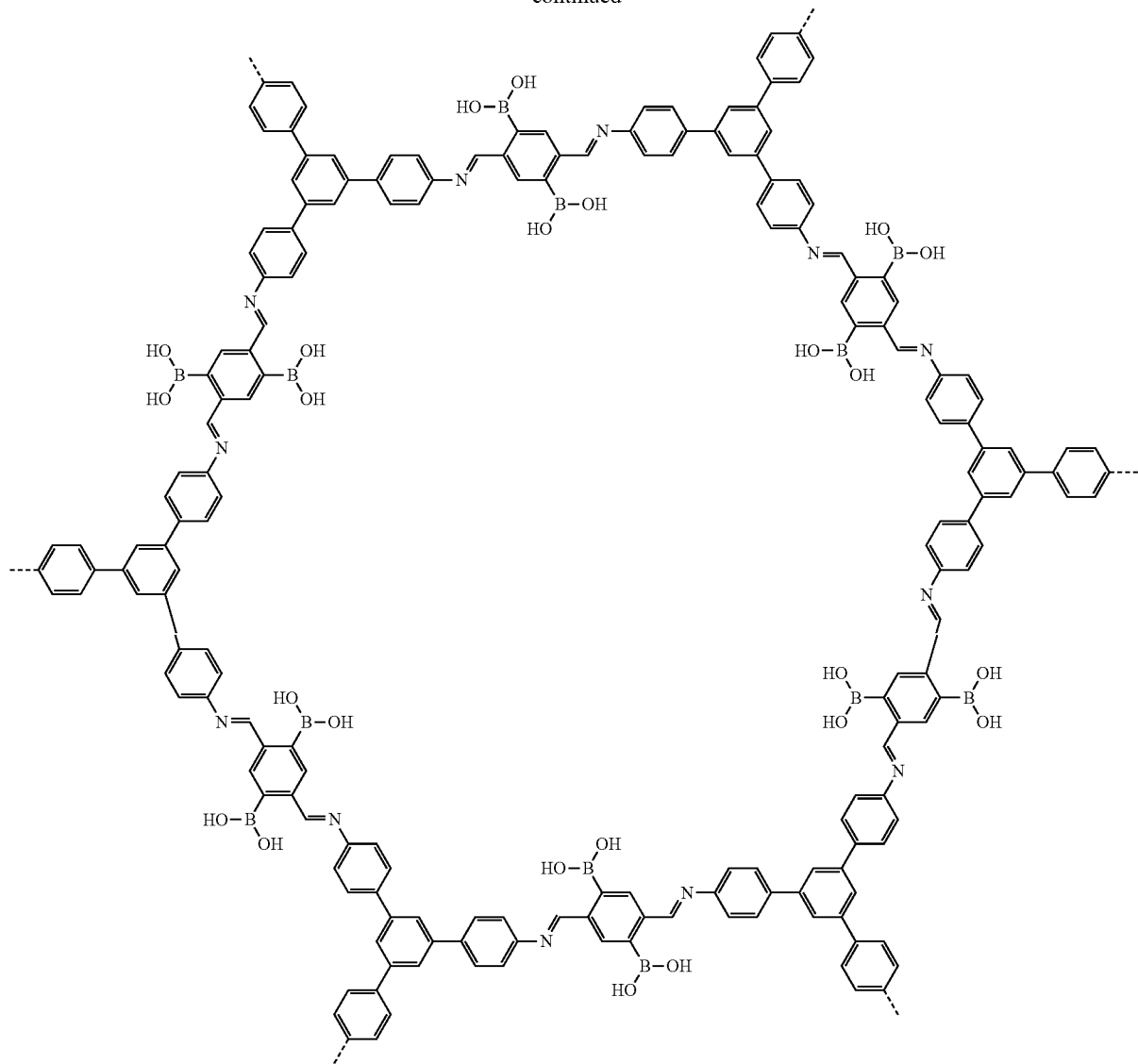

COF-2

Synthesis of COF-1. A Pyrex tube measuring o.d.× i.d.=9.5×7.5 mm² was charged with 2 (20.0 mg, 0.057 mmol) and 5 (32.9 mg, 0.086 mmol) in 1.1 mL of a 5:5:1/v:v:v solution of 1,2-dichlorobenzene:n-butylalcohol:6 M aqueous acetic acid. The tube was flash frozen at 77 K (liquid $N_2$ bath), evacuated and flame sealed. Upon sealing the length of the tube was reduced to ca. 15 cm. The reaction mixture was heated at 100° C. for 3 days to afford a yellow-brown precipitate which was isolated by filtration and washed with anhydrous tetrahydrofuran using soxhlet extraction for 2 days. The product was dried under vacuum at 50° C. to afford COF-1 (42.1 mg, 86%).

Synthesis of COF-2. COF-1 (200 mg) and $NaIO_4$ (661 mg) were added into the mixture of THF (11 mL) and $H_2O$ (2.8 mL) and the resulting mixture was stirred at room temperature for 24 h. After that, 1 M HCl (0.2 mL) was introduced and stirred for another 48 h. The product was collected by filtration, washed with $H_2O$ and ethanol, and dried under vacuum.

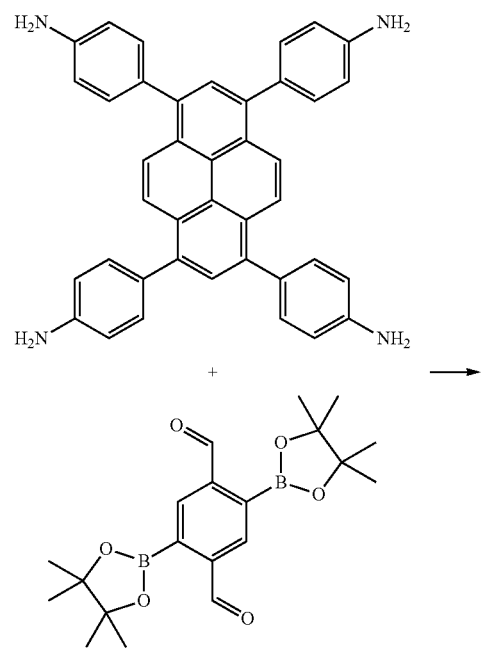
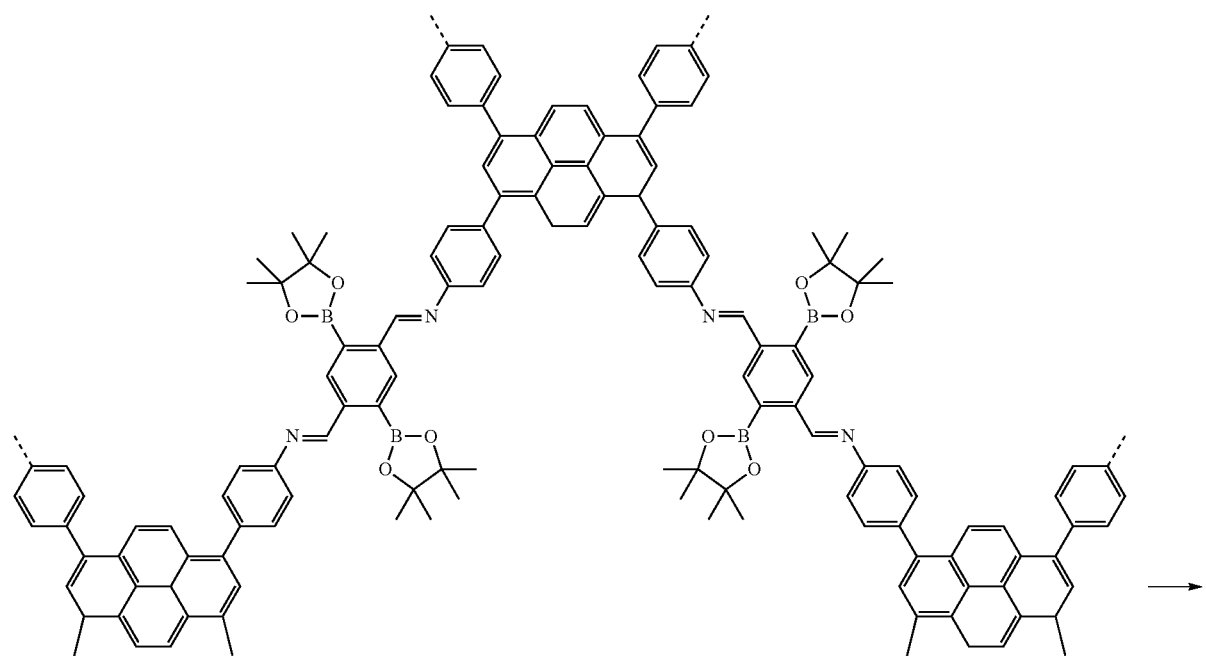

-continued
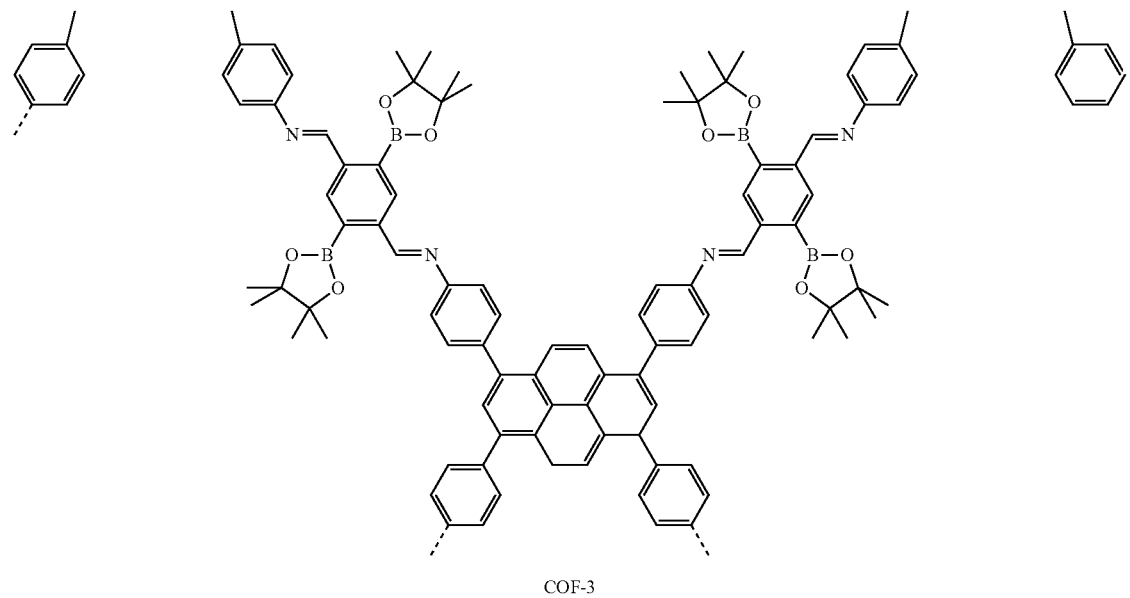
COF-3
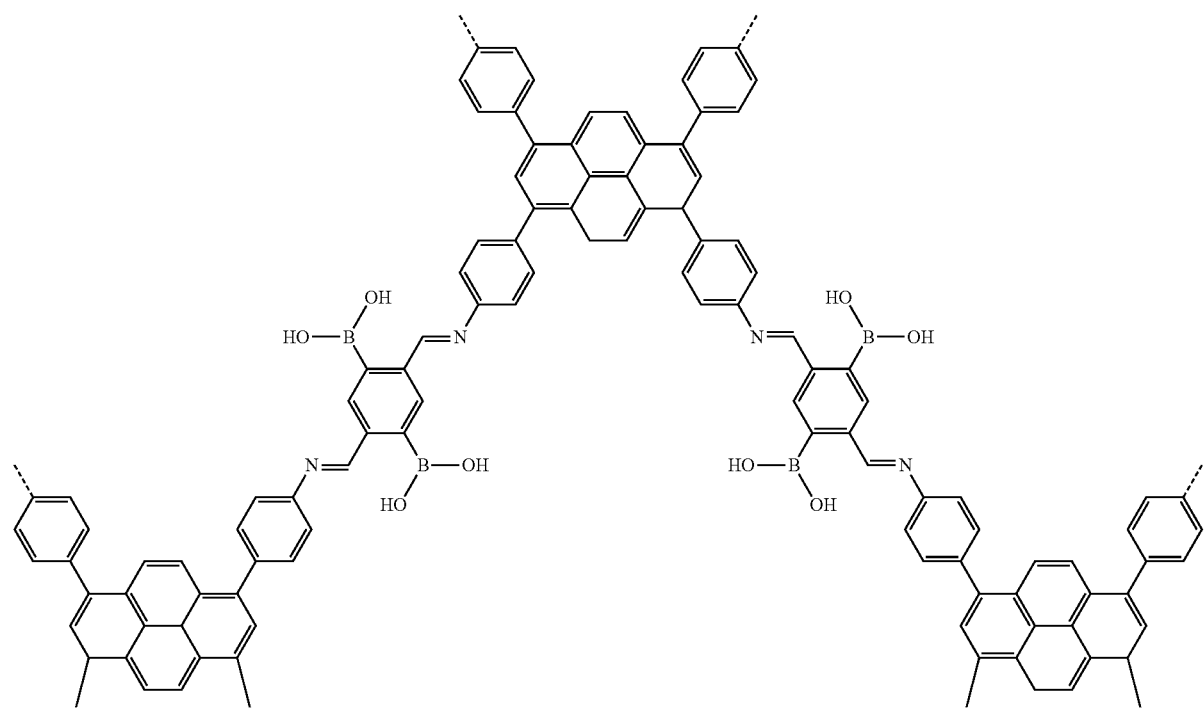

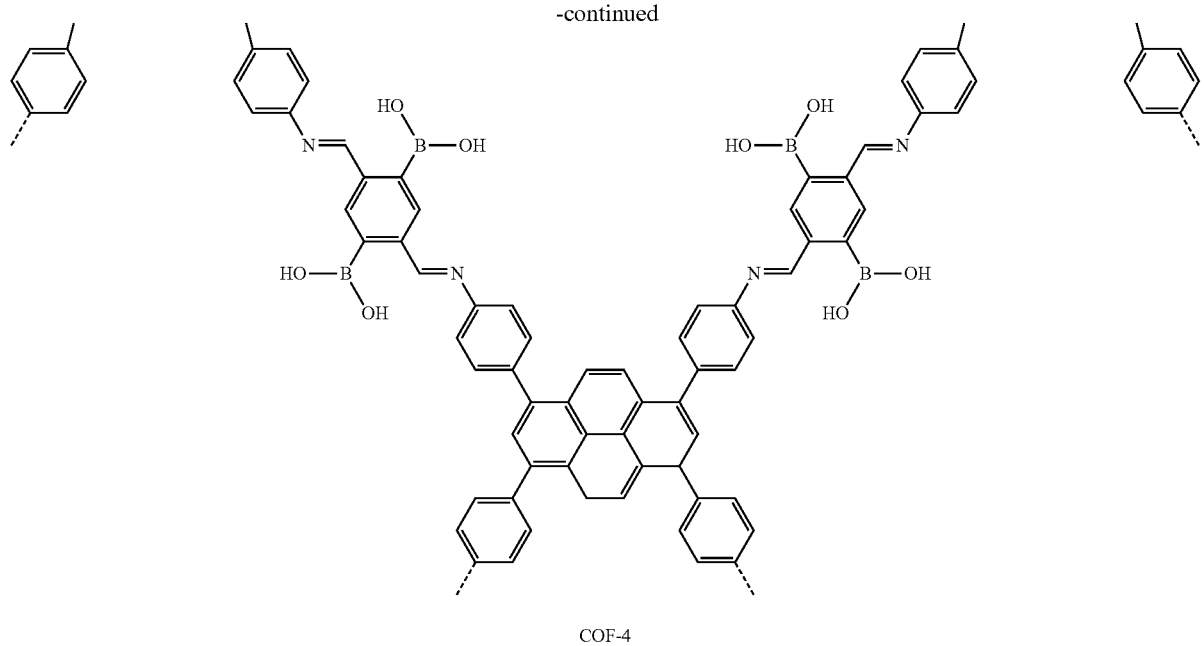

COF-4

Synthesis of COF-3. A Pyrex tube measuring o.d.× i.d.=9.5×7.5 mm² was charged with 4 (11.0 mg, 0.019 mmol) and 5 (15.0 mg, 0.038 mmol) in 1.1 mL of a 5:5:1/v:v:v solution of 1,2-dichlorobenzene:n-butylalcohol:6 M aqueous acetic acid. The tube was flash frozen at 77 K (liquid $N_2$ bath), evacuated and flame sealed. Upon sealing the length of the tube was reduced to ca. 15 cm. The reaction mixture was heated at 100° C. for 3 days to afford a yellow-brown precipitate which was isolated by filtration and washed with anhydrous tetrahydrofuran using soxhlet extraction for 2 days. The product was dried under vacuum at 50° C. to afford COF-2 (20.1 mg, 82%).

Synthesis of COF-4. COF-3 (200 mg) and $NaIO_4$ (661 mg) were added into the mixture of THF (11 mL) and $H_2O$ (2.8 mL) and the resulting mixture was stirred at room temperature for 24 h. After that, 1 M HCl (0.2 mL) was introduced and stirred for another 48 h. The product was collected by filtration, washed with $H_2O$ and ethanol, and dried under vacuum.

Synthesis of Amic Acid Functionalized Porous Organic Polymer

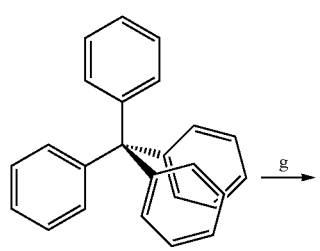

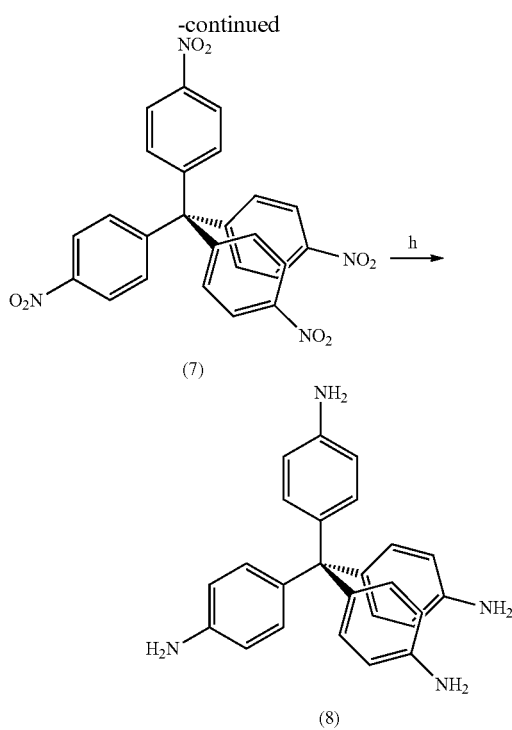

Reagent: (g) $HNO_3$, $CH_3COOH$, $(CH_3CO)_2O$; (h) $NH_2NH_2$, Pd/C tetrakis(4-nitrophenyl)methane (7). A total of 14 mL of fuming nitric acid in a flask equipped with a magnetic stirrer, and a gas funnel were cooled down to −10° C., followed by the portioned addition of tetraphenylmethane (2.5 g, 7.8 mmol), acetic acid (9 mL), and acetic anhydride (4 mL). The mixture was stirred at −10° C. for 1 h. The resulting yellow solid was filtered, washed with acetic acid and water, and dried in an oven at 100° C. Yield: 2.5 g (4.9 mmol, 63%).

tetrakis(4-aminophenyl)methane (8). A total of 0.75 g of tetrakis(4nitrophenyl)methane (1.5 mmol, 1 equiv) were suspended in 50 mL ethanol. Then, 1 g of $N_2H_4 \cdot H_2O$ (20 mmol, 13 equiv) and 50 mg of Pd/C (5 wt. % Pd/C) were added and the mixture was refluxed for 3 h. After hot filtration and washing with ethanol, the solvent was evaporated and the residue washed with DCM to give a white solid. Yield: 0.358 g (9.0 mmol, 63%). $^1$H NMR (400 MHz, DMSO, 298K, TMS): δ 6.63 (d, 8H, J=8.8 Hz), 6.347 (d, 8, J=8.8 Hz), 4.79 (s, 8H) ppm.

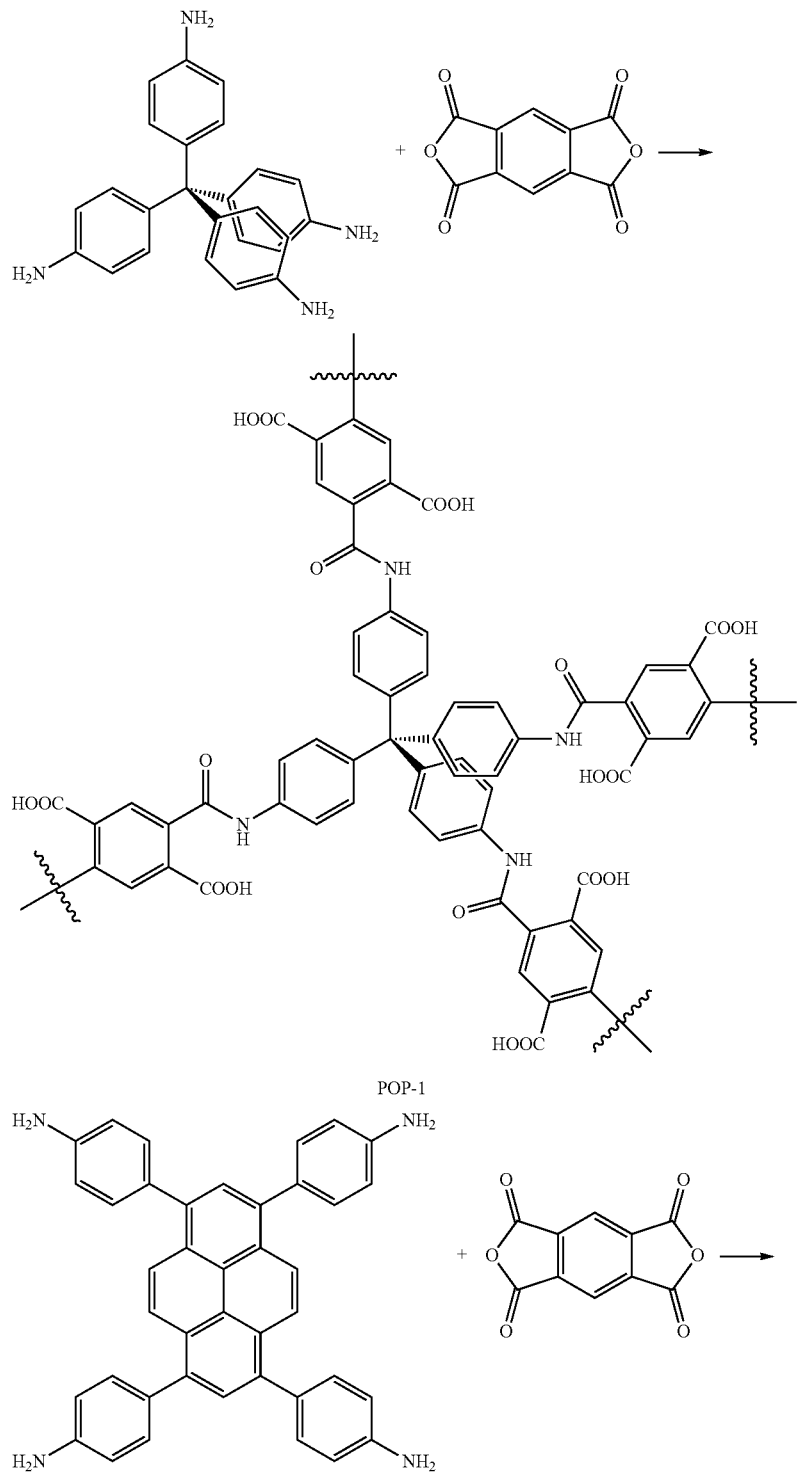

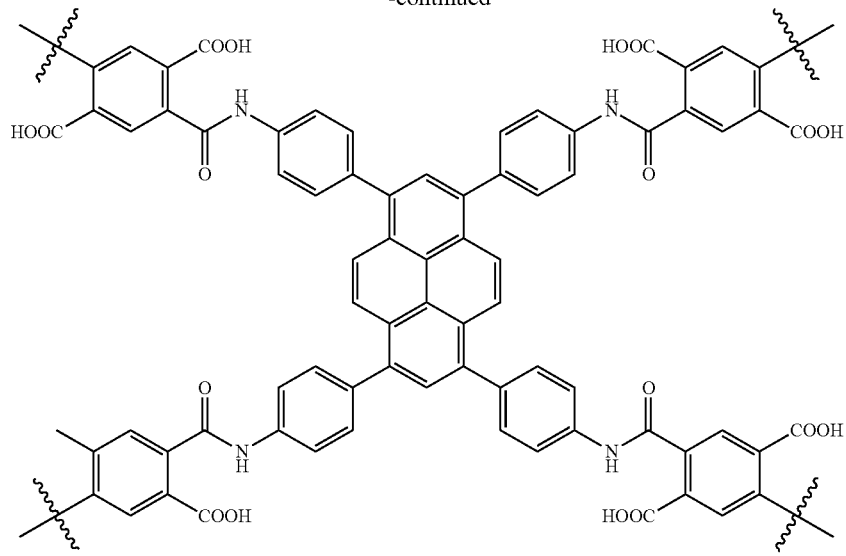

POP-2

Synthesis of POP-1. In a 20 mL glass vial, pyromellitic anhydride (115 mg, 0.52 mmol) was dissolved in 1,4-dioxane (16 mL). Tetrakis(4-aminophenyl)methane (100 mg, 0.26 mmol) and water (1 mL) were then added in one portion at room temperature. The reaction vessel was then placed in oven at 100° C. without stirring. After 18 h, the reaction mixture turned into a gel, was cooled down to room temperature, and then filtered under vacuum and washed with 1,4-dioxane, water, acetone, dichloromethane, THF, toluene, DMF. The obtained solid material was finally washed with dichloromethane and then dried under vacuum at 50° C.

Synthesis of POP-2. In a 20 mL glass vial, pyromellitic anhydride (115 mg, 0.52 mmol) was dissolved in 1,4-dioxane (16 mL). Tetrakis(4-aminophenyl)methane (147 mg, 0.26 mmol) and water (1 mL) were then added in one portion at room temperature. The reaction vessel was then placed in oven at 100° C. without stirring. After 18 h, the reaction mixture turned into a gel, was cooled down to room temperature, and then filtered under vacuum and washed with 1,4-dioxane, water, acetone, dichloromethane, THF, toluene, DMF. The obtained solid material was finally washed with dichloromethane and then dried under vacuum at 50° C.

Synthesis of Porous Organic Polymers from Free Radical Polymerization.

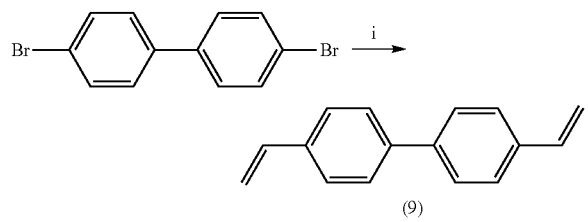

(9)

Reagent: potassium vinyltrifluoroborate, Pd(PPh₃)₄

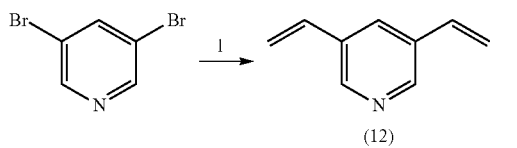

Reagent: MeOH, H₂SO₄; potassium vinyltrifluoroborate, Pd(PPh₃)₄

Reagent: potassium vinyltrifluoroborate, Pd(PPh₃)₄

4,4'-divinyl-1,1'-biphenyl (9). 4,4'-dibromo-1,1'-biphenyl (3.09 g, 10 mmol), potassium vinyltrifluoroborate (3.22 g, 24 mmol), K₂CO₃ (4.14 g, 30 mmol), and Pd(PPh₃)₄ (0.22 g, 0.2 mmol) were dissolved in a mixture of toluene (25 mL), THF (25 mL) and H₂O (5 mL) and the resulting mixture was refluxed at 90° C. under N₂ atmosphere for 24 h. The residue was extracted with ethyl acetate, washed with brine, dried over Na₂SO₄, and evaporated under reduced pressure, giving the crude compound which was purified by flash chromatography with hexane as eluent to afford the title compound as a white solid (1.75 g, 85%). ¹H NMR (400 MHz, CDCl₃, 298K, TMS): δ 7.46-7.58 (m, 8H), 6.72-6.79 (m, 2H), 5.79 (d, 2H, J=17.6 Hz), 6.02 (d, 2H, J=16.0 Hz), 5.27 (d, 2H, J=10.8 Hz) ppm.

dimethyl 2,5-dibromoterephthalate (10). A mixture of 2,5-dibromoterephthalic acid (5 g, 15.5 mmol), concentrated $H_2SO_4$ (4.0 mL) and $CH_3OH$ (100 mL) was refluxed for 12 h. The mixture was extracted with an excess of $Et_2O$, and then the combined organic phase was washed with $NaHCO_3$ aqueous solution and dried over $Na_2SO_4$. The residue was evaporated under reduced pressure and purified by flash chromatography with hexane/ethyl acetate (5:1) as eluent to afford the title compound as white solid. Yield: 5.3 g (98%). $^1$H NMR (400 MHz, $d_6$-DMSO, 298K, TMS): δ 8.06 (s, 2H), 3.85 (s, 6H) ppm.

dimethyl 2,5-divinylterephthalate (11). 10 (3.51 g, 10 mmol), potassium vinyltrifluoroborate (3.2 g, 24 mmol), $K_2CO_3$ (6.6 g, 48 mmol), and $Pd(PPh_3)_4$ (0.22 g, 0.2 mmol) were dissolved in the mixture of toluene (30 mL), THF (30 mL) and $H_2O$ (6 mL), and the resulting mixture was refluxed at 90° C. under $N_2$ atmosphere for 12 h. The residue was extracted with ethyl acetate, washed with brine, dried over $Na_2SO_4$, and evaporated under reduced pressure, giving the crude compound which was then purified by flash chromatography with hexane/ethyl acetate (5:1) as eluent to afford the title compound as white solid. Yield: 2.2 g (90%). $^1$H NMR (400 MHz, $d_6$-DMSO, 298K, TMS): δ 8.01 (d, 2H, J=4 Hz), 7.19-7.25 (m, 2H), 5.81-5.85 (m, 2H), 3.87 (d, 6H, J=4 Hz) ppm.

3,5-divinylpyridine (12). 3,5-dibromopyridine (3.0 g, 12.7 mmol), potassium vinyltrifluoroborate (4.06 g, 30.4 mmol), $K_2CO_3$ (5 g, 36.2 mmol), and $Pd(PPh_3)_4$ (0.37 g, 0.315 mmol) were dissolved in a mixture of toluene (25 mL), THF (25 mL), and $H_2O$ (10 mL), and the resulting mixture was refluxed at 90° C. under $N_2$ atmosphere for 48 h. The product was extracted with ethyl acetate, washed with brine, dried over $Na_2SO_4$, and evaporated under reduced pressure, giving the crude compound which was then purified by flash chromatography with hexane/ethyl acetate (5:1) and 1% v/v triethylamine as eluent to afford the title compound as a colorless liquid. Yield: 1.44 g (86%). $^1$H NMR (400 MHz, $CDCl_3$, 298K, TMS): δ 8.50 (d, 2H, J=1.2 Hz), 7.73 (s, 1H), 6.68-6.74 (m, 2H), 5.85 (d, 2H, J=14 Hz), 5.40 (d, 2H, J=8.8 Hz) ppm. $^{13}$C NMR (125 MHz, $CDCl_3$, 298K, TMS) 147.35, 133.35, 132.81, 129.43, 116.46 ppm.

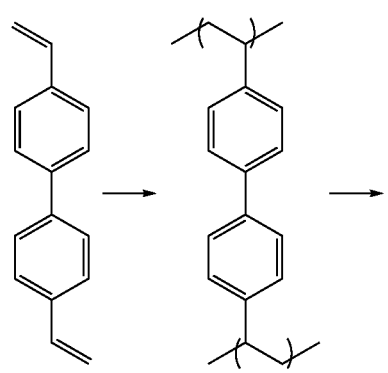

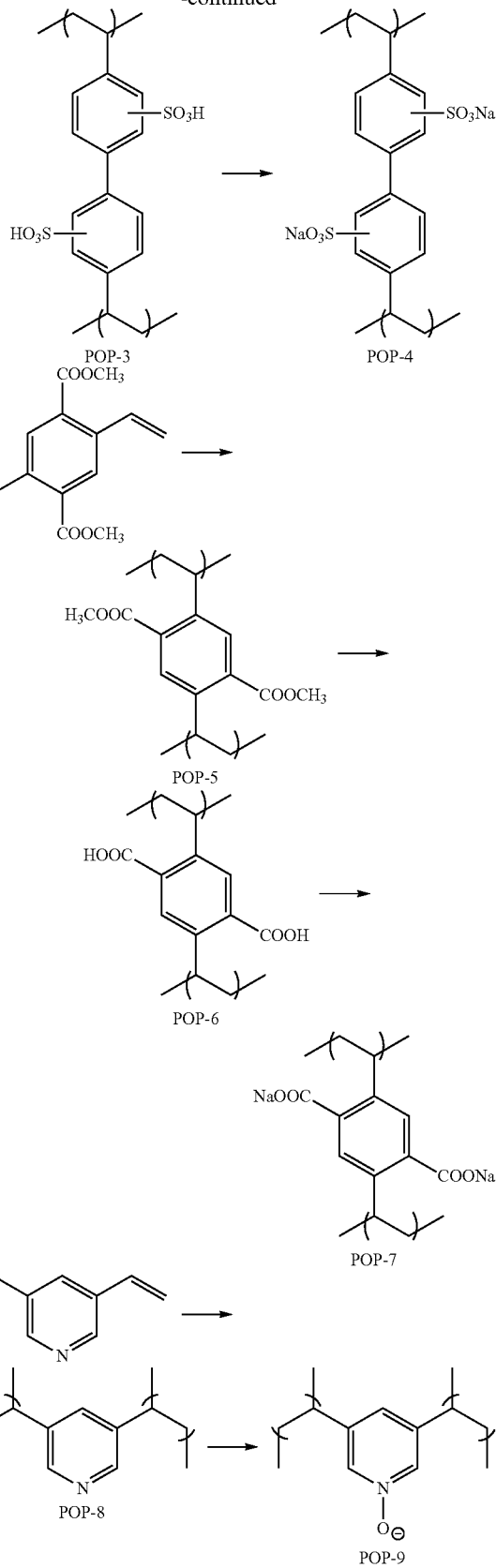

Synthesis of POP-3. 1.0 g of 9 was dissolved in 10 mL of THF, followed by addition of 25 mg of AIBN. The mixture was transferred into an autoclave at 100° C. for 24 h. The title material was obtained after being washed with CH₂Cl₂ and dried under vacuum. Concentrated sulfonic acid (40 mL) was added dropwise to a 100 mL flask containing 500 mg of polymer. The mixture was stirred at room temperature for 48 h, and then 50° C. for another 48 h, after which the mixture was poured into ice water and washed with an excess of water until the pH of the filtration tuned to around 7.

Synthesis of POP-4. POP-4 was obtained by the treatment of POP-3 with NaOH aqueous solution.

Synthesis of POP-5. 1.0 g of 10 was dissolved in 10 mL of THF, followed by addition of 25 mg of AIBN. The mixture was transferred into an autoclave at 100° C. for 24 h. The title material was obtained after being washed with CH₂Cl₂ and dried under vacuum.

Synthesis of POP-6. POP-6 was synthesized by the treatment of POP-5 (0.2 g) with LiOH·H₂O (0.1 g) in a methanol/water mixture (4:1 v/v, 20 mL) to convert the ester groups to carboxyl groups. After the resulting mixture being stirred at room temperature for 24 h, the title material was obtained by filtration, washed with water, and dried under vacuum.

Synthesis of POP-7. POP-7 was obtained by the treatment of POP-6 with NaOH aqueous solution.

Synthesis of POP-8. 1.0 g of 12 was dissolved in DMF (10 mL), followed by the addition of free radical initiator azobisisobutyronitrile (AIBN, 25 mg). After stirring at room temperature to achieve homogeneity, the mixture was transferred into a 20 mL autoclave and maintained at 100° C. for 24 h. A white solid product (1.0 g, 100% yield) was obtained by extracting the DMF solvent with EtOH and drying in vacuum at 50° C. for 12 h.

Synthesis of POP-9. Under an atmosphere of Ar at 0° C., peracetic acid (39 wt. % in acetic acid, 10 mL) was added dropwise to POP-8 (100 mg). After stirring overnight at 85° C., the title materials was obtained by filtration, washed with ethanol, and dried under vacuum.

Ammonium Adsorption Performance Test

TABLE 7

Ammonium removal efficiency from low concentration solution over various adsorbents.

| Entry | Adsorbent | Initial N concentration (ppm) | N concentration after adsorption (ppm) |
|---|---|---|---|
| 1 | COF-1 | 3.49 | 2.75 |
| 2 | COF-2 | 3.49 | 1.05 |
| 3 | COF-3 | 3.49 | 2.30 |
| 4 | COF-4 | 3.49 | 0.74 |
| 5 | POP-1 | 3.49 | 0.83 |
| 6 | POP-2 | 3.49 | 1.28 |
| 8 | POP-3 | 3.49 | 0.15 |
| 9 | POP-4 | 3.49 | 3.13 |
| 10 | POP-5 | 3.49 | 3.32 |
| 11 | POP-6 | 3.49 | 0.72 |
| 12 | POP-7 | 3.49 | 3.08 |
| 13 | POP-8 | 3.49 | 2.98 |
| 14 | POP-9 | 3.49 | 2.64 |

Conditions: ammonium aqueous solution (10 mL), adsorbent (5.0 mg), RT, overnight

TABLE 8

Ammonium uptake capacity evaluation of various adsorbents.

| Entry | Adsorbent | Initial N concentration (ppm) | N uptake capacity (mg g⁻¹) |
|---|---|---|---|
| 1 | COF-1 | 236.67 | 16.53 |
| 2 | COF-2 | 236.67 | 50.41 |
| 3 | COF-3 | 236.67 | 21.32 |
| 4 | COF-4 | 236.67 | 70.18 |
| 5 | POP-1 | 236.67 | 56.04 |
| 6 | POP-2 | 236.67 | 47.35 |
| 8 | POP-3 | 236.67 | 60.32 |
| 9 | POP-4 | 236.67 | 10.11 |
| 10 | POP-5 | 236.67 | 5.14 |
| 11 | POP-6 | 236.67 | 63.29 |
| 12 | POP-7 | 236.67 | 13.12 |
| 13 | POP-8 | 236.67 | 9.14 |
| 14 | POP-9 | 236.67 | 11.13 |

Conditions: ammonium aqueous solution (10 mL), adsorbent (5.0 mg), RT, overnight.

Example 9: Pyridine-Based Polymers for Precious Metal Recovery

Synthesis of Pyridine-Based Polymers for Precious Metal Recovery

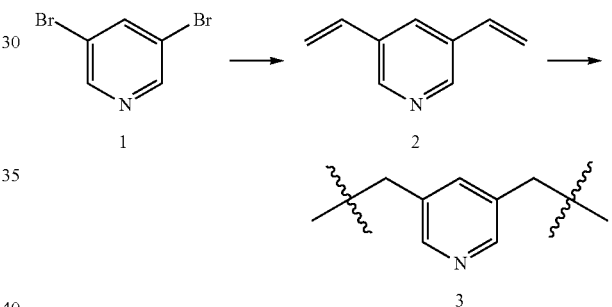

3,5-divinylpyridine (2): 1 (3.0 g, 12.7 mmol), potassium vinyltrifluoroborate (4.06 g, 30.4 mmol), K₂CO₃ (5 g, 36.2 mmol), and Pd(PPh₃)₄ (0.37 g, 0.315 mmol) were dissolved in a mixture of toluene (25 mL), THF (25 mL), and H₂O (10 mL), and the resulting mixture was refluxed at 90° C. under N₂ atmosphere for 48 hr. The product was extracted with ethyl acetate, washed with brine, dried over Na₂SO₄, and evaporated under reduced pressure, giving the crude compound which was then purified by flash chromatography with hexane/ethyl acetate (5:1) and 1% v/v triethylamine as eluent to afford the title compound as a white powder. ¹H NMR (400 MHz, d₆-DMSO, 298K, TMS): δ 10.34 (s, 2H), 8.18 (s, 2H), 7.59-7.66 (m, 2H), 5.97 (d, 2H, J=17.6 Hz), 5.59 (d, 2H, J=11.2 Hz) ppm. ¹³C NMR (125 MHz, d₆-DMSO, 298K, TMS) 193.65, 138.46, 135.77, 132.45, 130.59, 120.48 ppm.

Synthesis of polymer (3): 2 (1.0 g) was dissolved in DMF (10 mL), followed by the addition of free radical initiator azobisisobutyronitrile (AIBN, 0.025 g). After stirring at room temperature to achieve homogeneity, the mixture was transferred into a 20 mL autoclave and heated to 100° C. overnight. A white powder was obtained by extracting the DMF solvent with EtOH and drying in vacuum at 50° C. for 12 hr.

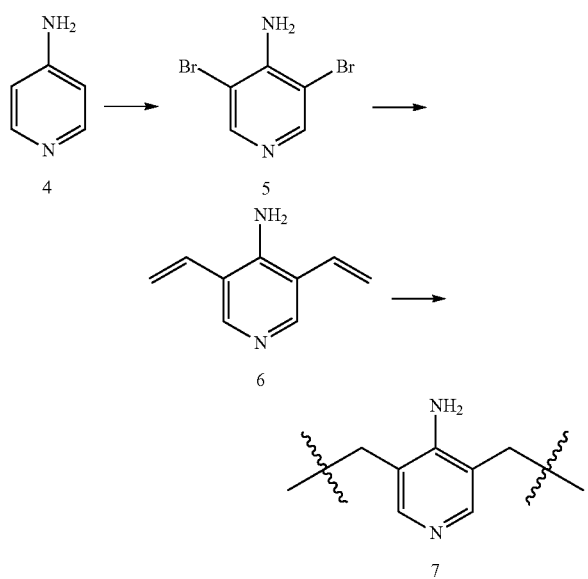

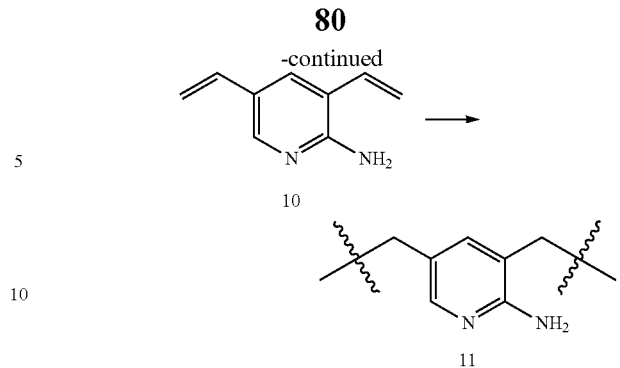

3,5-dibromopyridin-4-amine (5): To a solution of 4 (1.88 g, 20 mmol) and carbon tetrachloride (80 mL), N-bromosuccinimide (7.12 g, 40 mmol) was slowly added in portions over a thirty-minute period, while the flask was protected by aluminum foil. After stirring at room temperature for 24 hr the product was extracted with chloroform, washed with brine, dried over $Na_2SO_4$, and evaporated under reduced pressure, giving the crude compound. This was then purified by flash chromatography with hexane/ethyl acetate (2:1) and 1% v/v triethylamine as eluent to afford the title compound as a yellow powder. $^1$H NMR (400 MHz, $d_6$-DMSO, 298K, TMS): δ 8.20 (d, 2H, J=10 Hz), 6.40 (br, 2H) ppm.

3,5-divinylpyridin-4-amine (6): 5 (1.0 g, 4 mmol), potassium vinyltrifluoroborate (1.32 g, 9.6 mmol), $K_2CO_3$ (1.6 g, 12 mmol), and $Pd(PPh_3)_4$ (0.116 g, 0.1 mmol) were dissolved in a mixture of toluene (25 mL), THF (25 mL), and $H_2O$ (10 mL), and the resulting mixture was refluxed at 90° C. under $N_2$ atmosphere for 48 hr. The product was extracted with ethyl acetate, washed with brine, dried over $Na_2SO_4$, and evaporated under reduced pressure, giving the crude compound which was then purified by flash chromatography with hexane/ethyl acetate (5:1) and 1% v/v triethylamine as eluent to afford the title compound as a yellow powder. $^1$H NMR (400 MHz, $d_6$-DMSO, 298K, TMS): δ 8.12 (s, 2H), 6.81-6.88 (m, 2H), 5.96 (s, 2H), 5.59-5.64 (m, 2H), 5.19-5.22 (m, 2H) ppm.

Synthesis of polymer (7): 6 (1.0 g) was dissolved in DMF (10 mL), followed by the addition of free radical initiator azobisisobutyronitrile (AIBN, 0.025 g). After stirring at room temperature to achieve homogeneity, the mixture was transferred into a 20 mL autoclave and heated to 100° C. overnight. A yellow solid product was obtained by extracting the DMF solvent with EtOH and drying in vacuum at 50° C. for 12 hr.

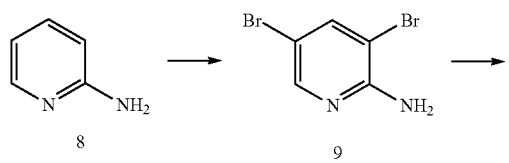

3,5-dibromopyridin-2-amine (9): To a solution of 8 (1.88 g, 20 mmol) and carbon tetrachloride (80 mL), N-bromosuccinimide (7.12 g, 40 mmol) was slowly added in portions over a thirty-minute period, while the flask was protected by aluminum foil. After stirring at room temperature for 24 hr the product was extracted with chloroform, washed with brine, dried over $Na_2SO_4$, and evaporated under reduced pressure, giving the crude compound. This was then purified by flash chromatography with hexane/ethyl acetate (2:1) and 1% v/v triethylamine as eluent to afford the title compound as a yellow powder. $^1$H NMR (400 MHz, $d_6$-DMSO, 298K, TMS): δ 7.27 (d, 1H, J=8.8 Hz), 7.02 (d, 1H, J=8.4 Hz), 5.69 (s, 2H) ppm.

3,5-divinylpyridin-2-amine (10): 9 (1.0 g, 4 mmol), potassium vinyltrifluoroborate (1.32 g, 9.6 mmol), $K_2CO_3$ (1.6 g, 12 mmol), and $Pd(PPha)_4$ (0.116 g, 0.1 mmol) were dissolved in a mixture of toluene (25 mL), THF (25 mL), and $H_2O$ (10 mL), and the resulting mixture was refluxed at 90° C. under $N_2$ atmosphere for 48 hr. The product was extracted with ethyl acetate, washed with brine, dried over $Na_2SO_4$, and evaporated under reduced pressure, giving the crude compound which was then purified by flash chromatography with hexane/ethyl acetate (5:1) and 1% v/v triethylamine as eluent to afford the title compound as a yellow powder. $^1$H NMR (400 MHz, $CDCl_3$, 298K, TMS): δ 7.94 (d, 1H, J=2.8 Hz), 7.61 (d, 1H, J=2 Hz), 6.53-6.65 (m, 2H), 5.57-5.70 (m, 2H), 5.13-5.44 (m, 2H), 4.94 (br, 2H) ppm.

Synthesis of polymer (11): 10 (1.0 g) was dissolved in DMF (10 mL), followed by the addition of free radical initiator azobisisobutyronitrile (AIBN, 0.025 g). After stirring at room temperature to achieve homogeneity, the mixture was transferred into a 20 mL autoclave and heated to 100° C. overnight. A yellow solid product was obtained by extracting the DMF solvent with EtOH and drying in vacuum at 50° C. for 12 hr.

Palladium Recovery $Pd^{2+}$ sorption isotherm. To obtain adsorption isotherms for polymers 3, 7, and 11, 5 mg of adsorbent was placed in 10 mL aqueous solutions of varying $Pd^{2+}$ concentrations (25-800 ppm). The solutions were then stirred overnight to achieve equilibrium. The solutions were filtered through a 0.45 μm membrane filter and the filtrate was analyzed via ICP to determine the residual $Pd^{2+}$ concentrations. The amount adsorbed or uptake capacity, $q_e$ (mg g$^{-1}$), at equilibrium was calculated using Equation 27. Polymers 3, 7, and 11 had uptakes of 707.6, 742.6, and 751.8 mg/g, respectively.

$$q_e = \frac{(C_0 - C_e) \times V}{m} \qquad (27)$$

Pd²⁺ sorption kinetics. 20 mg of polymers 3, 7, and 11 were added to Erlenmeyer flasks containing 200 mL of a 5 ppm Pd²⁺ solution. At increasing time intervals 3 mL aliquots were removed from the mixtures, filtered through a 0.45 μm membrane filter, and the filtrates were analyzed by ICP-MS for the remaining Pd²⁺ concentration. Polymers 3, 7, and 11 were able to drop to 2.23, 0.292, and 1.38 ppb, respectively, within 3 hours.

Selectivity in multi-element solutions. 5 mg of polymers 7 and 11 were added to Erlenmeyer flasks containing 50 mL of a mixed metal solution containing 5 ppm Pd²⁺, Fe²⁺, Zn²⁺, Pb²⁺, Ni²⁺, and Cd²⁺. The solutions were stirred overnight to achieve equilibrium. The solutions were filtered through a 0.45 μm membrane filter and the filtrate was analyzed via ICP to determine the residual Pd²⁺ concentrations. Polymers 7 and 11 were able to drop to 1.02 pob and 188 pob, respectively.

pH stability and Pd²⁺ uptake. 5 mg of polymer 7 was added to 20 mL aqueous solutions of pH 3 and 10, adjusted with nitric acid and sodium hydroxide, respectively. The adsorbents were soaked in the extreme pH solutions over a time period of 72 hr. The polymers were then separated from the solutions through centrifugation and used without further treatment. The adsorbents were subsequently added to 50 mL of 5 ppm Pd²⁺ solutions of pH 3 and 10. The solutions were stirred overnight to achieve equilibrium. The solutions were filtered through a 0.45 μm membrane filter and the filtrate was analyzed via ICP to determine the residual Pd²⁺ concentrations. Polymer 7 was able to drop to 2.08 and 6.14 ppb under pH 3 and 10, respectively.

Palladium Elution and Polymer Regeneration. 3.0521 g thiourea was dissolved in 196 mL of DI water. 4 mL of 0.5M HCl was added to the solution. The resulting solution was 0.2M thiourea and 0.01M HCl. The polymer was placed in 100 mL of the solution and stirred overnight. The polymer was then filtered from the solution, rinsed with water, and dried under vacuum. 20 mg of polymers 7 and 11 were added to Erlenmeyer flasks containing 200 mL of a 5 ppm Pd²⁺ solution. The solutions were stirred overnight to achieve equilibrium. The solution was filtered through a 0.45 μm membrane filter and the filtrate was analyzed via ICP to determine the residual Pd²⁺ concentrations. Polymer 7 was able to drop to 0.1 ppb, removing over 99.99% of the palladium in solution, while Polymer 11 had a reduced capacity, dropping to 29.0 ppb.

TABLE 9

Summary of Additional Experiments

| Experiment | Polymer 7 | Polymer 11 |
| --- | --- | --- |
| | Residual Concentration (ppb) | |
| Selectivity | 1.02 | 188 |
| pH 3 | 2.08 | — |
| pH 10 | 6.14 | — |
| Regeneration | 0.1 | 29.0 |

It should be emphasized that the above-described embodiments of the present disclosure are merely possible examples of implementations, and are set forth only for a clear understanding of the principles of the disclosure. Many variations and modifications may be made to the above-described embodiments of the disclosure without departing substantially from the spirit and principles of the disclosure. All such modifications and variations are intended to be included herein within the scope of this disclosure.

We claim:

1. A composition for binding one or more contaminants from a source of water, the composition comprising a porous organic polymer (POP) comprising:
   (i) a plurality of repeat units each having a structure according to any one of Formula 3A-Formula 3C

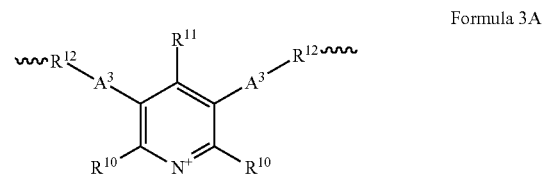

Formula 3A

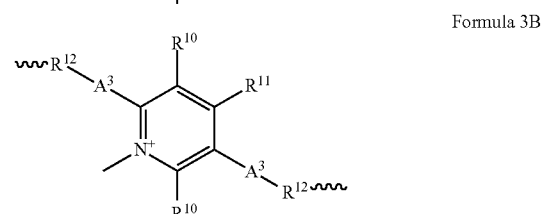

Formula 3B

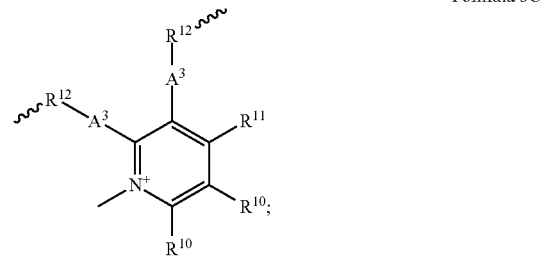

Formula 3C and
   (ii) a plurality of pores having a hierarchical pore size distribution over a range of pore sizes;
   where each occurrence of $R^{10}$ is independently a hydrogen, a halide, or an alkyl or heteroalkyl having 1 to 3 carbon atoms;
   where each occurrence of $R^{11}$ is independently a hydrogen, $-NH_2$, $-NHR^{13}$, or $-NR^{13}R^{14}$ where each occurrence of $R^{13}$ and $R^{14}$ is independently an alkyl or heteroalkyl having 1 to 3 carbon atoms;
   where each occurrence of $R^{12}$ is independently an alkyl having 1 to 3 carbon atoms; and
   where each occurrence of $A^3$ is independently none or a substituted or unsubstituted phenyl.

2. The composition according to claim 1, wherein each occurrence of $R^{11}$ is $-NH_2$, $-NHR^{13}$, or $-NR^{13}R^{14}$.

3. The composition according to claim 1, wherein each occurrence of $A^3$ is none.

4. A composition for binding one or more contaminants from a source of water, the composition comprising a porous organic polymer (POP) comprising:
   (i) a plurality of repeat units each having a structure according to any one of Formula 4A-Formula 4C

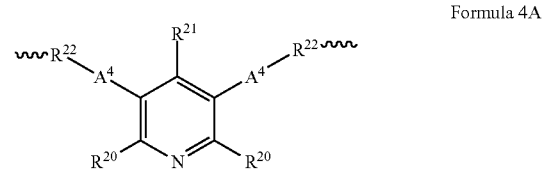

Formula 4A

-continued

Formula 4B

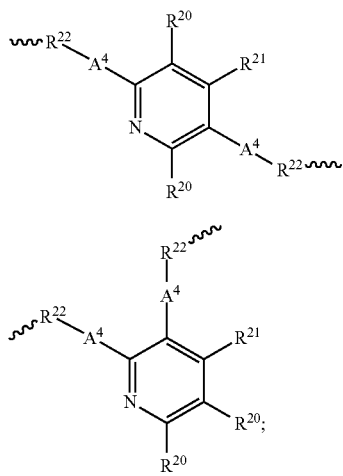

Formula 4C

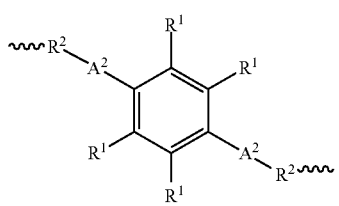

and (ii) a plurality of pores having a hierarchical pore size distribution over a range of pore sizes;

where each occurrence of $R^{20}$ and $R^{21}$ is independently a hydrogen, a halide, an alkyl or heteroalkyl having 1 to 3 carbon atoms, $-NH_2$, $-NHR^{13}$, or $-NR^{13}R^{14}$ where each occurrence of $R^{13}$ and $R^{14}$ is independently an alkyl or heteroalkyl having 1 to 3 carbon atoms;

where each occurrence of $R^{22}$ is independently an alkyl having 1 to 3 carbon atoms; and where each occurrence of $A^4$ is independently none or a substituted or unsubstituted phenyl.

5. The composition according to claim 4, wherein each occurrence of $R^{21}$ is $-NH_2$, $-NHR^{13}$, or $-NR^{13}R^{14}$.

6. The composition according to claim 4, wherein at least one occurrence of $R^{20}$ is $-NH_2$, $-NHR^{13}$, or $-NR^{13}R^{14}$.

7. The composition according to claim 4, wherein each occurrence of $A^3$ is none.

8. A composition for binding one or more contaminants from a source of water, the composition comprising a porous organic polymer (POP) comprising:

(i) a plurality of repeat units each having a structure according to any one of Formula 1A-Formula 1C Formula 1A

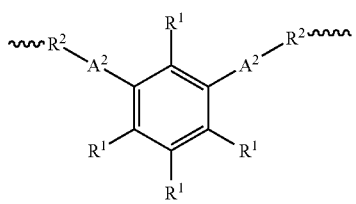

Formula 1B

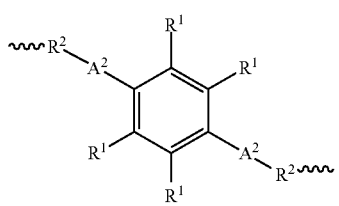

Formula 1C

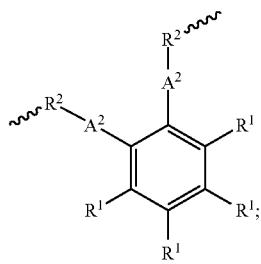

and (ii) a plurality of pores having a hierarchical pore size distribution over a range of pore sizes;

where each occurrence of $R^1$ is independently a hydrogen, a halide, an alkyl or heteroalkyl having 1 to 3 carbon atoms, or a binding moiety, so long as at least one occurrence of $R^1$ is a binding moiety;

wherein each occurrence of the binding moiety is independently selected from the group consisting of a nitro substituent, a thiol substituent, a halide substituent, a conjugate base substituent, an ammonium substituent, a pyridinium substituent, an imidazolium substituent, or a salt thereof;

where each occurrence of $R^2$ is independently an alkyl having 1 to 3 carbon atoms; and where each occurrence of $A^2$ is independently none or a substituted or unsubstituted phenyl.

9. The composition according to claim 8, wherein the binding moiety comprises a halide selected from the group consisting of a chloride, a bromide, and an iodide.

10. The composition according to claim 8, wherein the binding moiety comprises a conjugate base substituent or a salt thereof, wherein the conjugate base is selected from the group consisting of sulfate and nitrate.

11. The composition according to claim 8, wherein the binding moiety comprises an ammonium substituent or a salt thereof, and the ammonium substituent has a structure according to the following formula

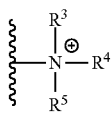

where $R^3$, $R^4$, and $R^5$ are hydrogen; or where $R^3$, $R^4$, and $R^5$ are each independently selected from the group consisting of hydrogen and C1-C5 alkyl, heteroalkyl, and alkoxy; or where $R^4$ is hydrogen, and where $R^3$ and $R^5$ are each independently selected from the group consisting of $C^2$-$C^7$ carboxylic acids.

12. The composition according to claim 8, wherein the binding moiety comprises a thiol substituent having a structure according to the following formula $-R^6SH$, where $R^6$ is selected from the group consisting of none, $C_1$-$C_7$ alkyl, $C_1$-$C_7$ heteroalkyl and $C_1$-$C_7$ alkylthio.

13. The composition according to claim 8, wherein the binding moiety comprises a pyridinium substituent or a salt thereof, where the pyridinium substituent has a structure according to the following formula

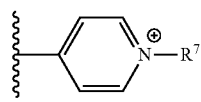

where $R^7$ is selected from the group consisting of hydrogen, $C_1$-$C_7$ alkyl, and $C_1$-$C_7$ heteroalkyl.

14. The composition according to claim 8, wherein the binding moiety comprises an imidazolium substituent or a salt thereof, where the imidazolium substituent has a structure according to the following formula

where R8 is an C1-C7 alkyl or heteroalkyl; and where $B^1$ and $B^2$ are each independently selected from the group consisting of hydrogen, alkyl, imidazolium, and alkyl imidazolium, so long as at least one occurrence of $B^1$ and $B^2$ is an imidazolium or alkyl imidazolium.

15. The composition according to claim 8, wherein the repeat units in the plurality of repeat units each have a structure according to any one of Formula 2A-Formula 2C Formula 2A

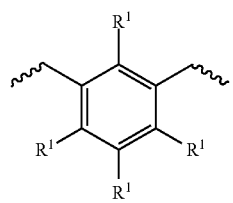

Formula 2B

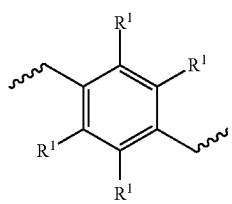

Formula 2C

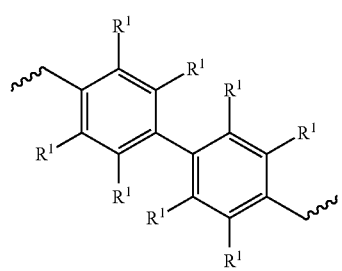

where $R^1$ is as defined in claim 8.

16. The composition according to claim 8, wherein a first occurrence of $R^1$ comprises a first binding moiety, and
wherein a second occurrence of $R^1$ comprises a second binding moiety different from the first binding moiety.

17. The composition according to claim 1, wherein the composition comprising a porous organic polymer (POP) comprising:

(i) a first plurality of repeat units and a second plurality of repeat units different from the first plurality of repeat units, wherein each of the repeat units in the first plurality of repeat units and each of the repeat units in the second plurality of repeat units have a structure according to any one of Formula 1A-Formula 1C, Formula 3A-Formula 3C, and Formula 4A-Formula 4C Formula 1A

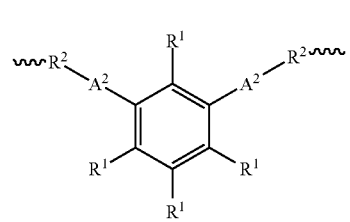

Formula 1B

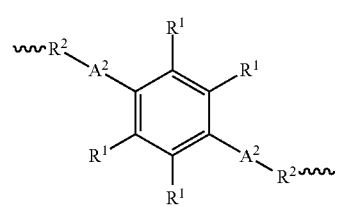

Formula 1C

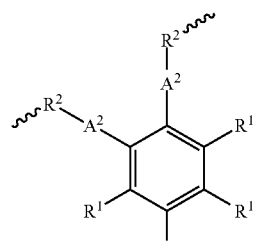

Formula 3A

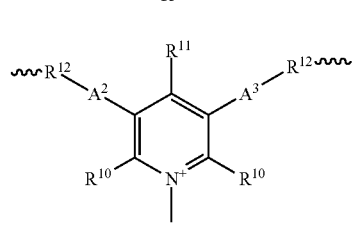

Formula 3B

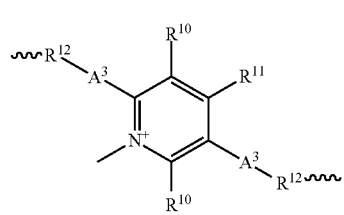

Formula 3C

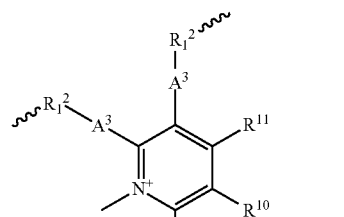

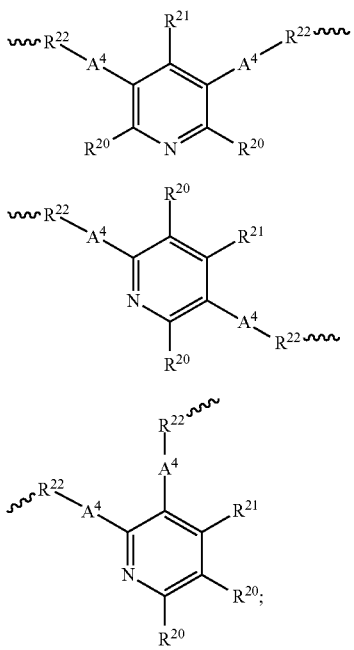

Formula 4A

Formula 4B

Formula 4C and (ii) a plurality of pores having a hierarchical pore size distribution over a range of pore sizes;

where each occurrence of $R^1$ is independently a hydrogen, a halide, an alkyl or heteroalkyl having 1 to 3 carbon atoms, or a binding moiety, so long as at least one occurrence of $R^1$ is a binding moiety;

wherein each occurrence of the binding moiety is independently selected from the group consisting of a nitro substituent, a thiol substituent, a halide substituent, a conjugate base substituent, an ammonium substituent, a pyridinium substituent, an imidazolium substituent, or a salt thereof, where each occurrence of $R^2$ is independently an alkyl having 1 to 3 carbon atoms; and where each occurrence of $A^2$ is independently none or a substituted or unsubstituted phenyl.

18. The composition according to claim 1, wherein the hierarchical pore size distribution is determined based upon at least 60% of the pore sizes in the range of pore sizes having a pore volume of at least 0.01 $cm^3$ $g^{-1}$ in the pore size distribution, wherein the pore size distribution is based on a non-local density functional theory model applied to a nitrogen adsorption isotherm for the POP measured at 77 K.

19. A method of removing one or more contaminants from a source of water, the method comprising contacting the water with a composition according to claim 1.

20. The method according to claim 19, wherein the one or more contaminants are selected from the group consisting of antimony, arsenic, barium, beryllium, cadmium, chromium, copper, lead, mercury, selenium, technetium, thallium, uranium, radium, urea, and phosphate.

* * * * *